US012284736B2

(12) United States Patent
Kumar et al.

(10) Patent No.: US 12,284,736 B2
(45) **Date of Patent: *Apr. 22, 2025**

(54) APPARATUS AND METHODS FOR COMMUNICATING INFORMATION AND POWER VIA PHASE-CUT AC WAVEFORMS

(71) Applicant: DMF, Inc., Carson, CA (US)

(72) Inventors: Russikesh Kumar, Tustin, CA (US); Oren Kashani, Kfar Saba (IL)

(73) Assignee: DMF, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 18/488,145

(22) Filed: Oct. 17, 2023

(65) Prior Publication Data

US 2024/0276614 A1 Aug. 15, 2024

Related U.S. Application Data

(63) Continuation of application No. 18/055,070, filed on Nov. 14, 2022, now Pat. No. 11,800,617, which is a continuation of application No. 17/694,185, filed on Mar. 14, 2022, now Pat. No. 11,503,688, which is a (Continued)

(51) Int. Cl.

*H05B 45/30* (2020.01)
*H05B 45/20* (2020.01)
*H05B 45/325* (2020.01)
*H05B 45/385* (2020.01)
*H05B 45/31* (2020.01)

(52) U.S. Cl.

CPC ........... *H05B 45/385* (2020.01); *H05B 45/20* (2020.01); *H05B 45/325* (2020.01); *H05B 45/31* (2020.01)

(58) Field of Classification Search

CPC ...... H05B 45/10; H05B 45/20; H05B 454/28; H05B 45/30; H05B 45/31; H05B 45/325; H05B 45/385; H05B 47/10

See application file for complete search history.

(56) References Cited

U.S. PATENT DOCUMENTS 5,455,490 A 10/1995 Callahan et al.
5,821,703 A 10/1998 Callahan et al.
6,469,457 B2 10/2002 Callahan (Continued)

FOREIGN PATENT DOCUMENTS

WO WO 2002/067070 8/2002

OTHER PUBLICATIONS

Thornton, Improve phase-cut dimming performance in LED luminaires (MAGAZINE). Dec. 24, 2013. 4 pages.

(Continued)

*Primary Examiner* — Jimmy T Vu

(74) *Attorney, Agent, or Firm* — Smith Baluch LLP

(57) ABSTRACT

Apparatus and methods for controlling correlated color temperature (CCT) and lighting intensity in lighting fixtures are described. The CCT and intensity may be controlled independently over conventional AC wiring using a conventional dimmer. A lighting controller that resembles a conventional dimmer and that can be installed in place of a dimmer may be used instead of a conventional dimmer to access more control functionalities, still using conventional AC wiring. Wireless communication with the lighting fixture and/or lighting controller are possible.

21 Claims, 20 Drawing Sheets

Related U.S. Application Data continuation of application No. PCT/US2021/049736, filed on Sep. 9, 2021.

(60) Provisional application No. 63/224,469, filed on Jul. 22, 2021, provisional application No. 63/188,221, filed on May 13, 2021, provisional application No. 63/175,101, filed on Apr. 15, 2021, provisional application No. 63/141,340, filed on Jan. 25, 2021, provisional application No. 63/076,323, filed on Sep. 9, 2020.

(56) References Cited

U.S. PATENT DOCUMENTS

| | | | |
|---|---|---|---|
| 8,278,832 | B2 | 10/2012 | Hung et al. |
| 8,344,657 | B2 | 1/2013 | Zhan et al. |
| 8,497,636 | B2 | 7/2013 | Nerone |
| 8,570,160 | B2 | 10/2013 | Speegle et al. |
| 8,581,518 | B2 | 11/2013 | Kuang et al. |
| 8,664,885 | B2 | 3/2014 | Koolen et al. |
| 8,692,481 | B2 | 4/2014 | Negrete et al. |
| 8,710,766 | B2 | 4/2014 | Kanamori et al. |
| 8,829,819 | B1 | 9/2014 | Angeles et al. |
| 8,922,129 | B1 | 12/2014 | Rodriguez |
| 9,288,864 | B2 | 3/2016 | Wang et al. |
| 9,319,104 | B2 | 4/2016 | Speegle et al. |
| 9,538,618 | B2 | 1/2017 | Taipale et al. |
| 9,674,904 | B2 | 6/2017 | Radermacher et al. |
| 9,736,911 | B2 | 8/2017 | Taipale et al. |
| 10,091,844 | B2 | 10/2018 | Hu et al. |
| 10,616,968 | B2 | 4/2020 | Wang |
| 10,805,997 | B2 | 10/2020 | Wang |
| 11,503,688 | B2 | 11/2022 | Kumar et al. |
| 11,800,617 | B2 * | 10/2023 | Kumar ............... H05B 45/3575 |
| 2009/0184666 | A1 | 7/2009 | Myers et al. |
| 2010/0090618 | A1 | 4/2010 | Veltman |
| 2011/0241557 | A1 | 10/2011 | Grotkowski et al. |
| 2012/0188794 | A1 | 7/2012 | Chang et al. |
| 2014/0159616 | A1 | 6/2014 | Wang et al. |
| 2014/0197751 | A1 | 7/2014 | Grajcar |
| 2014/0265933 | A1 | 9/2014 | Melanson et al. |
| 2015/0035450 | A1 | 2/2015 | Werner |
| 2015/0319820 | A1 | 11/2015 | Puvanakijjakorn et al. |
| 2016/0126860 | A1 | 5/2016 | Summerland |
| 2016/0218626 | A1 | 7/2016 | Del Carmen |
| 2017/0094738 | A1 | 3/2017 | Garner |
| 2017/0374718 | A1 | 12/2017 | Fang et al. |
| 2018/0042082 | A1 | 2/2018 | Tu et al. |
| 2020/0022232 | A1 | 1/2020 | Xiong |
| 2021/0012065 | A1 | 1/2021 | Shmuel |
| 2021/0068227 | A1 * | 3/2021 | Mai ........................ H05B 45/31 |
| 2022/0128222 | A1 | 4/2022 | Lotfi et al. |

OTHER PUBLICATIONS

LED Driver with Phase-cut Dimmable Function, 8.6 W. Semiconductor Components Industries, LLC, Jan. 2018, 13 pages.
Fairchild Reference Design RD-523. 2015. Accessed at www.fairchildsemi.com. 11 pages.
LED Driver with Phase-cut Dimmable Function, 40 W. Semiconductor Components Industries, LLC, Feb. 2018, 13 pages.
Roggio, Dimming LEDs with Traditional TRIAC Dimmers. Digi-Key Electronics. Jul. 19, 2011. 2 pages.
Gu, Offline LED Lighting Simplifi ed: High Power Factor, Isolated LED Driver Needs No Opto-Isolators and is TRIAC Dimmer Compatible—Design Note 490. Linear Technology Design Notes. 2011. 2 pages.
Legates, Improving Line Regulation (and TRIAC Dimming) for the LT3799. Linear Technology Corporation. Jul. 11, 2011. 4 pages.
FL7734 Single-Stage Primary-Side_Regulation PWM Controller for PFC and Phase Cute Dimmable LED Driving. Nov. 2014. Fairchild Semiconductor Corporation. 13 pages.
International Search Report and Written Opinion in International Patent Application No. PCT/US19/14847 mailed Jun. 6, 2019, 24 pages.
Notice of Allowance mailed Dec. 27, 2019 from U.S. Appl. No. 16/561,898, 8 pages.
Notice of Allowance mailed Aug. 10, 2020 from U.S. Appl. No. 16/841,362, 8 pages.
International Search Report and Written Opinion in International Patent Application No. PCT/US2021/049736 mailed Jan. 31, 2022. 20 pages.
Technical Application Note: Forward and Reverse Phase Dimming. Leviton 2020. Accessed at https://www.leviton.com/en/docs/Dimmer-Forward-and-Reverse-Application-Note.pdf. 2 pages.
Bridgelux® Vesta® Series Tunable White Gen 2 9mm Array. Product Data Sheet DS350. Bridgelux Feb. 2020. Accessed at https://www.bridgelux.com/sites/default/files/resource_media/Bridgelux%20DS350%20Vesta%20Series%20Tunable%20White%209mm%20Gen%202%20Array%2020200123%20Rev%20C.pdf. 20 pages.
Notice of Allowance mailed Jul. 11, 2022 from U.S. Appl. No. 17/694,185, 10 Pages.
Notice of Allowance mailed Jun. 16, 2023 from U.S. Appl. No. 18/055,070, 9 Pages.
U.S. Appl. No. 16/561,898, filed Sep. 5, 2019, Wang.
U.S. Appl. No. 16/841,362, filed Apr. 6, 2020, Wang.
U.S. Appl. No. 17/694,185, filed Mar. 14, 2022, Kumar et al.
U.S. Appl. No. 18/055,070, filed Nov. 14, 2022, Kumar et al.

* cited by examiner

APPARATUS AND METHODS FOR COMMUNICATING INFORMATION AND POWER VIA PHASE-CUT AC WAVEFORMS

CROSS-REFERENCE TO RELATED APPLICATIONS

This application is a continuation of U.S. application Ser. No. 18/055,070, filed on Nov. 14, 2022 titled "Apparatus and Methods for Communicating Information and Power Via Phase-Cut AC Waveforms," which is a continuation of U.S. application Ser. No. 17/694,185, filed on Mar. 14, 2022 titled "Apparatus and Methods for Communicating Information and Power Via Phase-Cut AC Waveforms," which is a by-pass continuation of International Application No. PCT/US2021/049736, filed on Sep. 9, 2021 titled, "Apparatus and Methods for Communicating Information and Power Via Phase-Cut AC Waveforms," which claims a priority benefit, under 35 U.S.C. § 119(e), of U.S. Application No. 63/076,323, filed on Sep. 9, 2020 titled, "Methods and Apparatus for Independently Controlling Phase Angles of Respective Half-Cycles of an AC Waveform to Control Lighting Brightness and Convey Additional Control of Information to a Lighting Fixture," and of U.S. Application No. 63/141,340, filed on Jan. 25, 2021 titled, "Methods and Apparatus for Encoding One or More Half-Cycles of an AC Waveform to Control a Lighting Fixture," and of U.S. Application No. 63/175,101, filed on Apr. 15, 2021 titled, "Methods and Apparatus for Encoding One or More Half-Cycles of an AC Waveform to Control a Lighting Fixture," and of U.S. Application No. 63/188,221, filed on May 13, 2021 titled, "Methods and Apparatus for Encoding One or More Half-Cycles of an AC Waveform to Control a Lighting Fixture," and of U.S. Application No. 63/224,469, filed on Jul. 22, 2021 titled, "Methods and Apparatus for Encoding One or More Half-Cycles of an AC Waveform to Control a Lighting Fixture." Each of the foregoing applications is incorporated herein by reference in its entirety.

BACKGROUND

Phase-control dimming is the predominant method for controlling light intensity from lights in a residential building. Phase-control dimming commonly uses triacs or MOSFETs as the power control devices in a conventional dimmer switch and typically operates over building AC wiring to adjust power delivered to a lighting circuit. Such phase-control dimmers may be purchased at a hardware store and installed to replace a conventional, wall-mounted ON/OFF power switch.

FIG. 1 depicts an example of a conventional phase-control dimming system, which has a conventional phase-control dimmer 120 and a lighting fixture 150. The illustration shows an AC waveform 110 that can be received at the dimmer over an AC line or wire 105, such as 14/2 NM-B wire which may run from a building's circuit-breaker panel to the phase-control dimmer 120 and then on to the lighting fixture 150. The phase-controlled dimmer 120 operates to essentially chop the AC waveform symmetrically to remove some of the AC power, as depicted in the dimmer's output waveform 130. The amount of chopping in the output waveform is variable (indicated by the horizontal arrows on the sharp rising and falling edges of the waveform) and controlled by a user with a knob, slide, or other means at the dimmer 120. Such an output waveform 130 is referred to as a "phase-cut waveform." For the illustrated example, the output waveform depicts "forward phase control" where the AC waveform is chopped on the leading edge of each half-cycle in the waveform. Reverse phase control can alternatively be implemented. The chopping removes a portion of power from the line AC waveform 110 thereby controlling the amount of power delivered to the lighting fixture 150 and thus controlling the intensity of light emitted by the lighting fixture 150.

Other methods exist for controlling light intensity. At least some of these methods may use an additional channel (other than existing AC wiring) to control light intensity that is separate from the channel used for power delivery to the lighting fixture. Such methods include 0-10V analog dimming, digital addressable lighting interface (DALI), and various wireless communication means based on Zigbee, BlueTooth® or Wi-Fi™ systems and protocols, for example.

DALI and the wireless communication means can further provide the ability to control correlated color temperature (CCT) in LED lighting fixtures having LEDs emitting at two different colors. However, these approaches can require installation of additional components (wires, wireless, networking apparatus) increasing the cost and complexity of implementation. Wireless communication in such applications can also present significant challenges in terms of cost and complexity for antenna design. Although easily-implementable control of lighting color temperature, in addition to intensity control, can be a desirable feature for users, the cost and complexity of installing additional wires and/or apparatus for wired or wireless communications may prevent many users from adopting such systems.

SUMMARY

The inventors have recognized and appreciated that many users would like easily-implementable and independent control of lighting correlated color temperature (CCT) in addition to lighting intensity, but are unwilling to adopt apparatus that is more complex to implement and/or appreciably more expensive than a conventional off-the-shelf dimmer switch. In view of the foregoing, described herein are apparatus and methods associated with lighting control devices that can provide easily-implementable and independent control of intensity and color temperature in lighting fixtures using only conventional AC wiring (such as common 12/2 or 14/2 NM-B wire). Existing facility wiring is sufficient to implement such lighting control, and apparatus installation is no more complex than that required for a conventional dimmer switch.

More generally, the inventive subject matter disclosed herein relates to apparatus and methods for implementing an information communication protocol that can provide independent control of at least two operational characteristics in an AC-wired device over conventional AC wiring. In multiple examples, an alternating current phase-cut waveform generated and/or decoded pursuant to the disclosed apparatus and methods provides power to operate the device and also conveys at least first and second information to independently control two or more adjustable operating characteristics in the device. The first and second information may be encoded in first and second properties of an alternating current modified phase-cut waveform and conveyed concurrently in each cycle of one or more cycles of the waveform. Example waveform properties include, but are not limited to, average cycle-to-cycle power, ON-time within a cycle, OFF-time within a cycle, phase-cut phase angle within a cycle, and modulations of any one of these properties.

Although the various implementations described herein pertain mainly to controlling lighting fixtures, the inventive methods and apparatus for communicating information over conventional AC wiring may be used with other types of devices or loads, in which phase-cut waveforms may be used to convey a change in two or more operating characteristics of the other devices/loads. Such devices can include, but are not limited to, adjustable heating systems (controlling heating element current and fan speed and/or fan direction for heat distribution, for example), adjustable cooling systems (controlling refrigeration, fan speed, and/or fan direction), a red, green, blue or other color projector that projects an image or pattern, and electric motors (controlling motor speed and coolant flow to the motor, for example). As may be appreciated from the following description of multiple example implementations, the inventive methods and apparatus for communicating information comprise conveying first control information and second control information as two independently adjustable parameters in a modified phase-cut waveform that can deliver the first and second control information, and power for operating a device, over conventional AC wiring. In some example implementations, with digital encoding of information onto the phase-cut waveform, the number of operating characteristics that can be controlled can be more than two. For example, digital data frames can include identifiers to associate a command in a data frame with a particular operating characteristic. Decoding algorithms at the device receiving the waveform can detect the identifiers and route the command appropriately. The communication methods and apparatus may be used to control, at least in part, other household appliances.

Some implementations described herein relate to a lighting circuit comprising an input to receive an alternating current (AC) modified phase-cut waveform having multiple cycles including a plurality of ON-times and a plurality of phase angles, wherein each cycle of the multiple cycles includes two or more ON-times and two or more phase angles. The lighting circuit further comprises a rectifier to rectify the modified phase-cut waveform; an AC-to-DC converter connected to the rectifier; and a flyback controller arranged to sense the modified phase-cut waveform or a first signal representative of the modified phase-cut waveform and control the AC-to-DC converter to output an amount of DC power that is based upon at least one ON-time of the plurality of ON-times and/or at least one phase angle of the plurality of phase angles in the modified phase-cut waveform or the first signal. According to some implementations, the lighting circuit also comprises two or more LED lighting sources connected to an output of the AC-to-DC converter and having different spectral emission characteristics; a current controller connected to at least one of the two or more LED lighting sources to control relative amounts of current flowing through the LED lighting sources; and a controller arranged to receive a second signal representative of the modified phase-cut waveform and to detect modulations in the plurality of ON-times and/or plurality of phase angles from the second signal, wherein the modulations encode correlated color temperature (CCT) information and are temporary deviations from a current average ON-time determined from the plurality of ON-times or a current average phase angle determined from plurality of phase angles.

Some implementations relate to an LED driver comprising an input to receive an alternating current modified phase-cut waveform that carries power to operate the LED driver and encodes intensity information and correlated color temperature (CCT) information; an AC-to-DC converter connected to the input; and a flyback controller coupled to the input and to the AC-to-DC converter, the flyback controller arranged to control an amount of power output by the AC-to-DC converter based on the intensity information detected by the flyback controller from the modified phase-cut waveform or a first signal representative of the modified phase-cut waveform. The LED driver can further include a controller to decode the CCT information from the modified phase-cut waveform or a second signal representative of the modified phase-cut waveform and output at least one modulated signal having a signal characteristic that is based on the decoded CCT information.

Some implementations relate to a method of operating a lighting fixture. The method can include acts of receiving at the lighting fixture an alternating current modified phase-cut waveform that carries power to operate the lighting fixture and conveys correlated color temperature (CCT) control information and intensity control information; detecting with a flyback controller at the lighting fixture the intensity control information from the modified phase-cut waveform; controlling, by the flyback controller, an amount of the power provided to two or more lighting sources in the lighting fixture based upon the detected intensity control information; decoding, with a controller at the lighting fixture, the CCT control information from the modified phase-cut waveform; and controlling, with the controller, relative portions of the power that are provided to the two or more lighting sources.

Some implementations relate to an apparatus to control a device having a first adjustable operational characteristic and a second adjustable operational characteristic. The apparatus may include an input to receive an alternating current (AC) modified phase-cut waveform having multiple cycles, wherein at least one cycle of the multiple cycles concurrently conveys in each cycle first information for controlling the first adjustable operational characteristic of the device and second information for controlling the second adjustable operational characteristic of the device. The apparatus can also include at least one controller, coupled to the input and configured to: detect a first property of the AC modified phase-cut waveform to determine the first information from the first property; and detect a second property of the AC modified phase-cut waveform to determine the second information from the second property, wherein the AC modified phase-cut waveform further provides operating power for the at least one controller.

Some implementations relate to a lighting circuit comprising an input to receive an alternating current (AC) phase-cut waveform having multiple cycles including a plurality of ON-times and a plurality of phase angles, wherein each of the multiple cycles includes two or more ON-times and two or more phase angles. The lighting circuit can also include a rectifier to rectify the phase-cut waveform; an AC-to-DC converter connected to the rectifier; two or more LED lighting sources connected to an output of the AC-to-DC converter and having different spectral emission characteristics; a current controller connected to at least one of the two or more LED lighting sources to control relative amounts of current flowing through the LED lighting sources; a controller having at least one output connected to the current controller; and a charge-storage circuit connected to an input/output data port of the controller. The controller may be configured to: detect, from an amount of voltage read from the charge-storage circuit, one or more temporary power interruptions to the lighting circuit, each lasting within a threshold amount of time; and identify at least one command to be executed by the controller based upon the one or more temporary power interruptions.

Some implementations relate to a device controller comprising an input to receive an AC waveform; a phase cutter connected to the input to produce a modified phase-cut waveform from the received AC waveform that carries power to operate an apparatus connected to the device controller; a controller connected to the phase cutter; a first input channel to provide first control information to the controller; and a second input channel to provide second control information to the controller, wherein the controller is configured to operate the phase cutter to produce the modified phase-cut waveform that conveys the first control information and the second control information in the modified phase-cut waveform such that the power between successive cycles of the modified phase-cut waveform that convey the first control information and the second control information does not vary by more than 1% when conveying the second control information to the apparatus.

Some implementations relate to a method of controlling an apparatus over AC wiring. The method can include acts of: receiving, at a controller over the AC wiring, an AC waveform; receiving, at the controller, first control information to change a first operational characteristic of the apparatus from a first setting to a second setting from among a plurality of first possible settings numbering more than two; receiving second control information to change a second operational characteristic of the apparatus from a first setting to a second setting from among a plurality of second possible settings numbering more than two; and producing a modified phase-cut waveform from the AC waveform that provides AC power to power the device and that conveys the first control information and the second control information as two independently adjustable parameters in the modified phase-cut waveform such that the power between successive cycles of the modified phase-cut waveform that convey the first control information and the second control information does not vary by more than 1% when conveying the second control information to the apparatus.

Some implementations relate to a circuit to control a device having a first adjustable operational characteristic. The circuit may include an input to receive an alternating current (AC) modified phase-cut waveform having multiple cycles, wherein at least one cycle of the multiple cycles each concurrently conveys first information for controlling the first adjustable operational characteristic of the device and second information for controlling a second adjustable operational characteristic of the device. The circuit can further include a power supply to provide power derived from the modified phase-cut waveform for powering the device; and a controller arranged to receive a signal representative of the modified phase-cut waveform and detect modulations in a first property of the modified phase-cut waveform over a sequence of successive cycles of the multiple cycles that together encode the first information, wherein the modulations do not change cycle-to-cycle average power by more than 1% between successive cycles of the sequence of successive cycles.

Some implementations relate to a device having a circuit comprising: an input to receive an alternating current (AC) modified phase-cut waveform having multiple cycles including a plurality of ON-times and a plurality of phase angles, wherein each cycle of the multiple cycles includes two or more ON-times and two or more phase angles, wherein the modified phase-cut waveform carries power to operate the device and conveys first information to control a first operational characteristic of the device and second information to control a second operational characteristic of the device. The circuit can further include a controller arranged to receive a signal representative of the modified phase-cut waveform and detect modulations in the plurality of ON-times or plurality of phase angles, wherein the modulations encode the second information as temporary deviations from a current average ON-time or current average phase angle and wherein the modulations do not change the power by more than 1% between successive cycles of the multiple cycles that convey the second information.

Some implementations relate to a method of operating a device connected to AC wiring. The method can include acts of: receiving, at the device, a modified phase-cut waveform over the AC wiring that conveys first control information and second control information and provides power to power the device; detecting from the modified phase-cut waveform, with a first circuit at the device, the first control information; changing, based upon the first control information, a first operational characteristic of the device from a first setting to a second setting from among a plurality of first possible settings numbering more than two; decoding, with a controller at the device, from the modified phase-cut waveform the second control information; and changing, based upon the second control information, a second operational characteristic of the device from a first setting to a second setting from among a plurality of second possible settings numbering more than two, wherein the second operational characteristic is changed independently of the change to the first operational characteristic.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally and/or structurally similar elements).

Figure 17A:
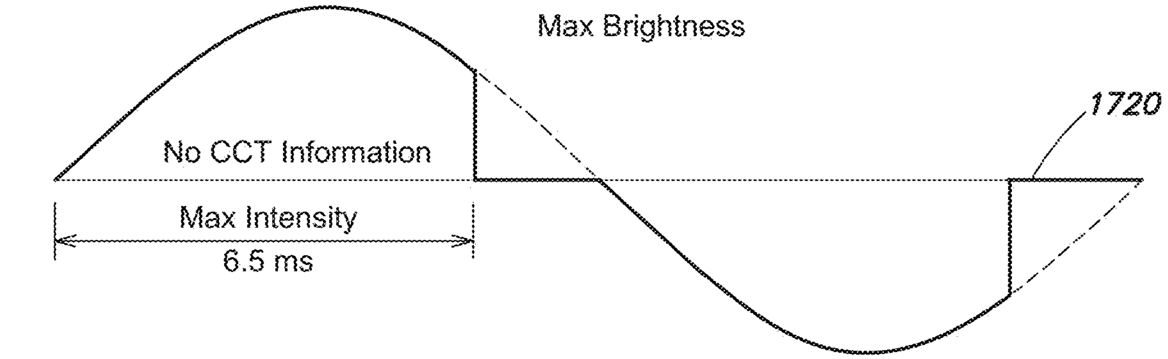
Figure 17B:
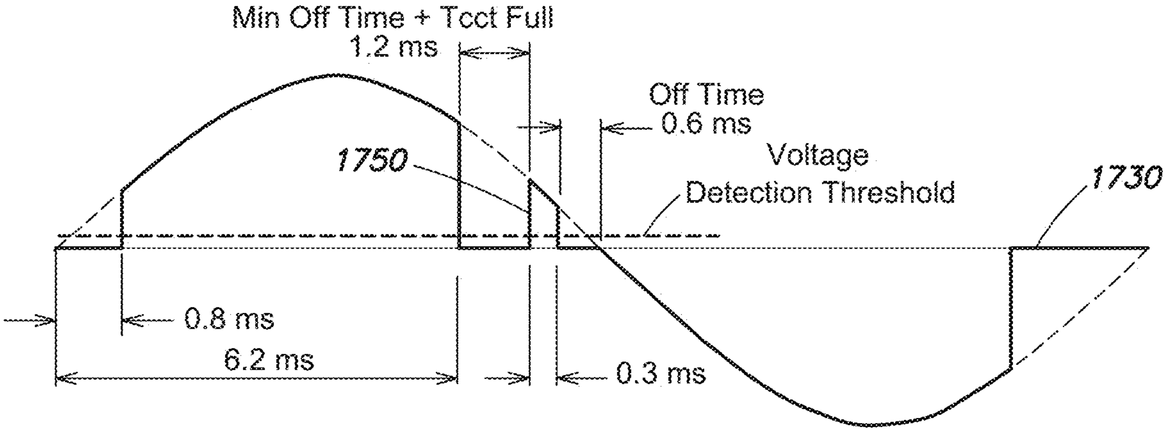
Figure 17C:
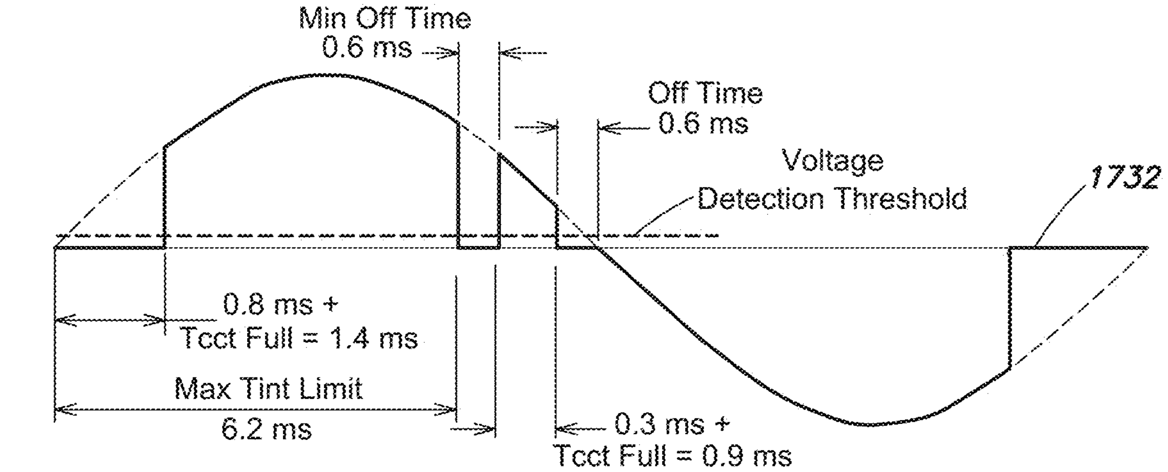

FIG. 17A, FIG. 17B, and FIG. 17C illustrates modified phase-cut waveforms associated with a method of encoding CCT information in an additional conduction pulse and conveying intensity control information, where the intensity setting is at a maximum value.

Figure 17D:
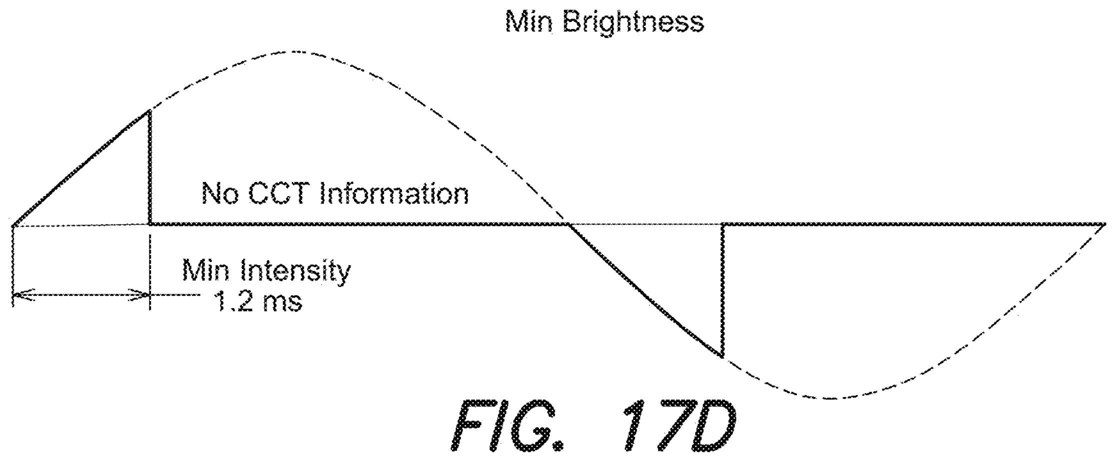
Figure 17E:
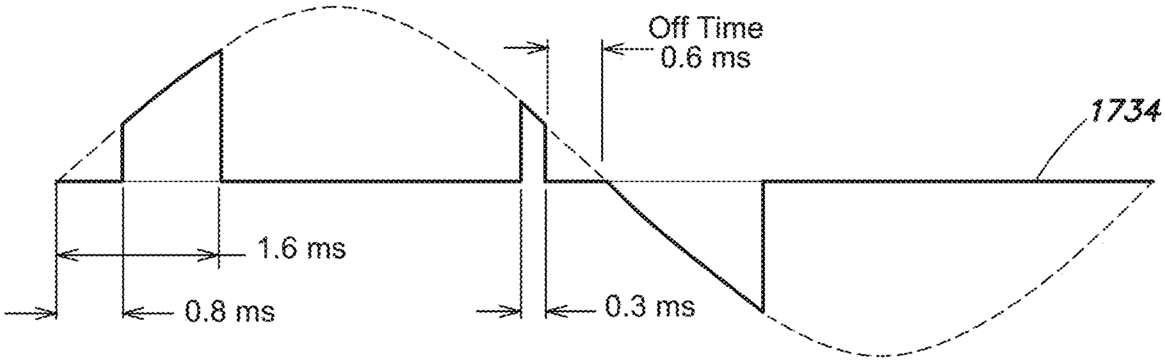
Figure 17F:
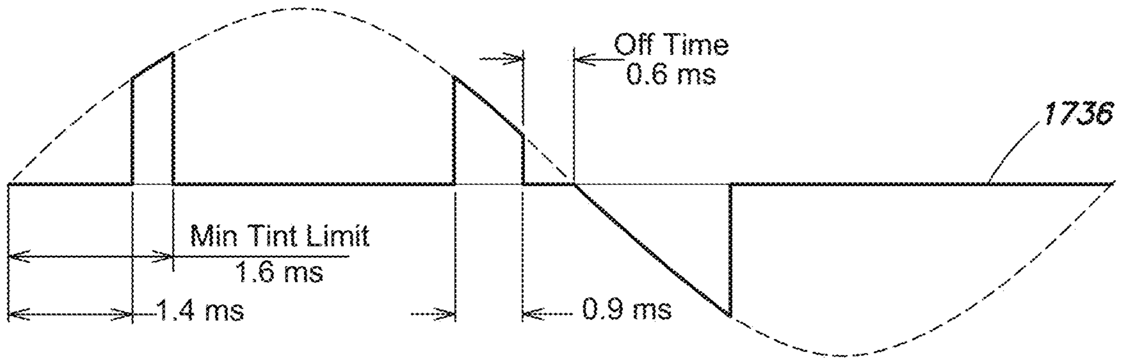

FIG. 17D, FIG. 17E, and FIG. 17F illustrates modified phase-cut waveforms associated with a method of encoding CCT information in an additional conduction pulse and conveying intensity control information, where the intensity setting is at a minimum value.

Figure 18:
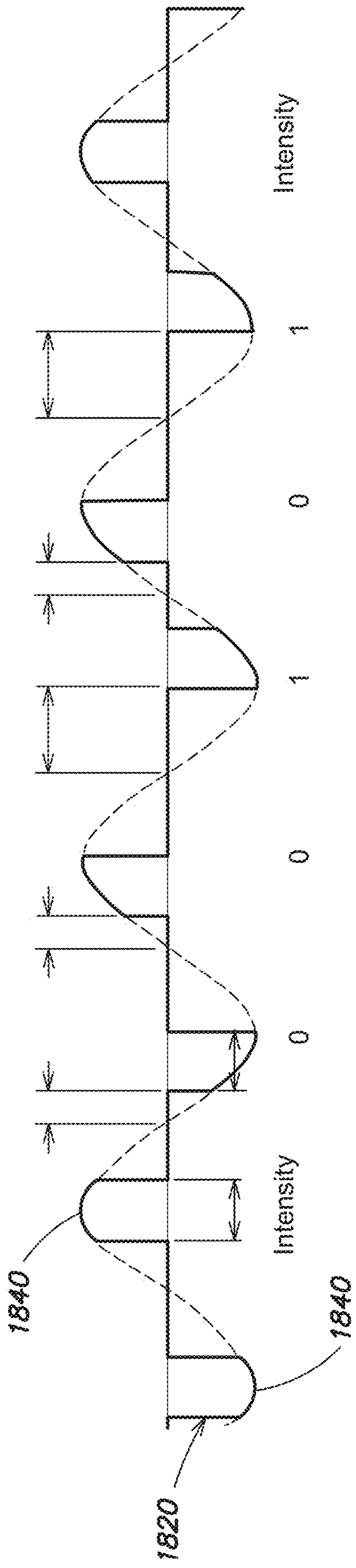

FIG. 18 illustrates a modified phase-cut phase-cut waveform associated with a method of digitally encoding CCT information as shifts in the conduction pulses and conveying intensity control information in an average ON-time of the waveform's half-cycles.

DETAILED DESCRIPTION

The inventors have recognized and appreciated that a desirable feature for LED lighting is to provide the ability to a user to easily and controllably vary the correlated color temperature independently of, and in addition to, controlling the intensity of the light. Correlated color temperatures for lighting applications may range from 1800 K (considered "warm" lighting having an amber hue) to 6500 K (considered "cool" lighting appearing whitish with possibly a blueish hue). Control of CCT can be achieved in LED lighting fixtures by mixing light from two or more LED sources that emit at different colors or color temperatures (i.e., have different spectral emission characteristics).

The phrase "color temperature" may be used herein as an abbreviated form of "correlated color temperature." The meaning should be clear to one of ordinary skill in the art from the context in which the phrase is used. "Correlated color temperature" or "CCT" as used herein refers to the emission of light having an apparent color nearest an isothermal line drawn on the 1960 CIE uniform chromaticity space that intersects perpendicularly the locus of points for blackbody radiation at a chromaticity coordinate that corresponds to a temperature of the blackbody radiator. For example, a blackbody radiator heated to 4000 K will emit radiation having an apparent color to a viewer. The apparent color can be located in the CIE chromaticity space with two chromaticity coordinates (u, v). An isothermal line running through (u, v) will include additional chromaticity coordinates. An emitter that emits such that its chromaticity coordinates (ue, ve) lie on the isothermal line that includes (u, v) is said to have a CCT value of 4000 K.

Independent control of intensity and CCT can be preferable to many users over conventional so-called "warm-dimming" of LED lighting fixtures. In warm-dimming, the CCT can be varied at the same time as, and dependent upon, the change in intensity of the light. For example, an 1800 K color temperature (warm lighting) may be achieved only at low light intensity and a 6500 K color temperature achieved only at high light intensity. Color temperatures between these values may be scanned through in a factory-programmed manner as the intensity of the light is varied. However, some users may prefer a dependent adjustment of color temperature between other CCT values or with the values reversed. For example, some users may desire 1800 K CCT at high intensity from lighting fixtures for a period of time.

As used herein, a "lighting fixture" can include one or more "lighting sources." A "lighting source" emits light of a particular color or color temperature. A lighting source can include one or more emitters that collectively emit light at the particular color or color temperature. Controlling the relative amounts of emission from each lighting source controls the overall or collective color temperature emitted from the lighting fixture. Although LEDs are mainly described herein as examples of emitters, the inventive embodiments are not limited to LEDs only. Other emitters (e.g., incandescent, halogen, fluorescent, neon) may be included additionally or alternatively in a lighting fixture.

The present disclosure is directed to apparatus and methods for adjusting independently the intensity and color temperature of light output by a lighting fixture. The intensity and CCT can be adjusted independently of one another using a lighting controller and existing or conventional AC wiring. In some examples described herein, such lighting control can be implemented using modified phase-control technology to produce a modified phase-cut waveform. In inventive aspects, CCT information is encoded onto an AC phase-cut waveform that also conveys intensity control information and provides power to operate one or more lighting fixtures. The CCT information may be encoded into one or both of the AC half cycles in each cycle of the phase-cut waveform. At least one controller in communication with a lighting fixture can detect the encoded CCT information and output signals to control the relative outputs of light from two or more lighting sources within the lighting fixture and achieve a desired color temperature emission from the lighting fixture. The controller or controllers may be installed with, or packaged with, one or more lighting sources within the lighting fixture. In some cases, the controller(s) may be external to the lighting fixture.

1. Example Lighting Systems

Figure 1:
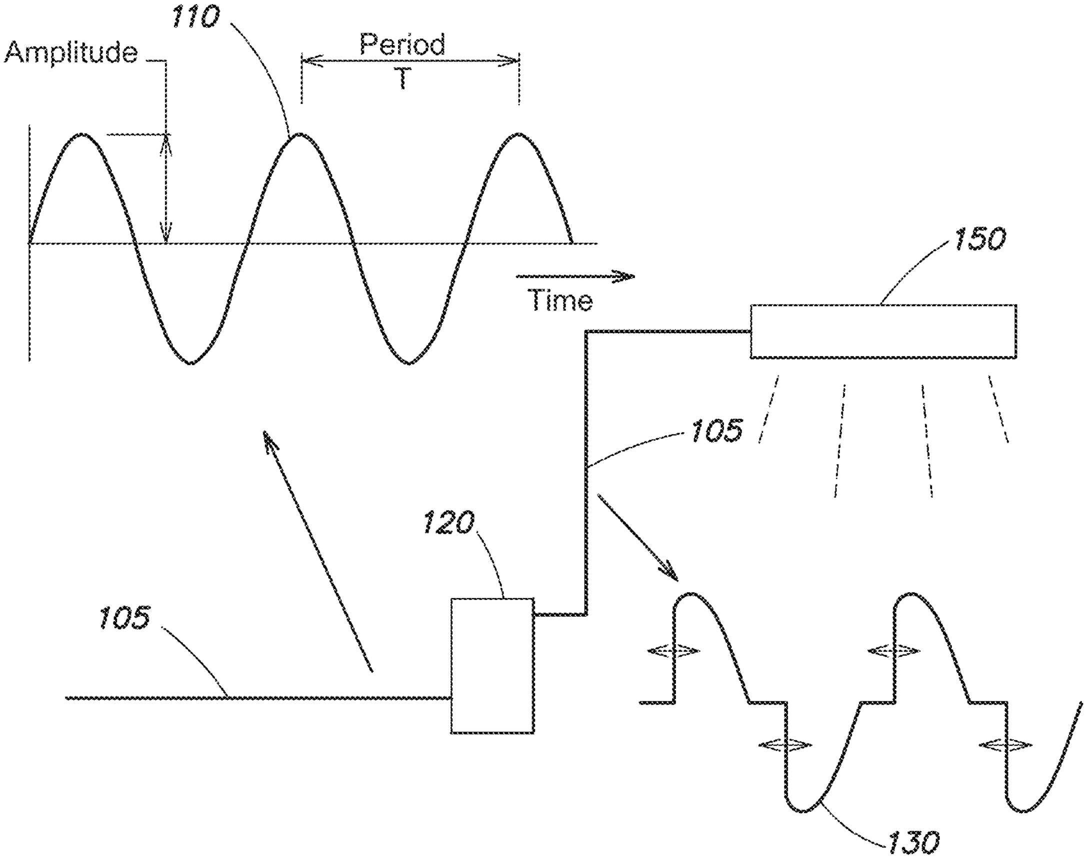
FIG. 1 (Prior Art)
FIG. 1 depicts conventional phase-controlled dimming of a lighting fixture.
Figure 2A:
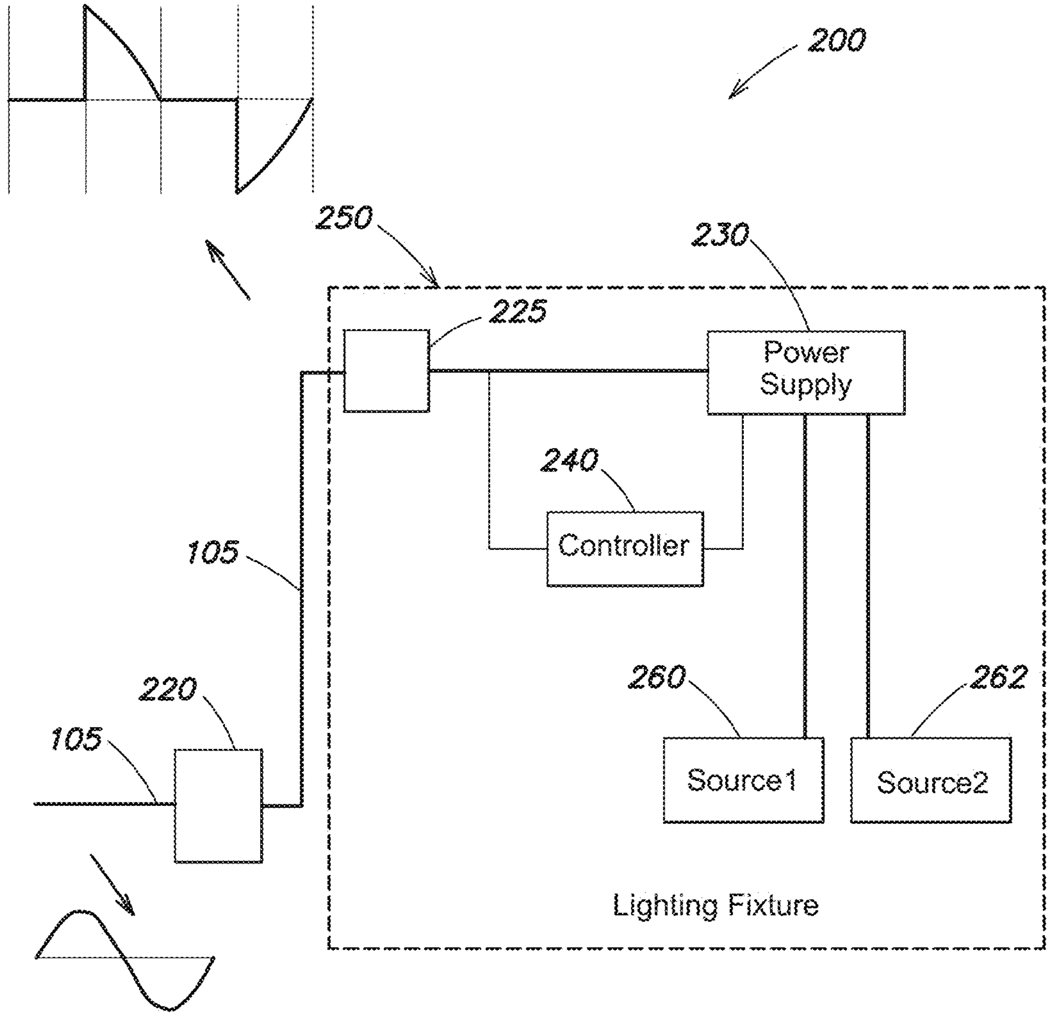
FIG. 2A depicts an example implementation of a lighting system having independent intensity and correlated color temperature control.

An example system 200 for independent CCT and intensity control of light output from a lighting fixture 250 is shown in FIG. 2A. The system can include a lighting controller 220 that receives power through conventional AC wire 105 (such as 14 gauge or 12 gauge NM-B in-wall wiring). There may be one or more lighting fixtures 250 (only one shown in the drawing) connected to the lighting controller 220 with one or more conventional AC wires. In some cases for residential and commercial applications, the lighting controller 220 may be wall-mounted in a standard junction box that can mount a conventional ON/OFF switch or dimmer 120. However, the lighting controller may be located elsewhere in some implementations (such as a control panel or console). In some cases, the lighting controller 220 may be mounted on an assembly (such as a floor lamp or desk lamp) that includes the lighting fixture 250. A two-wire AC line 105 can run from the lighting controller 220 to the lighting fixture 250 to provide power and variable control of light intensity and color temperature. Three-wire AC line may be used in cases where two lighting controllers 220 are included in the circuit to control one or more lighting fixtures from different points in a room or hallway, for example. For high-power applications, three-wire line may be used for three-phase AC supply.

The lighting fixture 250 can include input protection circuitry 225 to prevent or mitigate damage to lighting fixture components that could otherwise result from voltage and/or current surges in the AC line to the fixture. The lighting fixture 250 further includes a power supply 230 connected to the protection circuitry 225. The power supply 230 can receive a modified phase-cut AC waveform (described in further detail below) and output power suitable for driving two or more lighting sources 260, 262 within the lighting fixture. A controller 240 can monitor the received AC waveform (e.g., before or after the input protection circuitry 225 or after the power supply 230) to detect CCT and/or intensity-control information. The controller 240 may be in communication with the power supply 230 and output signals to control the amount of power delivered to the two or more lighting sources 260, 262. For example, the controller 240 may control the relative amounts of power delivered to the lighting sources.

Although the drawings illustrate only two lighting sources 260, 262, there can be three, four, or more lighting sources in a lighting fixture 250, wherein at least two or more of the lighting sources emit at a color temperature or emit a color spectrum that differs from the other lighting sources in the fixture. Additional lighting sources with different spectral characteristics may improve the ability to control the lighting fixture 250 to emit at one or more desired color temperatures. In some implementations, a lighting source may be an LED lighting source (e.g., discrete LEDs or in the form of an integrated chip-on-board (CoB) package). Example packaged LED chips are the Vcsta Series of Tunable White Array LED products available from Bridgelux, Inc. of Fremont, California. The LED lighting sources may be selected to be different color temperatures to cover a desired range of operation (e.g., from approximately or exactly 1800 K to approximately or exactly 6500 K, though other ranges and/or user-settable ranges are possible). Another example CCT range can be from 1800 K to 4000 K, for example.

Figure 2B:
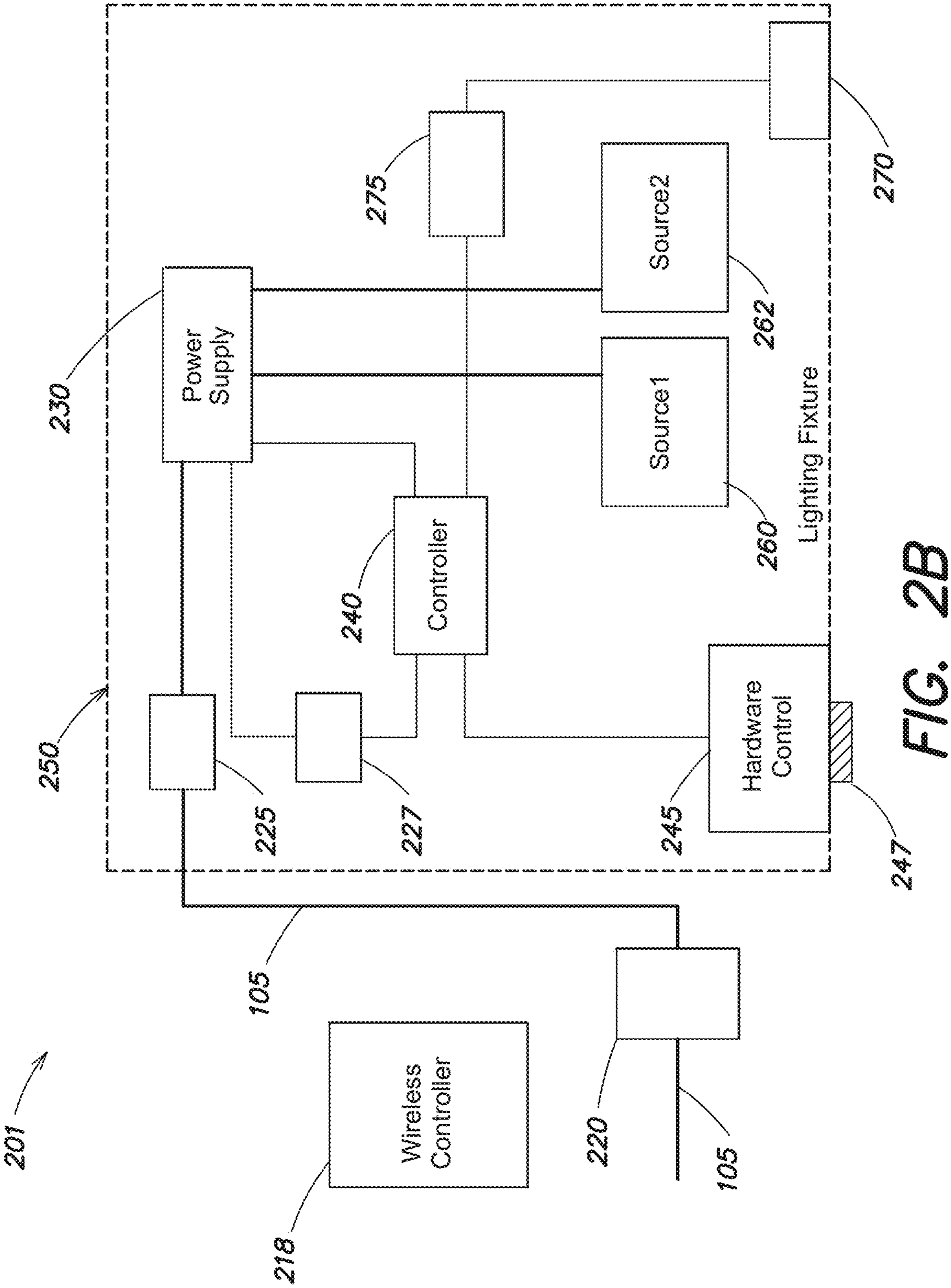
FIG. 2B depicts another example implementation of a lighting system having independent intensity and color temperature control.

Another example system 201 for controlling lighting intensity and color temperature is shown in FIG. 2B. In some cases, there may be interface circuitry 227 located between the input protection circuitry 225 and the controller 240 or between the power supply 230 and controller. The interface circuitry may receive an analog AC modified phase-cut waveform and output a signal representative of the waveform (e.g., digital or analog representations of the waveform) or output information about the waveform (e.g., phase, amplitude, ON-time, OFF-time) to the controller 240 for further processing. The interface circuitry 227 may include an analog-to-digital converter and/or components (e.g., a resistive voltage divider, waveform sampling components) to prepare a signal from the modified phase-cut waveform that can be processed by the controller 240.

The lighting system 201 may also include dedicated hardware control 245 with each lighting fixture 250. The hardware control 245 may comprise one or more electromechanical adjuster 247 (e.g., DIP switch, potentiometer, variable resistor with rotatable knob or sliding lever, etc.) that is used to set lighting color temperature or configure the lighting fixture 250. The lighting fixture may further include hardware for wireless communications to configure the lighting fixture, such as an antenna 270 and chip 275 to receive and process signals from the antenna. In some implementations, the lighting controller 220 may be configured to communicate wirelessly with a wireless device 218 for optional control of the lighting system 201. For example, the lighting controller 220 can include electronic components (antenna, transceiver, microcontroller or other processor) that enable wireless communication via Wi-Fi™, Bluetooth®, or another wireless communication protocol.

2. Waveforms for Conveying CCT and Intensity Information

Figure 3A:
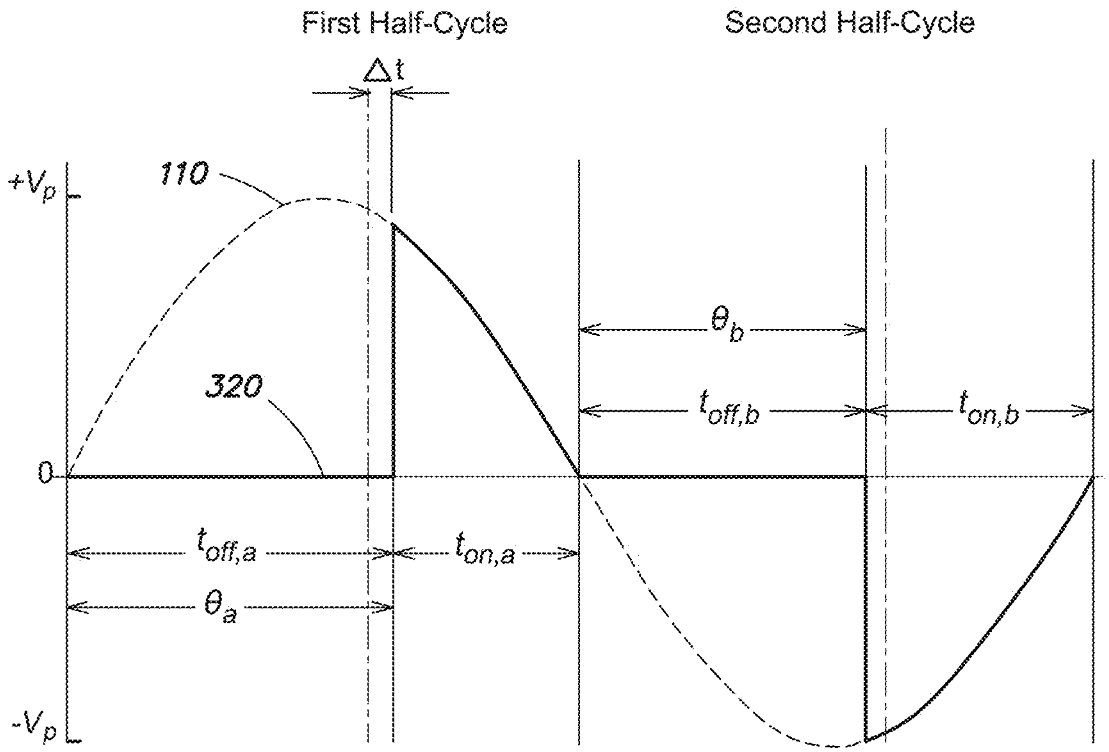
FIG. 3A illustrates a modified phase-cut waveform cycle that can encode CCT and intensity control information. The encoded information can be decoded by the lighting fixture of FIG. 2A or FIG. 2B.

CCT information and intensity control for controlling a lighting fixture 250 can be conveyed from a lighting controller 220 in a modified AC phase-cut waveform that also delivers power to operate the lighting fixture. A cycle of a modified phase-cut waveform 320 is depicted in FIG. 3A. There are multiple different ways in which CCT information and/or intensity control can be included in the modified phase-cut waveform, some of which are described in different embodiments below. The modified phase-cut waveform 320 can be output from the lighting controller 220 and produced from a conventional AC waveform 110 (indicated as the dotted waveform in FIG. 3A).

The inventors have recognized and appreciated that some implementations of CCT and intensity control may be achieved with reduced cost and complexity by utilizing the power within the modified phase-cut waveform 320 to control lighting intensity (e.g., by adjusting ON-times $t_{on,a}$ $t_{on,b}$ of the waveform) and by digitally encoding CCT information onto the waveform 320 as small modulations $\Delta t$ (e.g., between 50 microseconds and 200 microseconds) in the ON and OFF times. Referring to FIG. 2A and FIG. 2B, the power in the modified phase-cut waveform 320 (determined by ON-times $t_{on,a}$, $t_{on,b}$) is converted by the power supply 230 and determines the amount of total power delivered to the light sources 260, 262. The ON-times therefore determine the total output intensity of the lighting fixture 250. A shorter ON-time results in less power being delivered to the lighting fixture 250 and less light output from the lighting fixture.

The modulations in the ON and OFF times to convey CCT control information can be detected by the controller 240 and/or interface circuitry 227 and decoded by the controller to determine the relative outputs by the lighting sources 260, 262. Accordingly, these modulations can determine the CCT output from the lighting fixture 250. Such an approach may be less complex and costly to implement than an approach where, for example, both CCT and intensity control information are encoded as digital data onto a phase-cut waveform.

For stable and reliable intensity control of the lighting fixture 250, it can be preferrable for the phase-cut waveform 320 to vary from a minimum ON-time to a maximum ON-time. For a 60 Hz AC supply, the minimum ON-time for $t_{on,a}$ or $t_{on,b}$ may be between approximately or exactly 1.2 ms and approximately or exactly 1.8 ms. The maximum ON-time for $t_{on,a}$ or $t_{on,b}$ may be between approximately or exactly 6.2 ms and approximately or exactly 7.5 ms.

According to a first implementation, a full cycle of a modified phase-cut waveform 320 (such as that depicted in FIG. 3A) can be used to encode a digital bit. Utilization of a full cycle to encode a digital bit can involve modulation of the ON and OFF times in the first half-cycle (positive half-cycle in the illustrated example) and in the second half-cycle (negative half-cycle) of the waveform's periodic cycle. In the illustrated example of FIG. 3, the first half-cycle is modulated such that its ON-time $t_{on,a}$ is reduced by the modulation time Δt from an average ON-time (indicated by the vertical dot-dashed line), and the second half-cycle is modulated such that its ON-time $t_{on,b}$ is increased by approximately or exactly the same amount of time Δt. By reducing the ON-time in one half-cycle and increasing the ON-time in the other half-cycle, the amount of power in each cycle can remain approximately or exactly constant from cycle to cycle even though different bit values or no bit values are encoded onto the waveform 320. For example, the amount of power variation from cycle to cycle during transmission of digital data can be no greater than 2% in some cases, no greater than 1% in some cases, and yet no greater than 0.5% in some cases. In some of these cases, the amount of power variation may be as small as 0.01% or even smaller. In some cases, the amount of power variation may be less than or equal to 0.02%. As such, there may be no lighting flicker observed by the unaided eye from the lighting fixture 250. Further, keeping the value of Δt small may also help avoid potential issues with power supply components that convert an asymmetric AC waveform to DC power.

For some implementations, larger values of Δt may be used (e.g., larger than 200 microseconds). In such implementations, additional filtering may be employed at the lighting fixture's power converter to reduce ripple on the converted DC power. For example, larger capacitors may be used in a filter or a more complex ripple-reduction circuit than that described below may be used.

When a full cycle of the modified phase-cut waveform 320 is used to encode one digital bit as described above, the direction of modulations shown in the example of FIG. 3A may be used to encode a logic LO or '0' bit. The converse of the modulations may be used to encode a logic HI or '1' bit (i.e., ON-time is increased in the first half-cycle and decreased in the second half-cycle). Of course, in some implementations the bit encoding may be reversed from that described above (i.e., the waveform of FIG. 3A may instead encode a '1' bit).

By utilizing average ON-times and modulating ON-times (or phase angles) to encode digital data, the AC line that conveys power to the lighting fixture 250 can convey two or more pieces of information concurrently to allow independent control of operating characteristics of the lighting fixture. For example, output intensity can be controlled by the current average ON-times or current average phase angles and CCT can be controlled by a digitally-encoded command using modulations in the average ON-times or current average phase angles (as described further below in connection with Table 1.) Since digital encoding can be implemented, additional commands can be transmitted for independent control of additional operating characteristics. Such communication and control is not limited to lighting fixtures only and may be used for other devices connected to conventional AC wiring.

Figure 3B:
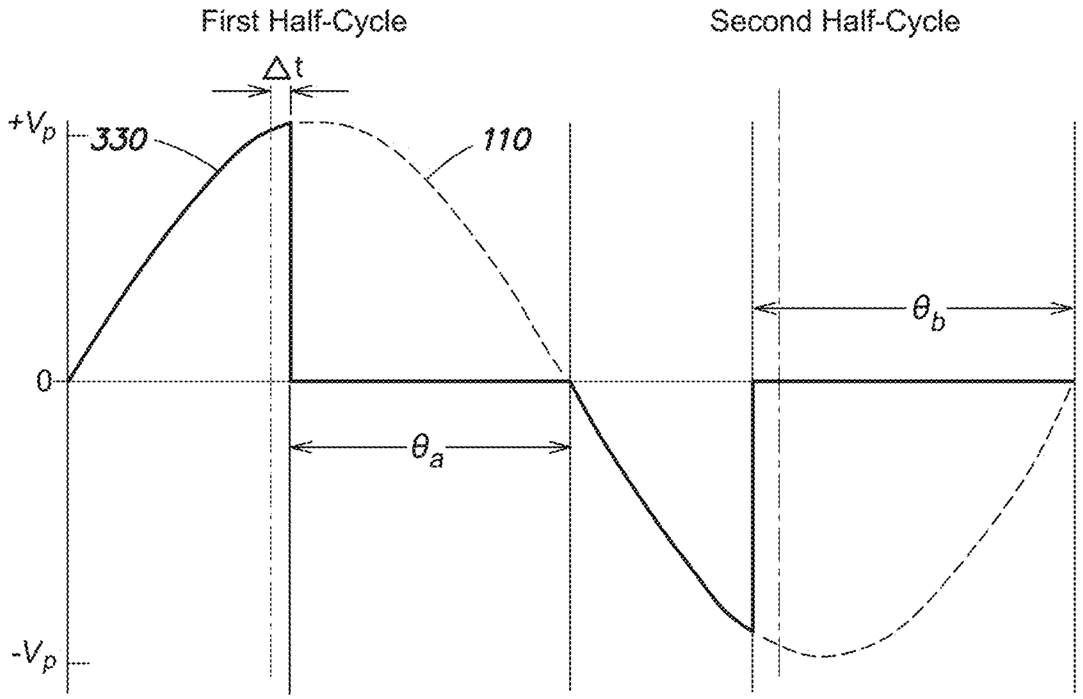
FIG. 3B illustrates a modified phase-cut waveform cycle that can encode CCT and intensity control information. The encoded information can be decoded by the lighting fixture of FIG. 2A or FIG. 2B.

The waveform of FIG. 3A depicts forward phase control of the modified phase-cut waveform (leading edge is chopped). Some implementations may use reverse phase control instead, of which an example modified phase-cut waveform 330 is depicted in FIG. 3B. Some implementations may use center phase-cut waveforms described below. An advantage of using such modified phase-cut waveforms 320, 330 is that the lighting fixture 250 may still be controlled and operated with a conventional dimmer (e.g., with control of intensity output only by the dimmer).

It is also possible to encode digital information in half-cycles of the modified phase-cut waveform 320, 330 instead of full cycles. For example, the first half-cycle of the waveform in FIG. 3A may be used to encode a digital '0' bit and the second half-cycle may be used to encode a digital '1' bit or vice versa.

In some cases, CCT information may be conveyed digitally to the controller 240 using first half-cycles or first full cycles of a plurality of successive cycles and intensity control information may be conveyed digitally using second half-cycles or second full cycles of the plurality of successive cycles (e.g., in a time-division multiplexed manner). In such cases, the amount of time-averaged power output from the lighting controller 220 may be constant during data transmission and the controller 240 and power supply 230 are configured to adjust both a total amount of power delivered to the lighting sources 260, 262 and their relative amounts in response to the detected CCT and intensity control information.

In some cases, the light controller 220 may be noisy and exhibit jitter in the ON and OFF times from cycle to cycle. Such jitter can occur with triacs that may be used to chop the AC waveform in the lighting controller 220. To improve communication of digital values, N-cycle redundancy may be employed. For example, a same bit value may be transmitted for N cycles of the modified phase-cut waveform 320, 330, where Nis an integer value of 2 or greater. The controller 240 can be configured to evaluate the bit value for the N cycles and select the majority transmitted bit for the N cycles as the communicated bit value. Additionally or alternatively, other bit error reduction techniques can be employed such as cyclic redundancy check (CRC). Bit error reduction techniques can be used for the digital encoding methods described in connection with FIG. 3A and FIG. 3B and with alternative encoding methods described below.

To communicate a color temperature setting command or intensity setting command (comprising M bits), the lighting controller 220 may encode the M bits onto M full cycles or M half-cycles of the modified phase-cut waveform 320, 330 (or onto M×N full cycles or half-cycles if redundancy is used). Additional bits may be used in lighting control commands such as start bits, stop bits, parity bits, CRC bits, etc. The command may be sent by the controller 220 in response to a user adjustment made using the lighting controller 220. In some cases, the command may be sent periodically (e.g., after every time interval having a value between 0.5 second and 600 seconds) even though no changes in lighting settings are made, so that the controller 240 can periodically confirm that the current lighting settings are to be maintained.

The bit encoding for a digital command may be in immediately successive waveform cycles when transmitted by the lighting controller 220. In alternative implementations, the bit encoding may be in waveform cycles that are separated by one or more "idle" cycles. An idle cycle of the modified phase-cut waveform 320, 330 may exhibit the average ON and OFF time and have no modulation of the ON and OFF time ($\Delta t=0$). Interspersing idle cycles among cycles encoding digital bits may further reduce any potential lighting flicker that is output from the lighting fixture 250.

As mentioned above, there can be a benefit to encoding CCT information onto a modified phase-cut waveform 320 using a full cycle as depicted in FIG. 3A. Some lighting fixtures (such as the MR16 style LED lamp) use magnetic transformers to step down the AC voltage to a lower level that is suitable for driving the lamp. Magnetic transformers are commonly dimmed using forward phase control. Exposing such a transformer to a DC voltage component may result in the transformer primary winding saturating. A DC voltage component may be produced by step changes in the modified phase-cut waveform where the average ON-time changes during data transmission. When saturation occurs in the transformer's primary winding, a high current is drawn possibly overheating or damaging the transformer and fixture.

Unfavorable waveforms with DC components may be avoided by encoding CCT data using forward phase control and/or reverse phase control with opposing modulations of the waveform's ON-times (or waveform's phase angles) within each full cycle of the waveform when encoding digital bits, as depicted by the example in FIG. 3A. The phase angle $\theta_a$, $\theta_b$ can be taken as a measure of the phase-cut waveform's phase (within a half-cycle) from the first zero value or corresponding AC waveform's zero-crossing ($\theta=0$) to the phase at which the waveform rises or falls sharply to an ON value. However, phase angle may be measured in other ways (e.g., the angle over which the half cycle is providing power, the angle from a falling edge to a zero crossing in a reverse-cut waveform, as depicted in FIG. 3B). Encoding with opposing modulations (or opposite bit pairs) may also be referred to as Manchester encoding for which there is no or negligible variation from cycle-to-cycle in the current average phase angle (or current average ON-time) of the lighting controller's output (for a constant intensity setting) regardless of whether the lighting controller 220 is transmitting data or not. Further, the digital CCT data can be encoded by modulating the phase angles (ON-times) by small amounts (e.g., less than 200 microseconds). To improve reliability of digital transmissions, it can be beneficial to have a minimum amount of modulation $\Delta t$ that may be no less than 30 microseconds. By using Manchester encoding with small variations in the waveform's phase angles, a magnetic transformer in the system is not be adversely affected by the digital data transmission.

3. Example Lighting Circuits

An additional benefit of keeping the average phase angle delivered to the load constant during digital data transmission is that a simplified, single-stage constant-current flyback converter can be used in the power supply 230. The single-stage converter can control the brightness of the lighting fixture 250 based on the modified phase-cut waveform's ON-time or phase angle. As such, the controller 240 may not be tasked with processing to determine total intensity output from the lighting fixture, simplifying controller circuitry for some implementations.

Figure 4:
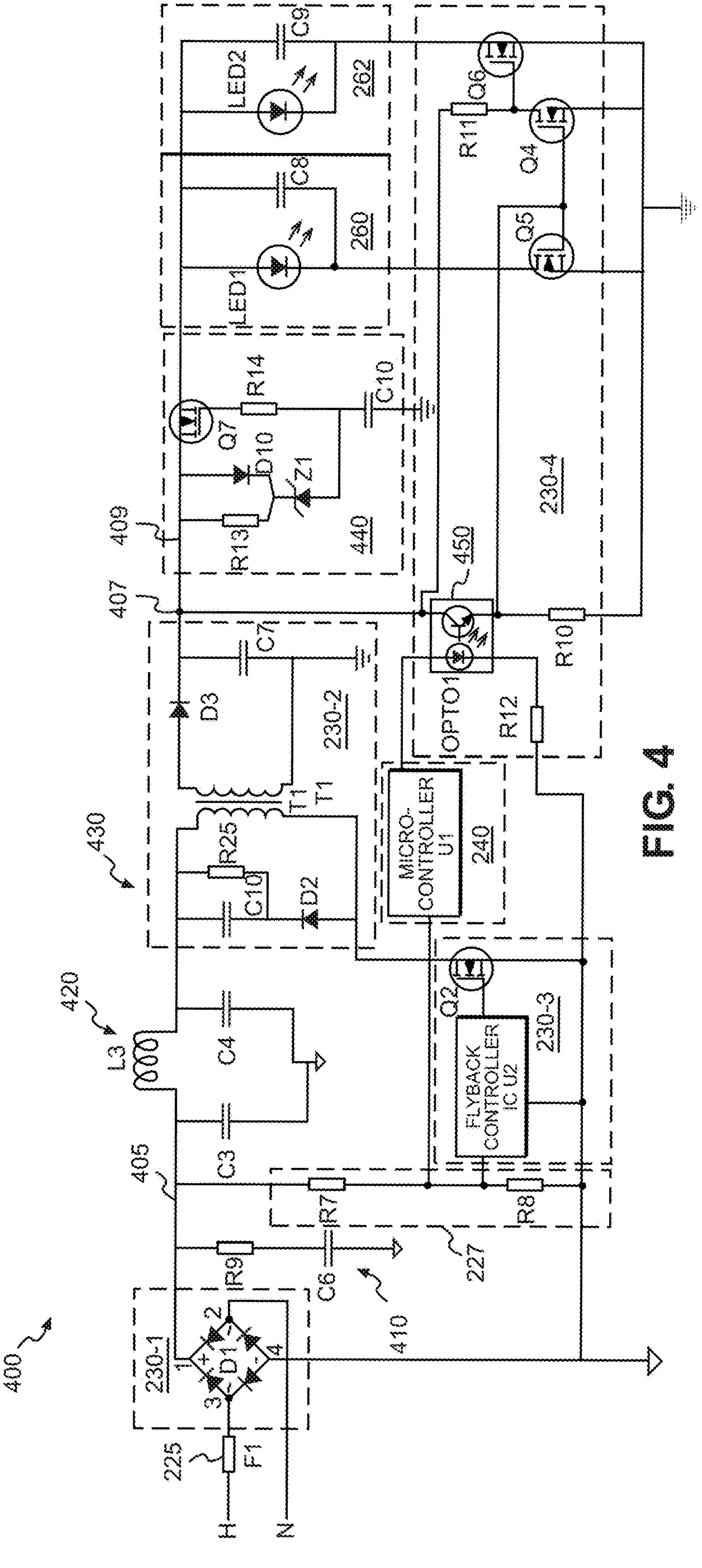
FIG. 4 is a schematic showing further details of a lighting circuit that may be included in the lighting fixture of FIG. 2A or FIG. 2B.

FIG. 4 illustrates a schematic for an example lighting circuit 400 that may be used to receive a modified phase-cut waveform 320, 330 from a lighting controller 220, decode CCT and intensity control information from the waveform, and control intensity and color temperature output from a lighting fixture 250. For the illustrated circuit, the brightness (total intensity output) of the lighting fixture 250 can be controlled by the circuit's flyback controller 230-3 directly. The controller 240 and a multiplexing current controller 230-4 can only be used to vary the color temperature of the lighting fixture. This topology can be advantageous from a cost and efficiency perspective over a two-stage supply design described below that uses a buck supply.

The lighting circuit 400 can include a controller 240, a power supply having components that are grouped in four sections in the illustration (230-1, 230-2, 230-3, 230-4), a bleeder circuit 410, a filter 420, a linear ripple-reduction circuit 440, and two LED lighting sources 260, 262. The power supply comprises a full-wave bridge rectifier 230-1, a converter 230-2, a flyback controller 230-3, and a current controller 230-4, each described in further detail below. The first lighting source 260 emits light having a first color or color temperature and the second lighting source 262 emits light having a second color or color temperature that is different from that of the first lighting source. Although only two lighting sources are depicted, some implementations may include three or more lighting sources. Protection circuitry 225 may be implemented with a fuse F1, for example, and interface circuitry 227 may be implemented with a resistive voltage divider R7, R8. The interface circuitry 225 may reduce voltage and/or current levels to levels suitable for the controller 240 and flyback controller 230-3. When used to power LED lighting sources, the lighting circuit 400 (minus the lighting sources 260, 262) may be referred to as an "LED driver circuit" or simply "LED driver."

Figure 3C:
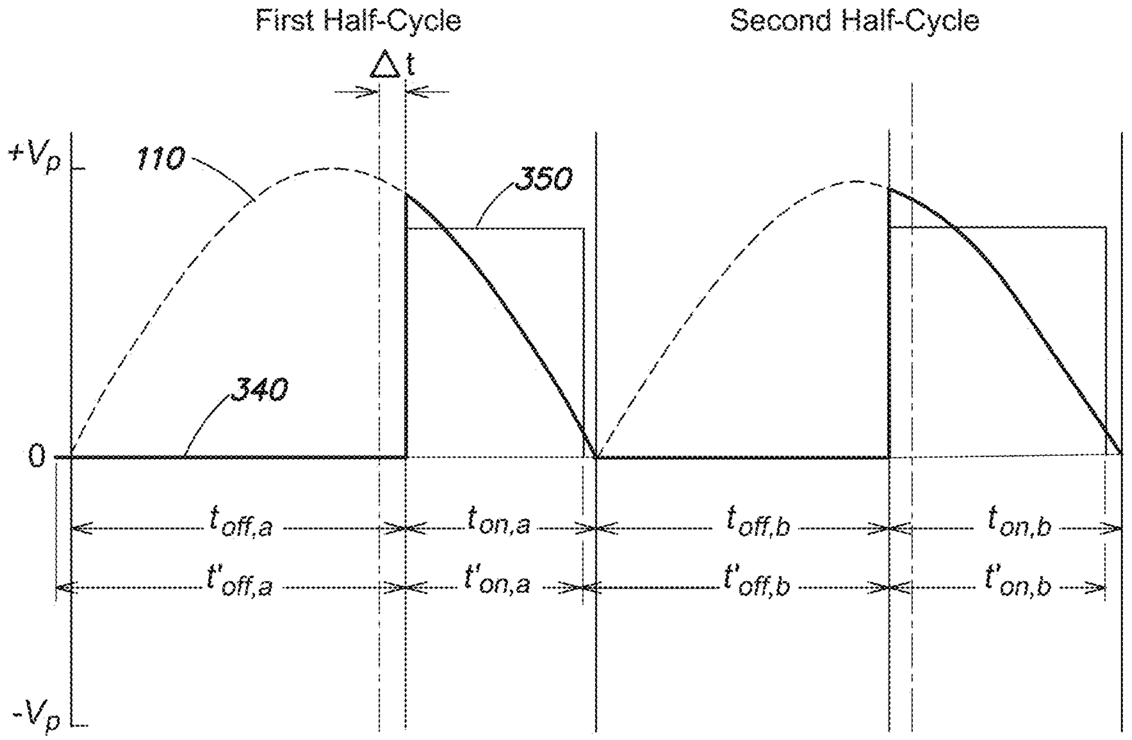
FIG. 3C is a rectified version of the waveform of FIG. 3A.

The full-wave bridge rectifier 230-1 can convert the modified phase-cut waveform 320, 330 from a bipolar waveform (extending to positive and negative voltages) to essentially a unipolar waveform (e.g., extending to only positive voltages, or in some cases to only negative voltages). The four diodes D1 in the bridge rectifier 230-1 are connected to provide forward current paths from node 1 of the rectifier through the lighting circuit to node 4 of the rectifier when the AC hot line H has a potential above the AC neutral line N and when the AC hot line has a potential below the neutral line. An example of the rectified waveform 340 is shown in FIG. 3C, which may be produced from the modified phase-cut waveform of FIG. 3A and output from the rectifier 230-1 to the input voltage line 405.

A passive bleeder circuit 410 can be included after the rectifier 230-1 to draw a sufficient amount of current when a lighting controller's triac or a conventional dimmer's triac turns on. The amount of current drawn by the passive bleeder can ensure that the triac latches in an ON state. The bleeder circuit 410 may be connected between the input voltage line 405 (connected to node 1 of the rectifier 230-1) and a reference potential, such as ground. The bleeder circuit 410 may comprise a resistor R9 connected in series with a capacitor C6.

A filter 420 (sometimes referred to as a "post EMI filter") can be included to help reduce high-frequency switching noise and ripple on the subsequently converted DC output. The filter 420 may be a pi-filter having a first capacitor C3 and a second capacitor C4 connected in parallel (and to opposing ends of an inductor L3) between the input voltage line 405 and a reference potential. The inductor L3 conducts the filtered, rectified waveform to a converter 230-2 of the power supply. The filter 420 may pass low frequencies (e.g., below 500 Hz) to the converter 230-2.

The power supply's converter 230-2 can include a transformer T1 to step down (or in some cases, step-up) the input voltage to a level that is suitable to drive the lighting sources 260, 262. The converter 230-2 can also include a capacitor C7 to integrate the transformed waveform and provide a DC output to node 407. A snubber circuit 430 can be connected to the primary winding of the transformer T1 and comprise a diode D2 connected to a parallel combination of a resistor R25 and capacitor C10. The snubber circuit can suppress voltage spikes that may otherwise be applied across the primary winding of the transformer T1 due to the primary winding's inductance and switching operations in the power supply 230. During operation the converter 230-2 receives a rectified waveform 340 that has been filtered and outputs to node 7 a DC voltage that may include a small amount of ripple (e.g., less than +10% modulation of the DC voltage or even less than +5% modulation of the DC voltage).

To further reduce ripple on the DC voltage provided to the lighting sources 260, 262, a linear ripple-reduction circuit 440 can be connected to the output of the converter 230-2. The ripple-reduction circuit may also be referred to as a regulator. The ripple-reduction circuit can include a transistor Q7, resistor R13, diode D10, Zener diode Z1, capacitor C10, and resistor R14. A first circuit branch of the ripple-reduction circuit 440 includes the resistor R13 and diode D10 connected in parallel between the converted voltage line 409 and the cathode of the Zener diode Z1. The anode of the Zener diode connects to a first terminal of the capacitor C10 and the second terminal of the capacitor connects to a reference potential such as ground. The breakdown voltage of the Zener diode Z1 can be selected to determine an amount of headroom (voltage drop accommodated by transistor Q7) for the ripple-reduction circuit 440. Increasing the Zener's breakdown voltage increases an amount of voltage that can be dropped across transistor Q7 and increases the amount of voltage ripple across capacitor C7 that can be rejected by the ripple-reduction circuit (at the cost of dissipating power in Q7). For some implementations, the breakdown voltage of the Zener diode Z1 can be a value from 0.5 volt to 2 volts. A second circuit branch of the ripple-reduction circuit 440 includes the resistor R14 connected between a control terminal of the transistor Q7 and the first terminal of the capacitor C10. The transistor Q7 may be an n-FET that, when biased on, conducts DC voltage and current to the lighting sources 260, 262.

During operation, resistor R13 and capacitor C10 form an RC filter that develops a smooth, essentially ripple-free voltage on C10. Zener diode Z1 gives a voltage drop and the resulting voltage across capacitor C10 is the average voltage across capacitor C7 minus the Zener's voltage. The ripple-free reference voltage on capacitor C10 is applied to the gate of transistor Q7 which operates in its linear region. The resulting voltage on the source terminal of transistor Q7 (and the voltage applied to the light-emitting diodes LED1, LED2) is determined by the reference voltage on capacitor C10 minus the threshold voltage of transistor Q7. The voltage applied to an LED can be expressed as follows: $V_{LED}=V_{C10}-V_{th}$.

Since $V_{LED}$ is determined by $V_{C10}$ (which is essentially ripple free provided that the circuit is operating within its headroom) and by $V_{th}$, which is a constant, the voltage across the LEDs and subsequently the current through the LEDs are essentially ripple free as well. Using the ripple-reduction circuit 440 may reduce ripple on the DC voltage delivered to the lighting sources to less than +5% in some cases, less than ±2% in some cases, less than +1% in some cases, and yet less than +0.5% in some cases.

The linear ripple-reduction circuit 440 operates to only reduce the voltage on capacitor C7. If the ripple on capacitor C7 increases beyond the headroom of the circuit, (e.g., the combination of the Zener's breakdown voltage and the threshold voltage of transistor Q7) then transistor Q7 will no longer be in its linear operating state and ripple will begin appearing on the output voltage and LED current. Accordingly, capacitance for capacitor C7, Zener voltage for diode Z1, and transistor Q7 threshold voltage are selected to balance constraints of printed circuit board space (on which the circuit will be fabricated), power dissipation, and ripple rejection.

The linear ripple-reduction circuit 440 reduces the voltage ripple applied to the lighting sources 260, 262 and therefore reduces line-cycle modulation of the lighting sources. The ripple-reduction circuit can also allow the phase angle (or ON-time) on the rectified waveform 340 to fluctuate a small amount (e.g., up to 200 microseconds) for encoding digital data without any visually-noticeable fluctuation in light output from the lighting fixture 250. That is, any ripple that appears in the converter output from such modulation to encode digital data (as described above) can be ameliorated with the ripple-reduction circuit 440 to an extent that lighting flicker cannot be visually observed in the output of the lighting fixture 250. The ripple-reduction circuit 440 can also suppress fluctuations in the converter's output waveform that arise from the lighting controller 220 (e.g., from triac and or MOSFET misfirings on AC cycles in the lighting controller). Triacs and/or MOSFETs used to produce a modified phase-cut waveform 320, 330 can misfire, firing too early in a cycle or too late from a programmed firing time. Such misfirings might otherwise cause visible intensity modulations or flicker in the light output from the lighting fixture 250.

The inventors have recognized and appreciated that an additional benefit of the ripple-reduction circuit 440 is that it may obviate the need for current-holding circuitry in the lighting controller 220 that would otherwise be included to maintain a minimum current in the lighting controller or in the lighting circuit 400. In a conventional dimmer 120, a minimum amount of output current from the lighting controller 220 may be needed to maintain an output current above a triac's holding current so that the output current at low light-level settings does not collapse to a zero value (as described in U.S. Pat. No. 10,616,968, titled "Methods and Apparatus for Triac-Based Dimming of LEDs," filed Sep. 5, 2019, which is incorporated by reference in its entirety). The ripple-reduction circuit 440 may allow for occasional random current collapses to be tolerated by the lighting circuit 400 without producing visible flicker from the fixture's lighting sources 260, 262.

Although the lighting circuit 400 depicted in FIG. 4 includes the linear ripple-reduction circuit 440, it is also possible to implement the circuit without the ripple-reduction circuit 440. For example, the size of the integrating capacitor C7 could be increased by a factor of 5 or more to allow removal of the ripple-reduction circuit 440. When the ripple-reduction circuit is included in lighting circuit 400, the capacitance of capacitor C7 may be between 200 microfarads and 700 microfarads.

The power supply 230 in the lighting circuit 400 further includes a flyback controller 230-3 that determines the total amount of power delivered to the ripple-reduction circuit 440 and to the lighting sources 260, 262. As such, the flyback controller 230-2 controls the total intensity of light output from the lighting fixture 250. The determination of power delivered to the ripple-reduction circuit and lighting sources is based upon the modified phase-cut waveform 320, 330, which the flyback controller 230-2 can sense via the voltage-dividing resistors R7, R8, according to some implementations. The voltage dividing resistors may reduce the phase-cut waveform amplitude to a range that does not saturate the input of the flyback controller. The flyback controller 230-3 can include a transistor Q2 that is switched ON and OFF by the flyback controller to activate and de-activate the converter's transformer T1. For example, the flyback controller 230-3 operates and delivers energy from the primary winding to the secondary winding of T1 when there is a voltage present on the transformer's primary winding and transistor Q2 is turned on to provide a path for current from the primary winding back to the AC neutral wire N. For a modified and rectified phase-cut waveform 340, this means that the flyback controller 230-3 and primary winding of the converter's transformer T1 deliver energy to the secondary winding of the transformer while the lighting controller 220 and its modified phase-cut waveform 320, 330 are in a conducting state (i.e., during their ON-times). The amount of energy or power delivered to the secondary will depend on the duration of the ON-times and a pulsed waveform output by the flyback controller to transistor Q2. No energy is delivered to the secondary winding of transformer T1 while the lighting controller is in a non-conducting state and the phase-cut waveform voltage drops to zero. In this way, the flyback controller 230-2 regulates the amount of the rectified waveform 340 that gets converted to DC output by the transformer T1.

Figure 5:
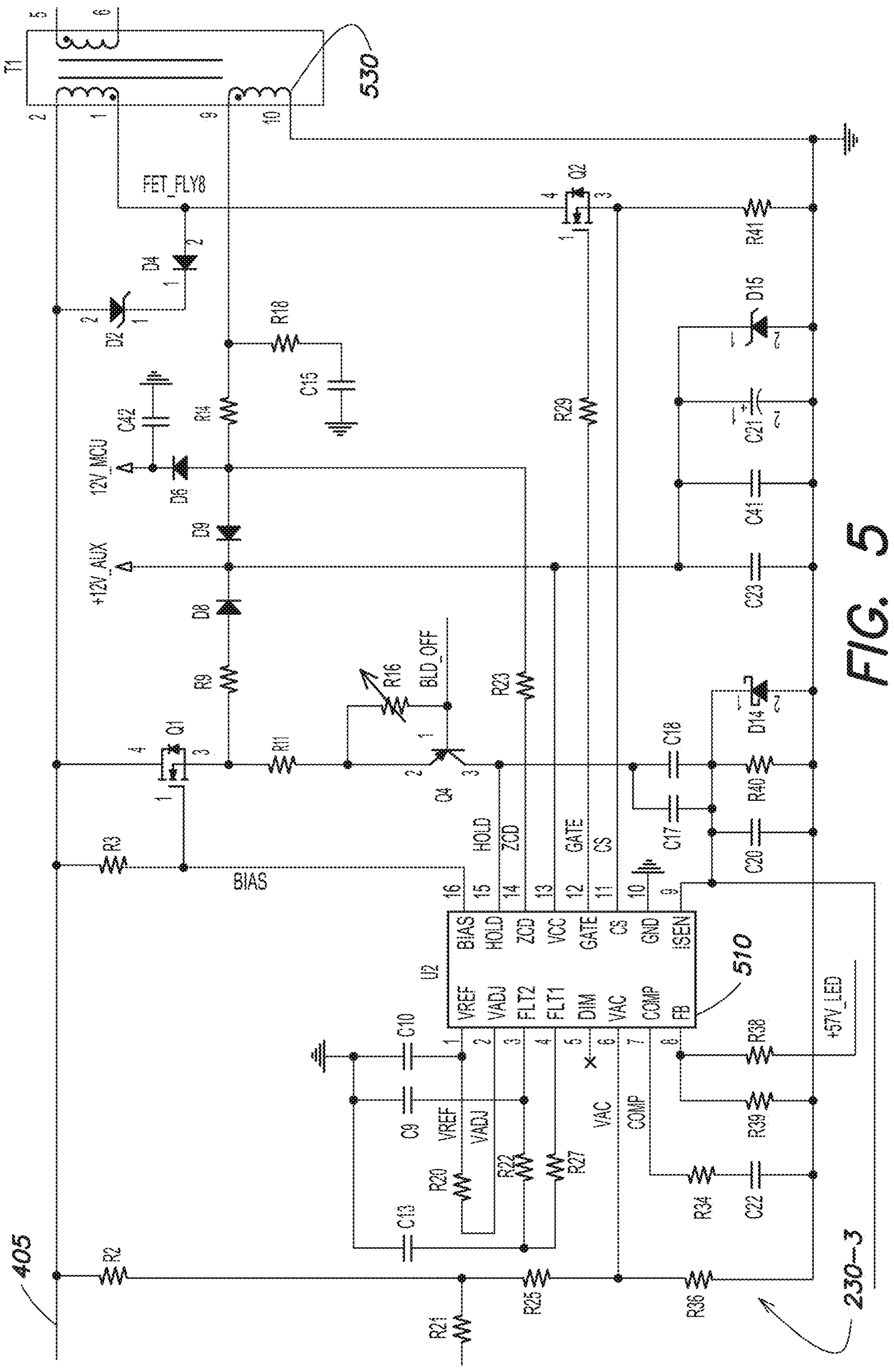
FIG. 5 is a schematic showing further details of a flyback controller that may be used in the lighting circuit of FIG. 4.

FIG. 5 depicts one example implementation of a flyback controller 230-3 and related circuitry in further detail. The flyback controller may include a controller chip 510 that senses the modified and rectified phase-cut waveform and controls a controllable switch (e.g., transistor Q2) to activate and deactivate the primary winding on the transformer T1 based upon the detected or average ON-time in the sensed waveform. For example, the amount of current flowing in the primary winding of the transformer T1 during each waveform cycle can be proportional to the detected or average ON-time of the rectified phase-cut waveform 340 that is sensed by the controller chip 510. A resistive divider network (e.g., consisting of resistors R2, R26, R36) can reduce the rectified waveform 340 to an amplitude level that will not saturate an input to the controller chip 510, designated in the illustrated example as pin 6 (VAC).

One example of a controller chip 510 that may be used in the flyback controller 230-3 is the LM3450A LED driver chip available from Texas Instruments of Dallas, Texas. The inventors have recognized and appreciated that this chip can be adapted to control the flyback controller 230-3. The controller chip 510 can very accurately regulate the current through the primary winding of the transformer T1 (and thereby accurately determine an amount of power or energy provided to the transformer's secondary winding) by providing a control signal to the gate of the transistor Q2 (e.g., an n-FET) and by monitoring the voltage across a current sense resistor R41 using a sensing terminal CS of the chip. The voltage across the resistor R41 is proportional to the current flowing in the primary winding.

Another example controller chip 510 is the AL1692 available from Diodes Incorporated of Plano, Texas. Such a chip can be configured to switch current through the primary winding of an isolation transformer T1 at a high frequency (e.g., between 30 kHz and 100 kHz, or at approximately or exactly 67 kHz) and regulate the current delivered to the secondary winding based upon the switching of current through the primary winding. The voltage appearing on the secondary winding is rectified and can be smoothed using a capacitor before being applied to one or more lighting sources (such as LEDs) with a forward voltage between 30-40V.

According to some implementations, the flyback controller 230-3 further includes a controllable switch (e.g., n-FET transistor Q1) for initially providing power to the controller chip 510. In some cases, the transistor Q1 may additionally or alternatively be used to provide an additional load during power conversion to ensure that the current drawn by the flyback controller 230-3 is greater than the minimum holding current requirements of a typical triac used within the connected lighting controller 220. The bias applied to the gate of the transistor Q1 can be determined by the controller chip 510 (indicated as pin 16 BIAS in the drawing). When the BIAS pin is HI, for example on start-up, transistor Q1 may turn on when a rectified waveform 340 appears on the input voltage line 405 and provide power through diode D5 to the chip's supply pin 13. After powering up, the BIAS pin 16 may be set LO to turn off Q1, or may be set to a value that provides a desired load to establish a minimum holding current in the lighting controller 220.

After powering up, the power for the controller chip 510 may be provided from an auxiliary winding 530 of the transformer T1, for example. Integrating capacitors, filtering circuitry, and/or an additional linear ripple-reduction circuit 440 as described above may be connected to an output of the auxiliary winding 530 to form a DC output with reduced ripple. In some implementations, converted power from the auxiliary winding 530 may be provided additionally to power the controller 240 of the lighting circuit 400.

Referring again to FIG. 4, the controller 240 may also sense the rectified waveform 340 and detect, for example, modulations in phase angles or ON-times of the rectified waveform. In some implementations, the controller 240 comprises a microcontroller, such as the STM32L031 microcontroller available from STMicroelectronics of Geneva, Switzerland. However, other types of controllers may be used such as, but not limited to, a microprocessor, a field-programmable gate array, an application-specific integrated circuit, or some combination of such controllers with additional circuitry.

The controller 240 can decode the digital CCT data by sampling each cycle of the rectified waveform 340, for example. According to some implementations, the controller 240 takes multiple samples of the rectified waveform 340 during each waveform cycle and compares the sampled values against at least one threshold value to determine ON-times and/or OFF-times (or corresponding phase angles) of the rectified waveform. For example, to determine an ON-time in the first half-cycle of the rectified waveform 340, the controller 240 may detect when a first sample exceeds a first threshold value and detect when a second sample falls below a second threshold value, which may be the same value as the first threshold value in some cases or may be a different value. Times at which the samples are recorded may be determined from a controller clock which governs operation of the controller 240. The difference in time between the first sample (which exceeds the first threshold value) and the second sample (which falls below the second threshold value) establishes an ON-time for the first half-cycle of the rectified waveform's cycle. The process can be repeated for the second half-cycle of the waveform. The threshold values can be chosen to be as low as possible but above the noise floor of the system to avoid erroneous readings. Digital signal processing may be employed to remove noise from the sampled waveform before samples are compared against the threshold value(s).

The frequency of the controller's clock can be significantly higher than the frequency of the AC line voltage, so that each cycle of the rectified waveform 340 can be measured with high precision. For example, the frequency of the controller's clock may be at least a factor of 1000 greater than the AC line frequency (which may be 60 Hz or 50 Hz). In some implementations, the periodicity of the controller's clock is from a factor of 4 to a factor of 80 less than the amount of modulation used to encode a digital bit. For example, if the modified phase-cut waveform is modulated by 100 microseconds to encode a digital bit, then the periodicity of the controller's clock is as small as 1.25 microseconds. In some cases, the periodicity of the controller's clock can be more than a factor of 80 less than the amount of modulation used to encode a digital bit. Some low-cost microcontrollers that may be used for the inventive implementations have clock periodicity on the order of 1 microsecond (1 MHz clock rate).

The controller 240 can compare the measured ON and/or OFF times for each half-cycle against a current average, non-modulated ON and/or OFF time (which may also be determined by the controller 240) to detect whether modulations are present in the ON and/or OFF times. In some implementations, the controller 240 determines the non-modulated ON and/or OFF time durations from intervals in the phase-cut waveform when no CCT or intensity adjustments are being made to the lighting fixture 250. During such intervals, there may be no digital data encoding onto the phase-cut waveform by the lighting controller 220, such that the ON-times or phase angles are static over a plurality of half-cycles. When the controller 240 detects modulations in the ON-times or phase angles, it can decode the modulations as data bits using a look-up table, for example, or a decoding logic algorithm. For example and referring again to FIG. 3C, detection of a decrease in the ON-time followed by an increase in the ON-time within a waveform cycle can be decoded by the controller using a look-up table or using conditional if-then statements as a '0' bit. The controller 240 may then record bits detected from successive cycles and/or half-cycles of the rectified waveform 340 to determine whether a CCT command is being received by the controller 240.

Decoding ON-times of half-cycles may comprise determining when the magnitude of the AC modified phase-cut waveform (or a signal representative of the modified phase-cut waveform) exceeds at least one threshold value. Decoding phase angles may comprise determining a zero crossing or other phase reference point in the modified phase-cut waveform (or a signal representative of the modified phase-cut waveform), determining a cycle length of the modified phase-cut waveform (or a signal representative of the modified phase-cut waveform), and determining the point within the cycle at which the waveform transitions sharply to an ON state from a zero voltage state.

Referring again to FIG. 4, the power supply to deliver power to the two or more lighting sources further includes the current controller 230-4 which, for the example implementation, is configured to controllably gate relative amounts of current through the two lighting sources 260, 262. The current controller can include a switch 450 that is connected between the converted voltage line 409 and a reference potential, such as ground. The switch 450 can be implemented with an opto-isolated transistor (as depicted) or may be implemented without opto-isolation in other implementations. The current controller can also include three transistors Q4, Q5, and Q6 arranged to gate current flow through the lighting sources 260, 262 and resistors R10, R11, R12 for current limiting and/or transistor biasing purposes. A controlled output, current-carrying terminal of the switch 450 may connect to control terminals of the first and second transistors Q4, Q5 and to a resistor R10. An input current-carrying terminal of the switch 450 may connect to the control terminal of the third transistor Q6.

If a CCT command is detected by the controller 240, the controller can then control the switch 450 in the current controller 230-4 to establish relative amounts of current delivered through the two or more lighting sources 260, 262. For the illustrated circuit of FIG. 4, the relative amounts of current are determined by a duty cycle of the signal applied to the switch 450. Alternatively, a PWM signal may be used and the relative amounts of current determined by the ON and OFF times of the PWM signal. When the switch 450 is in an OFF state (a non-conducting state determined by a LO level of the duty cycle, for example), then transistor Q6 is turned on while transistors Q4 and Q5 are off (their control terminals are pulled low through resistor R10). Current from the converted voltage line 409 then flows through only the second lighting source 262. When the switch 450 is in an ON state (a conducting state determined by a HI level of the duty cycle, for example), then transistor Q6 is turned off while transistors Q4 and Q5 are on (their control terminals go to a high level because of resistor R10). Current from the converted voltage line 409 then flows through only the first lighting source 260. In this manner, the duty cycle (or HI/LO voltages) of the signal applied to the switch 450 controls the relative amounts of current flowing through the lighting sources 260, 262. To avoid any visually-detectable modulation of the output from the lighting fixture 250 due to the gating of current through each source, the signal applied to the switch 450 can have a frequency greater than 1000 Hz.

Figure 6:
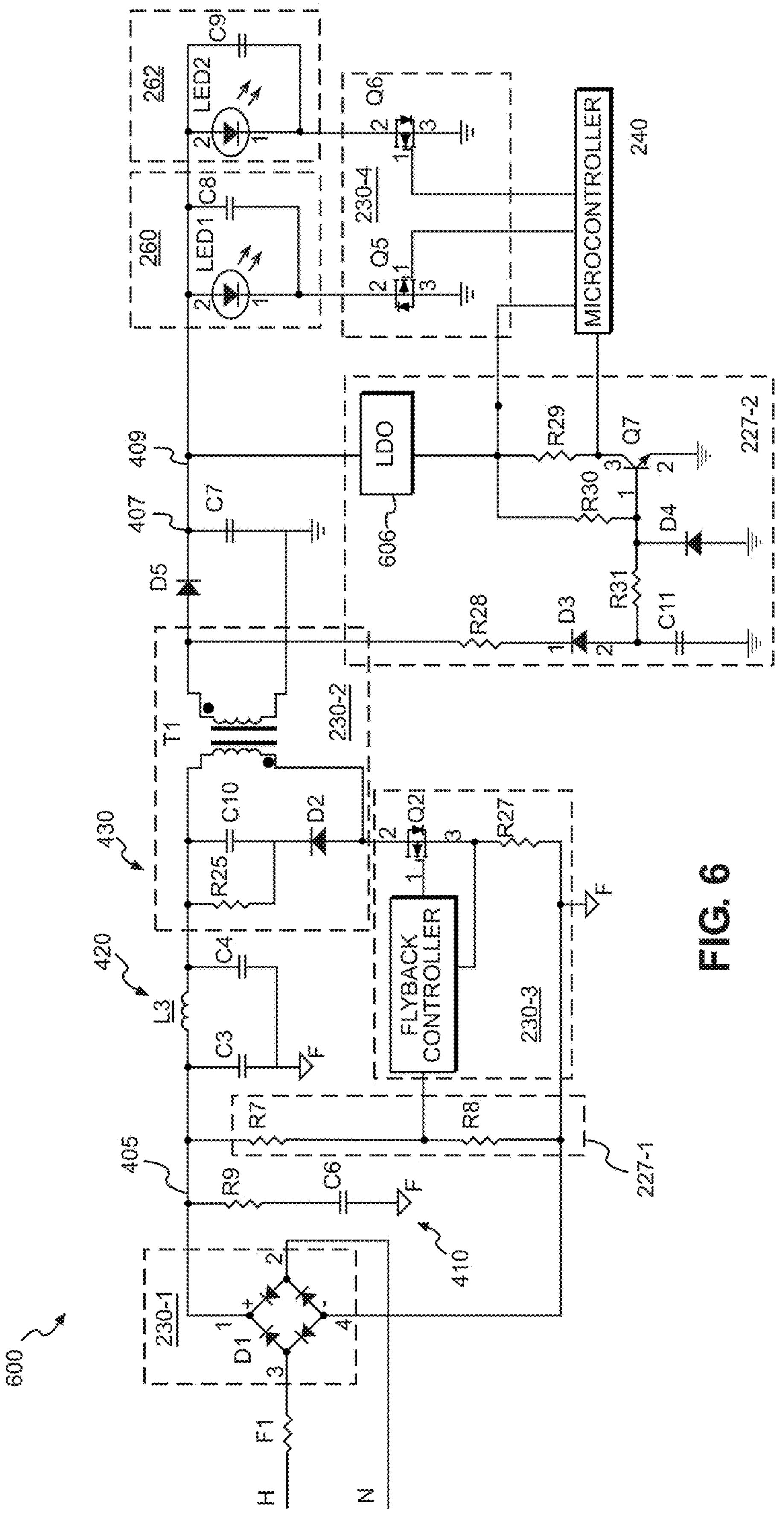
FIG. 6 is a schematic showing further details of a lighting circuit that may be included in the lighting fixture of FIG. 2A or FIG. 2B.

In the lighting circuit 400 of FIG. 4, the controller 240 receives a signal on the primary winding side of the transformer T1. It is also possible to implement a lighting circuit where the controller 240 receives a signal from the secondary side of the transformer T1. Such an implementation of a lighting circuit 600 is illustrated in the schematic of FIG. 6, which shares similar components with the lighting circuit 400 of FIG. 4 that need not be described again. Notable differences between the two circuits are in the interface circuitry 227 and current controller 230-4.

Although the controller 240 can be located on the secondary side of the circuit's transformer T1 (as depicted in FIG. 6), the AC phase angle is received at the lighting circuit 600 on the primary side of the transformer and normally would not appear or minimally appear on the output of the converter 230-2. The inventors have devised an implementation with the controller 240 located on the secondary side where the controller can still measure (using interface circuitry 227-2) the ON and/or OFF time in AC waveform half-cycles to control the color temperature of the lighting fixture 250.

With the controller located on the secondary side, there is a need to reflect the AC phase angles (or sharp transitions in the phase-cut waveform) from the primary side to the secondary side of the transformer T1 where the grounds on the two sides are isolated from each other. In some cases, an opto-coupler can be used to reflect the phase angle in such an isolated environment. The inventors have recognized and appreciated that a disadvantage with using an opto-coupler can be a slow rise/fall time of the opto-coupler due to its internal output capacitance. Slow rise/fall times can reduce the accuracy of the phase angle detection.

Another approach, used in the lighting circuit 600 of FIG. 6, is to monitor the secondary winding's unfiltered voltage from the transformer T1. With interface circuitry 227-2, this can allow detection of the phase angle without using an opto-coupler. The interface circuitry can include capacitor C11 coupled in series with diode (D3) and a resistor R28 to the secondary winding of the transformer T1, connecting at node 407 prior to diode D5 and integrating capacitor C7. The interface circuitry 227-2 can further include a transistor Q7 having its current-carrying terminals connected between a supply 606 and a reference potential (such as ground), a diode D4 connected between the reference potential and a base or gate of the transistor Q7, and biasing resistors R29, R30, R31. When the lighting controller 220 is in a non-conducting state, the flyback controller 230-3 is not toggling and the secondary voltage of the transformer is zero. Accordingly, capacitor C11 is charged by the supply 606 (e.g., to 3.3 V or another voltage) and a positive voltage is applied to the base of transistor Q7 to place it in a fully-conducting state (saturation). In this state, the output voltage toward the controller 240 drops to a logic low level (e.g., 0V), signaling the controller 240 that the lighting controller 220 is in a non-conducting state.

When the lighting controller 220 is in a conducting state, the flyback controller 230-3 is switching and the secondary voltage of the transformer T1 toggles between negative and positive voltage. The primary and secondary windings in the transformer may be in opposite directions. When the flyback controller's transistor (e.g., a MOSFET Q2) is turned on and the rectified AC voltage is falling on the transformer's primary winding, the voltage on the secondary winding of the transformer is negative. During this time, energy transfer from the transformer's primary and magnetic core to the secondary can occur. Later, when the flyback transistor Q2 is turned off, the secondary voltage becomes positive and the energy can transfer from the magnetic core to the secondary winding of the transformer. The diode D3 charges the capacitor C11 with negative voltage during the time when the lighting controller 220 is in a conducting state. Diode D4 can limit the negative voltage applied to the base of transistor Q7. The negative voltage on the base of transistor Q7 causes the transistor to be non-conducting and the output voltage toward the controller 240 to be logic high (3.3V in this example). In this manner, interface circuitry 227-2 can signal the controller 240 that the lighting controller 220 is in a conducting state.

With regard to the current controller 230-4, the controller 240 (a microcontroller in the illustrated example) is configured to control color temperature by directly and separately controlling transistors Q5, Q6 (MOSFETs in this example) that are coupled between cathodes of the LED lighting sources 260, 262 and a reference potential (e.g., ground). For example, the controller 240 may control pulse width on-times in pulse-width-modulated (PWM) signals applied to each control terminal of transistors Q5, Q6 to achieve a desired intensity ratio between the two (or more) lighting sources 260, 262, the controller 240 may control duty cycles in signals applied to the control terminals of the transistors Q5, Q6. The controller 240 may be powered from the secondary voltage of a supply 606 such as a low dropout (LDO) regulator. Such an implementation can simplify the design of the current controller 230-4 (one-half the transistors compared to the implementation of FIG. 4) though may require more complexity of the controller 240 (e.g., independent drive of two outputs instead of one).

Although the implementations of FIG. 4 and FIG. 6 have alternating ON and OFF cycles of the lighting sources 260, 262, other CCT control methods are possible. In some implementations of a lighting circuit 400, 600, one of the lighting sources may be on at all times and its output only adjusted for intensity control. For such implementations, color temperature control may be obtained by only adjusting the amount of light output from the other lighting source or sources in the lighting fixture 250. This may further simplify circuitry in that a controller 240 may only need control the ON-time of all but one of the lighting sources 260, 262.

In some cases, the controller 240 may also control the total light intensity of the lighting fixture 250 (e.g., when the light source driving circuitry is based on a two-stage architecture). The total light intensity may be controlled by maintaining a fixed power or current ratio between the two or more lighting sources 260, 262 and increasing or decreasing ON-times of all lighting sources in the fixture to adjust intensity, maintaining the fixed ratio. For example, for a lighting fixture 250 having three lighting sources (one emitting a red spectrum, one emitting a green spectrum, and one emitting a blue spectrum) a first color and intensity output may have respective ON-times of (5 ms, 15 ms, and 10 ms) during an AC cycle. A higher intensity output at the same color temperature may be achieved by changing the respective ON-times per cycle to (10 ms, 30 ms, and 20 ms).

Figure 7:
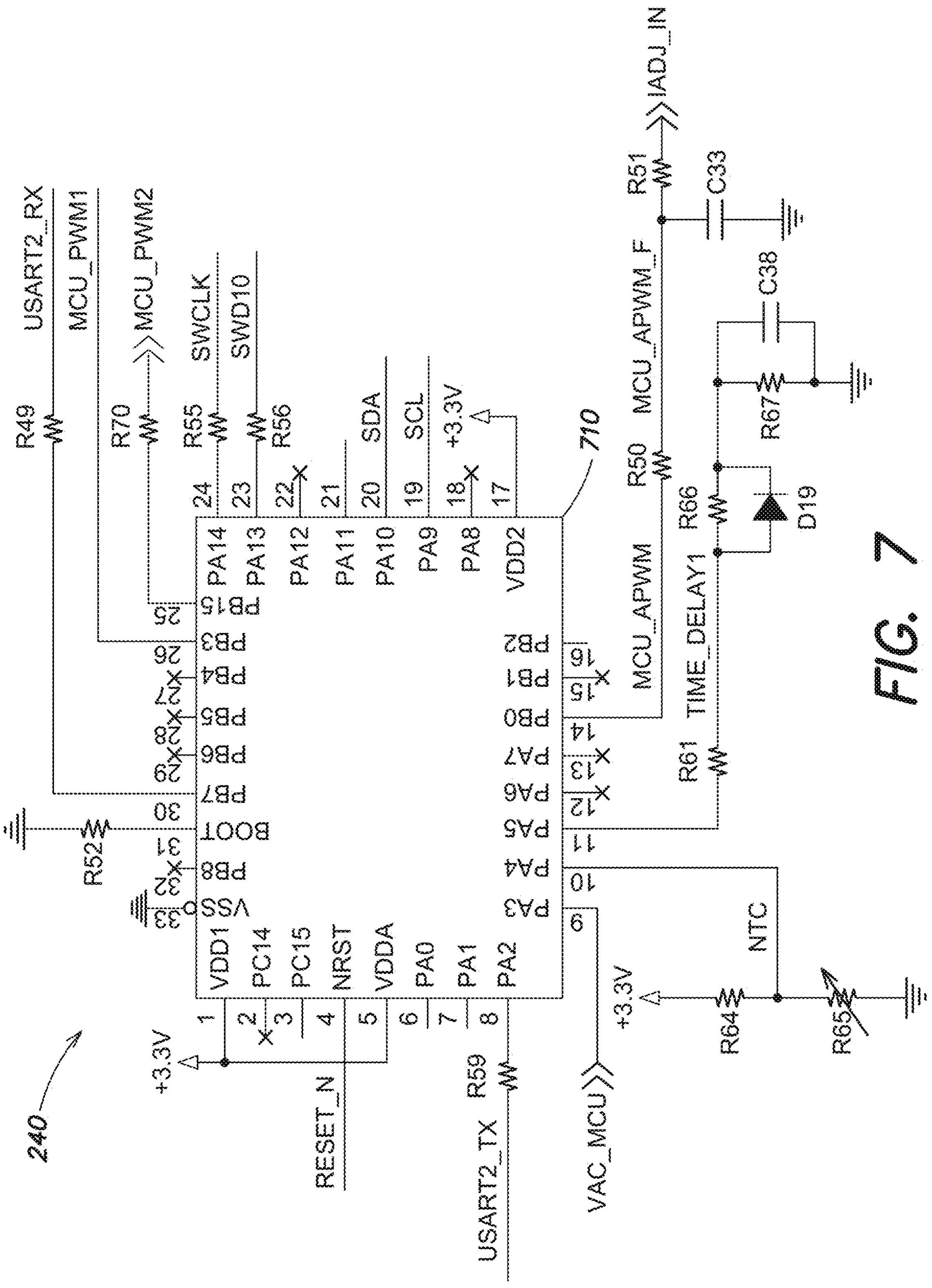
FIG. 7 is a schematic showing further details of a controller that may be used in the lighting circuits of FIG. 4 and FIG. 6.

FIG. 7 depicts a configuration of a controller 240 that may be used to directly and separately control transistors Q5, Q6 for the implementation of FIG. 6. In some implementations, controller 240 may comprise a microcontroller 710, such as the STM32L031 microcontroller mentioned above. The microcontroller 710 can generate various signals to control components of the lighting circuit 600. For the example implementation of FIG. 7, the output lines labeled MCU_PWM1 (pin 26) and MCU_PWM2 (pin 25) can provide two PWM signals generated by the microcontroller 710. Outputs from these terminals may be applied to the control terminals of transistors Q5, Q6 for the implementation of FIG. 6, for example. The input from transistor Q7 may be applied to a digital input pin of the microcontroller, such as the input labeled VAC_MCU (pin 9).

The control circuit in the example illustrated in FIG. 6 does not include a ripple-reduction circuit 440 that is in the circuit of FIG. 4. As described above, the capacitance C7 may be increased to provide sufficient integration and reduction of ripple to avoid lighting flicker for some lighting circuit implementations. However, the ripple-reduction circuit 440 of FIG. 4 may be added to the implementation of the lighting circuit 600 in FIG. 6 to allow the capacitance C7 to be decreased by a factor of five or more.

Direct control of transistors Q5, Q6 by the controller 240, as illustrated in FIG. 6, may be implemented for the lighting circuit 400 of FIG. 4 instead of the four-transistor implementation shown in that drawing. The microcontroller 710 may also be adapted for use in the implementation of FIG. 4, whether or not it includes direct control of transistors Q5, Q6. In some implementations, there may be buffers or amplifiers between outputs (pin) of the controller 240 and transistors which are controlled by signals from those outputs.

4. Example Communication Protocols and Commands

The waveforms illustrated in FIG. 3A and FIG. 3B depict examples of a single cycle of modified phase-cut waveforms 320, 330 that may be used to communicate one or two digital bits from a lighting controller 220 to the lighting circuits 400, 600 as described above. The one or two bits may be part of a series of bits included in a command to control lighting intensity and/or lighting color temperature. Example commands for controlling lighting will now be described. Communication of intensity and/or color temperature control information with other waveforms and detection of the information with lighting circuits 400, 600 is possible as will be described further below.

One way to encode (and decode) bits of a lighting control command in a modified phase-cut waveform 320, 330 is to essentially use so-called Manchester encoding (decoding) for each cycle of the waveform as described above in connection with FIG. 3A. For Manchester encoding, two opposite bits are used to encode and decode a single bit of a command. For example, the bit pair [01] may be used to encode and decode a '0' bit and the bit pair [10] may be used to encode and decode a '1' bit. A Manchester encoded command (originally having N bits) is twice the length of the original command but will always contain the same number of low and high bits. This feature may be used to check the fidelity of the received command. The Manchester encoded command may be transmitted by the lighting controller 220 in the modified phase-cut waveform 320, 330 by increasing and decreasing the phase angle (ON and/or OFF times) based on the CCT data to be transmitted to the lighting fixture(s) 250. As described above in connection with FIG. 3A, the ON-time or phase angle could be increased and then decreased in the first and second half-cycles of a cycle to avoid undesirable DC components in the output waveform. Thus, one cycle of the modified phase-cut waveform can encode one digital bit for a command. As mentioned above, intensity stability of light output from the lighting fixture(s) 250 may be improved by including one or more unmodulated or "idle" phase-cut waveform cycles between successive cycles that encode a digital bit.

To encode a digital lighting-control command onto the phase-cut waveform, the lighting controller 220 can include logic circuitry (e.g., logic gates, a field-programmable gate array, a microcontroller, a programmable logic controller, or some combination thereof) and other circuit components (e.g., triac(s), FETs) adapted to receive a color-control input signal (e.g., from a user setting a slide control, knob, interacting with a touch panel, etc.) and modulate the phase-cut waveform in response to receiving the input signal. The modulation produces the modified phase-cut waveform 320, 330 described above.

The bit pattern for a lighting command may take several AC cycles to convey from a lighting controller 220 to a lighting circuit 400, 600. In some cases, a lighting command for CCT and/or intensity may be transmitted by the lighting controller constantly. In other cases, a lighting command for CCT may be transmitted periodically with a period of unmodulated or idle cycles (conveying intensity control information or power only, e.g.) being transmitted between digitally-encoded lighting commands.

According to some implementations, a lighting command can include N start bits, M control bits, and P stop or parity bits, which together comprise a command data frame (depicted in Table 1). In one example, N=1, M=5, and P=3. The parity bits may be CRC bits. In this example with M=5, there can be up to 32 distinct controlling commands with each command identified by the M-bit binary number or code. There may be fewer or more control bits and fewer or more parity bits than the numbers given in this example. There also may be more than one start bit for some implementations.

TABLE 1

Example Data Frames

| | CCT Data Frame (9-bits) | | | | | | | | |
|---|---|---|---|---|---|---|---|---|---|
| CMD # | Start bit | CCT data bit | | | | | CRC bits | | |
| 0 | 1 | 0 | 0 | 0 | 0 | 0 | 0 | 0 | 0 |
| 1 | 1 | 0 | 0 | 0 | 0 | 1 | 1 | 0 | 1 |
| 2 | 1 | 0 | 0 | 0 | 1 | 0 | 1 | 0 | 1 |
| 3 | 1 | 0 | 0 | 0 | 1 | 1 | 0 | 0 | 0 |

According to some implementations, the control bits may identify discrete CCT settings at which to operate the lighting fixture(s): e.g., set color temperature at the connected lighting fixture(s) 250 to 2500 K, set color temperature to 4000 K. There may be a number of discrete color temperature settings ranging from 1800K to 6500 K. In response to detecting a CCT command, the controller 240 may use a look-up table to determine the relative amounts of power to provide to the lighting sources 260, 262 so that the lighting fixture outputs the desired color temperature. The look-up table may be established and lighting output calibrated as part of the manufacturing process for the lighting fixture 250. The look-up table may include factors to compensate for nonlinearities or have values that have been compensated to account for nonlinearities of the lighting sources 260, 262 and/or of the lighting circuit 400, 600. Such factors may be evident as deviations from C.I.E. mixing ratios that would produce the selected color or color temperature.

Transitions to a new color temperature may be enacted by the controller 240 using a slow or fast fading algorithm that is automatically executed by the controller for such transitions. An example fast fading algorithm may comprise changing the relative amounts of power delivered to the lighting sources 260, 262 in a continuous and gradual manner (rather than stepped from start values to end values) within one second or less. A slow-fading algorithm may perform the same adjustment but over a longer period (e.g., from two seconds up to five seconds or more).

Commands to change color temperature may be transmitted (1) when the CCT setting has been changed and (2) when the lighting controller 220 transitions the AC output from OFF to ON. In some cases, the CCT command may be transmitted repeatedly and periodically (e.g., every 10 seconds, every 30 seconds, every 60 seconds, or some other value) to ensure all lighting fixtures 250 are in sync with the latest CCT setting. In some cases, the lighting controller 220 may be programmed to wait a minimum amount of time before sending a CCT command, such as after power up, after a change in the light intensity level, and after sending a CCT command. During the wait period, the lighting controller 220 can output unmodulated (idle) cycles that maintain the current lighting intensity.

Some commands sent by the lighting controller 220 may identify other actions to be taken at the lighting fixture(s) 250. An example action may be to transition from a current color temperature to a highest temperature setting or to a lowest temperature setting. Another example action may be to sweep through and/or pause on each user-settable color temperature. Other example actions include, but are not limited to: enable a warm-dimming mode where the color temperature varies from a first value (e.g., 3000 K) to a second value (e.g., 2200 K) and is based on the light intensity setting, go to the last specified CCT value using a fast fade time, always use the last CCT setting on power up, always use a predetermined color temperature (e.g., 3000 K) on power up, always enable the warm-dim mode on power up, select a short (or long) color temperature fade time, etc.

In some cases, lighting control commands received by the lighting circuit 400, 600 may be for unlocking operational features of the lighting fixture. As an example, a lighting fixture 250 may initially be sold with intensity control capability and a locked CCT control capability. Such a lighting fixture may be operated as a conventional intensity-controllable lighting fixture using a conventional dimmer 120. Upon upgrade of the dimmer to a lighting controller 220, the lighting controller may be configured to transmit a command to unlock CCT functionality (e.g., enable execution of CCT control code on the controller 240). In some cases, a user may purchase or obtain license keys or encrypted codes to transmit to the lighting fixture 250 to unlock executable code for the controller 240 to implement additional CCT and/or intensity control functionalities. In some cases, a user may purchase upgrades to executable code for the controller 240.

Table 1 provides examples of bit sequences for four commands that can be transmitted by a lighting controller 220 and received by one or more lighting fixtures 250 that are in communication with the lighting controller. For the illustrated example, the command comprises 9 bits in a data frame. If Manchester encoding is used, then the number of actual bits transmitted and decoded would be 18 (in nine modified phase-cut waveform cycles). If idle phase-cut waveform cycles are included between each cycle, then the number of cycles required to transmit the command is 17 (or about 0.28 seconds for a 60 Hz AC supply). For the example command structure, the CRC is based on CRC-3-GSM using the polynomial $X^3+X^1+1$. Longer lighting commands (e.g., more than five control bits, M>5) may be used to convey more distinct control commands and/or data in a lighting system. In some cases, the controller 240 may be configured to configured to wait a certain number of cycles after receiving a data frame before executing a command identified by the single data frame.

The CCT data transmitted by the lighting controller 220 within the modified phase-cut waveform 320, 330 can be decoded by the controller 240 (e.g., using a software algorithm executing on a microcontroller 710). In some cases, a low-pass filter can be implemented within the controller 240 (e.g., in firmware or software of a microcontroller 710) and applied to the phase-cut waveforms to determine a running average of the waveform's ON-time. The running average may be based on a small number of cycles (e.g., 5, 10, 20, 40, or some other value) received before the current cycle. Any detected ON-times that deviate from the current running average by a specified amount (e.g., more than ±50 microseconds deviation) can be interpreted as digital data bits. The controller's firmware may detect the start of a lighting control command based on receiving one or more start bits after a period of idle data transmission and may validate the command based on the data frame's parity bit(s) or a more advanced checksum following the command. Once validated the CCT data may be interpreted by the controller 240 to set the color temperature for the lighting fixture and/or establish a mode of operation. The controller 240 may modify its output waveform(s) applied to the current controller 230-4 (e.g., change duty cycle, change pulse widths) in response to receiving the lighting control command.

To improve data communications from the lighting controller 220 to the lighting fixture 250, it may be beneficial for the lighting controller to have significantly less phase-angle jitter (i.e., jitter in the phase-cut locations on the phase-cut waveform) than the amount of phase-angle modulation used in the modified phase-cut waveform to encode digital data. In some cases, the amount of phase-angle jitter should be at least a factor of three less than the amount of phase-angle modulation. In some implementations, it may be beneficial for the phase-angle jitter to be a factor of five or more less than the amount of phase-angle modulation. For example, if the phase angle in a half-cycle is modulated $\Delta t$ by 150 microseconds, then the phase-angle jitter of the lighting controller should be no more than 30 microseconds. Lighting controllers with excessive phase-angle jitter may not be able to communicate CCT commands reliably to the lighting fixture. Stated alternatively, the modulation time $\Delta t$ may be preprogrammed, selected at the factory, selected by an installer, or selected automatically by the lighting controller 240 to be at least three, five, or more times greater than the lighting controller's phase-cutting jitter.

5. Method of Operation

Figure 8:
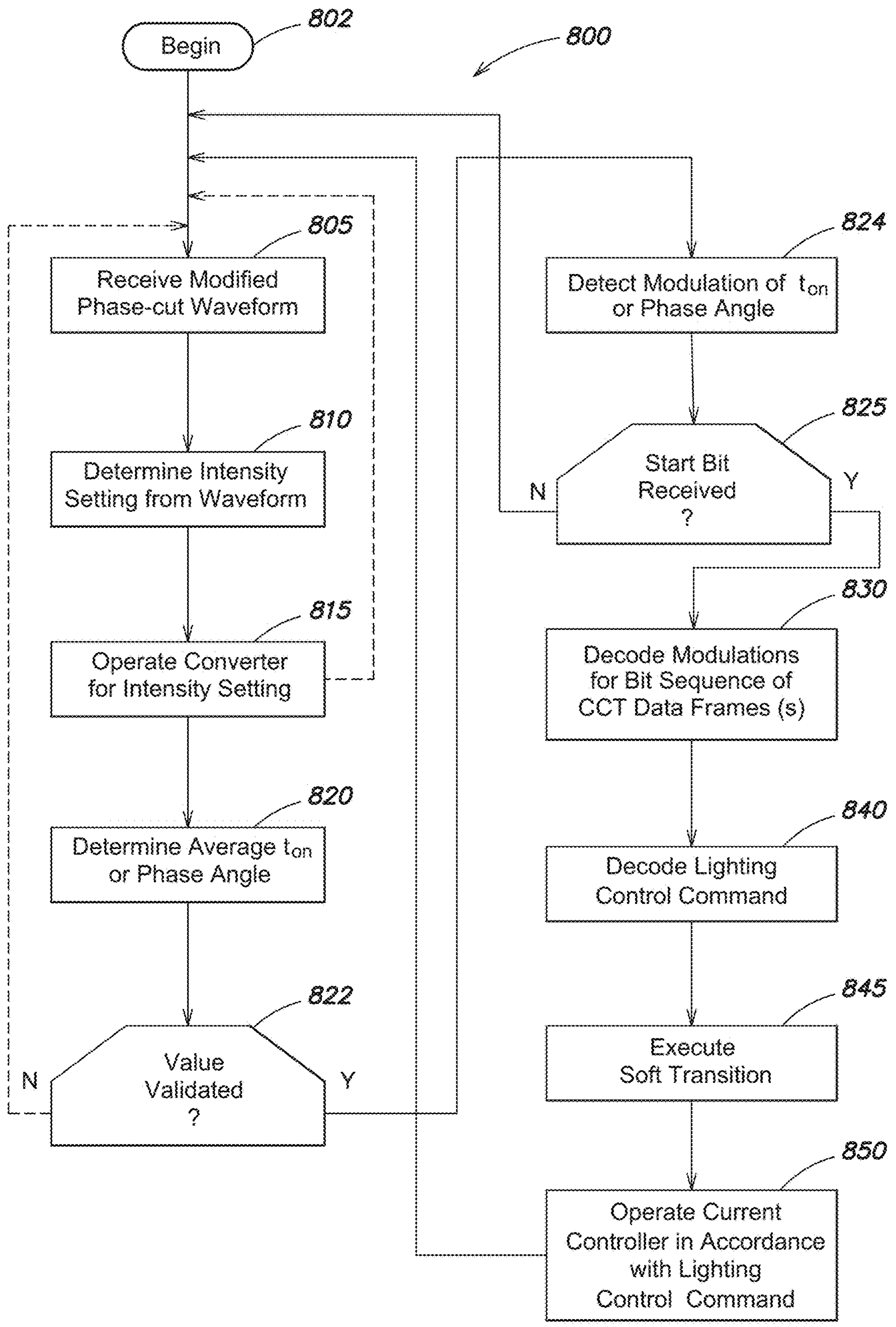
FIG. 8 depicts example acts that may be included in a method of independently controlling color temperature and intensity output from a lighting fixture.

FIG. 8 is a flow chart depicting acts associated with methods of controlling color temperature and total intensity output from at least one lighting fixture 250 containing two or more lighting sources 260, 262 that emit at different colors. The illustrated example method 800 may be executed by the lighting circuit 400, 600 of each lighting fixture 250. There may be additional or fewer acts than those depicted in FIG. 8 when controlling a lighting fixture 250.

The example method 800 may begin (802) upon receiving power at the lighting fixture 250. For example, the controller 240 and flyback controller 230-3 may power up and begin operating. The lighting circuit 400, 600 may receive (act 805) a modified phase-cut waveform 320, 330 over a conventional AC input line that provides power to operate the lighting fixture. The flyback controller 230-3 may determine (act 810) from the received phase-cut waveform (or from a rectified version thereof) an intensity setting for the lighting fixture 250 (e.g., an amount of power to deliver for powering two or more lighting sources 260, 262 of the lighting fixture). The flyback converter 230-2 can then operate (act 815) the converter 230-2 to deliver an amount of power to the lighting sources 260, 262 such that the lighting fixture 250 outputs an amount of intensity corresponding to the intensity setting. Acts 802 through 815 may be executed cyclically (as indicated by the dashed line) until the lighting fixture is powered OFF, whether the fixture is operated by a conventional dimmer 120 or a lighting controller 220.

When controlled by a lighting controller 220, the lighting fixture's controller 240 may determine (act 820), from the received phase-cut waveform (or rectified version thereof), an average ON-time ($t_{on}$) or average phase angle for the half-cycles of the received waveform. As described above, the average value can be a running average that is based on a limited number of cycles (e.g., any number of cycles from 4 to 100 or more) received immediately before the current cycle. To determine the ON-times or phase angles, the received phase-cut waveform or rectified version thereof may be processed (using Schmitt triggers, comparators against reference voltages, or using digital signal processing) to produce a square wave 350 that is depicted in FIG. 3C, which is representative of the modified phase-cut waveform 320. When comparing the waveform against reference voltages, the comparison may be hysteretic such that a logic HI level is produced when the waveform exceeds a first threshold value and a logic LOW level is produced when the waveform falls below a second threshold value, where the second threshold value is less than the first threshold value. Due to thresholding when processing the phase-cut waveform, the detected ON-time, OFF-time, and/or phase angle (e.g., $t'_{ON,a}$) in the square wave 350 may differ consistently from the actual ON-times, OFF-times, or phase angles in the phase-cut waveform 320, 330, as depicted in FIG. 3C. Since the differences are consistent, the square wave 350 can be used for reliable control of color temperature, for example.

According to some implementations, the ON-time, OFF-time, or phase angle can be determined, for example, by the controller 240 counting clock cycles from a clock that governs operation of the controller 240. The clock cycles can be counted between logic transitions of the generated digital waveform 350 from LO to HI and HI to LO. In some microcontrollers 710, an input capture mode may be used where the microcontroller can read a counter's value that has accumulated from a first logic transition (e.g., LO-to-HI) to a second logic transition (e.g., HI-to-LO), immediately reset that counter's value to zero so that the counter can count again until the next transition occurs (e.g., LO-to-HI). The measured count values can be used to determine one or more of ON-time, OFF-time, and phase-angle range from the generated digital waveform 350. The process of reading and immediately resetting the count value can repeat for each span between logic transitions. Thus, ON-time, OFF-time, and/or phase angle can be determined by the controller 240 for each cycle. Additionally, the controller may average the counts over a limited number of cycles occurring immediately prior to the current cycle to determine a running average for the ON-time, OFF-time, and/or phase angle.

In some implementations, each count value may be validated (act 822) by the controller 240 before further processing the count value. For example, each count value may be compared against the average or an expected count value (e.g., determined from waveforms for a previous setting of the lighting controller 220). In some cases, expected count values may be stored in memory of the controller 240 when assembling and/or calibrating the lighting circuit 400, 600 and may be determined at the factory for typical settings of the lighting controller 220. In other cases, average count values may be used for comparison and determined at run time by the controller 240 (e.g., based on the last N cycles, where N may be 5 or greater). Count values $M_m$ measured by the controller from the generated digital waveform 350 may be determined to be valid if the measured count value falls within a predetermined range of a reference count value $M_r$ (e.g., expected count value or average count value). The range may be expressed as a fraction f of the reference count value according to the following relation:

$$(M_r - fM_r) \leq M_m \leq (M_r + fM_r) \quad (1)$$

where f can be a value less than 0.2, though it may be larger for some lighting controllers 220. If the measured count value falls outside the verification range of values expressed in EQ. 1, then the system may discard or ignore the data (e.g., not record it as a digital bit and/or not use it for determining an average ON-time or phase angle) and return to receiving (act 805) the phase-cut waveform without executing subsequent acts of detecting and setting color temperature.

The controller 240 can then monitor the modified phase-cut waveform (or rectified version thereof) to detect (act 824) modulation of the ON-times or phase angles in half-cycles of a waveform cycle. The controller may first determine (act 825) whether a start bit of a CCT data frame is received (e.g., reception of a '1' bit and '0' bit in each half-cycle of a waveform cycle, or some other bit sequence indicating the start of a data frame). If a start bit is not received, the lighting circuit 400, 600 can resume operation of receiving (act 805) phase-cut waveform cycles. If a start bit is received, then the controller 240 can decode (act 830) the modulations of the waveform half-cycles or full cycles to receive a bit sequence of a data frame (or frames for a more complex command). The controller can then decode (act 840) from the received bit sequence a lighting control command such as a command for the lighting fixture to emit light at a specified color temperature, though other commands are possible as described above. Once a lighting control command is determined, the controller 240 may, for example, use a look-up table to determine operating characteristics (e.g., one or more of PWM values, duty cycle, amplitude, frequency, etc) for one or more drive signals to apply to the current controller 230-4. The look-up table can, for example, provide a mapping between a detected color temperature command and duty cycle(s) applied to the current controller 230-4. The controller 240 may then operate (act 850) the current controller 230-4 in accordance with the lighting control command by modifying one or more drive signals applied to the current controller. The controller 240 may then resume operation of receiving (act 805) analog phase-cut waveform cycles.

In some cases, the controller 240 is configured to execute a soft transition (act 845) in terms of changing color temperature and/or total light intensity when changing the lighting fixture from a first operating point to a second operating point. Instead of jumping from first PWM or duty cycle characteristics at the first operating point to second PWM or duty cycle characteristics at the second operating point, the controller 240 may gradually transition the pulse widths or duty cycle(s) from the first operating point to the second operating point to avoid any visually-jarring changes in the lighting fixture's illumination. For digital circuit implementations, the gradual transition may comprise changing the pulse widths or duty cycle(s) in a number of small incremental steps (e.g., 10 or more steps) from the first operating point to the second operating point.

6. Lighting Controller

Figure 9:
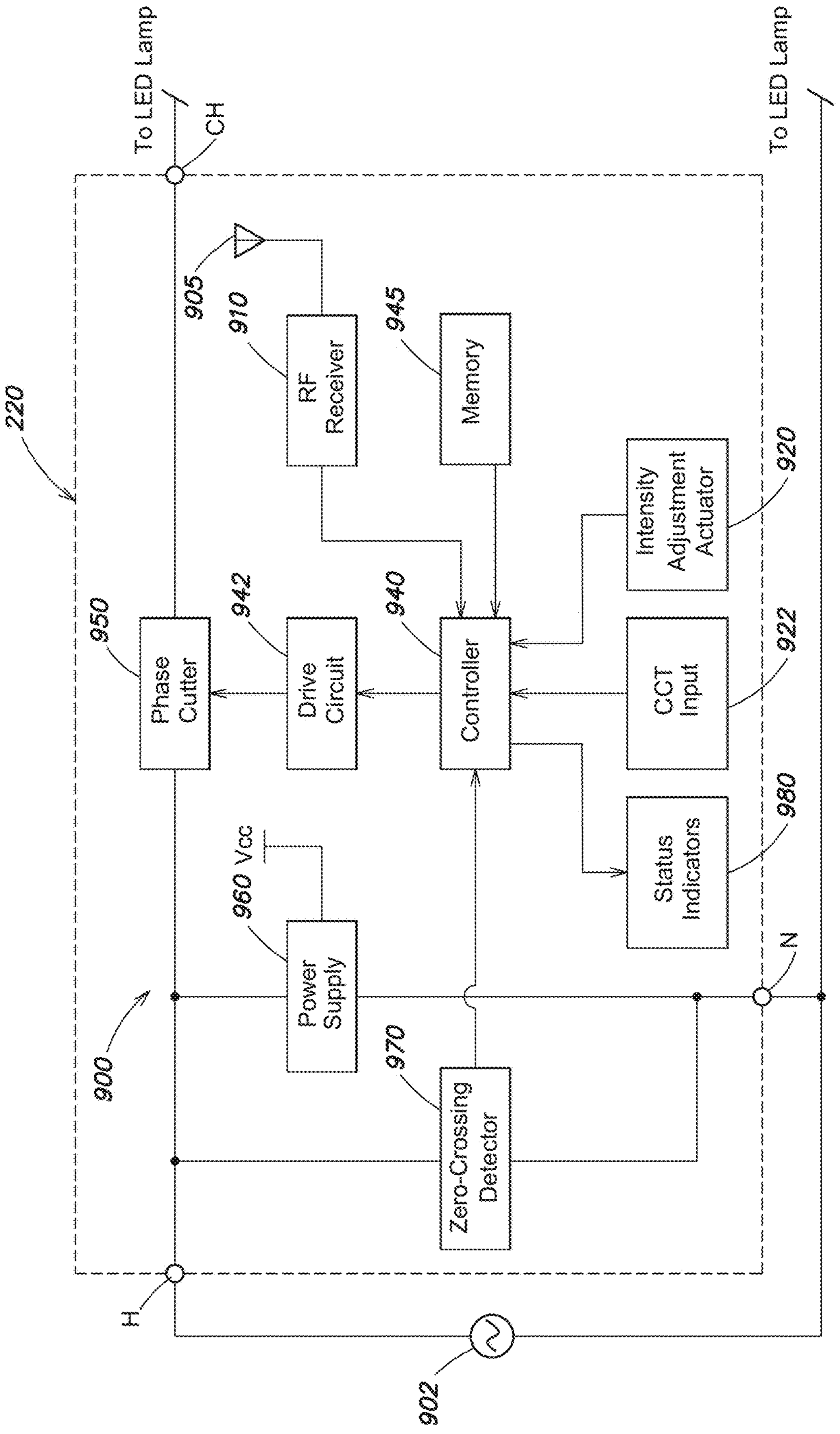
FIG. 9 is a schematic showing further details of a lighting controller that may be used in the lighting systems of FIG. 2A of FIG. 2B.

FIG. 9 illustrates an example control circuit 900 for a lighting controller 220. According to some implementations, the lighting controller 220 may resemble a conventional dimmer 120 but have at least one additional input channel 922 (e.g., for controlling color temperature). The lighting controller may mount in a same type of receptacle that accepts a conventional dimmer or wall switch. In alternative implementations, the lighting controller 220 may have other forms (e.g., be part of a control panel).

The control circuit 900 may receive power through AC wiring from an AC power source 902. In some cases, the lighting controller includes a controller 940 that can perform logic operations. The controller 940 may be implemented, at least in part, with logic circuitry, a field-programmable gate array, an application specific integrated circuit, a programmable logic controller, a microcontroller, or some combination thereof. Such a lighting controller 220 may be referred to as a "smart dimmer."

The lighting controller 220 may have at least two user input channels: a first channel 920 for adjusting an intensity output of a lighting fixture 250 in communication with the lighting controller, and a second channel 922 for adjusting a color temperature of light output by the lighting fixture 250. Output from each of the two channels is provided to the controller 940. The controller 940 may connect to a phase cutter 950, which forms the modified phase-cut waveforms described herein that are transmitted to the lighting circuit 400, 600 over conventional AC wiring. The phase cutter 950 may comprise one or more triacs, one or more MOSFETs, or some combination thereof arranged to controllably turn on and turn off the AC voltage within a cycle of the AC waveform in response to a control signal transmitted by the controller 940. In some implementations, a drive circuit 942 can receive phase-cut control signals from the controller 940 and output signals suitable for driving the phase cutter 950. For example, the drive circuit 942 may comprise buffers or amplifiers to drive lower impedance loads than the controller alone may drive. There may be an additional user input on the lighting controller 220 (e.g., ON/OFF switch or toggle) for turning the controller 220 and/or connected device(s) on and off. Further details of components that may be included in a lighting controller can be found in U.S. Pat. No. 9,736,911 filed on Jan. 27, 2012 and titled, "Digital Load Control System Providing Power and Communication Via Existing Power Wiring," which is incorporated by reference herein in its entirety.

In some implementations, the lighting controller 220 may include an antenna 905 and wireless receiver 910 for wireless communication (e.g., for communicating with a smart phone, laptop, or tablet computer). Wireless communication may be used to program the lighting controller 220, activate or deactivate operational features of the controller 220, and remotely control settings on the lighting controller 220. Wireless communication may also be used to input information to the lighting controller 220 that is later used to program the lighting fixture 250 (e.g., activate or deactivate operational features in the lighting fixture). In some cases, the lighting controller 220 may provide a port (e.g., USB port) for a hardwire communication link, or may be communicated with using a power line carrier. The lighting controller 220 may further include a power supply 960 (e.g., for providing DC power to the controller 940), a zero-crossing detector to detect zero crossings of the received AC waveform, and may or may not have status indicators 980.

The control circuit 900 can output a modified AC phase-cut waveform 320, 330 like those shown in FIG. 3A and FIG. 3B and described elsewhere herein. For example, the controller 940 can determine the phase angles or ON-times of the phase-cut waveform based on an input received from the first (intensity-control) channel 920. Additionally, the controller 940 can be configured to modulate the ON-times or phase angles to encode CCT information digitally onto the phase-cut waveform based upon input received through the second (CCT-control) channel 922. The amplitude and/or polarity of modulation for digital encoding may be set to reduce lighting flicker from the lighting fixture below a visibly-detectable level. For example, Manchester encoding as described above may be used so that the average phase angle and ON-time measured over a period of two half-cycles or more is approximately or exactly constant.

According to some implementations, the phase angle may be modulated by an amount in the range from approximately or exactly 50 microseconds to approximately or exactly 200 microseconds to reliably transmit digital data while favorably reducing the size and/or number of filter capacitors required at the lighting fixture 220 to integrate and smooth the voltage provided to the lighting sources 260, 262. The controller 940 can be programmed to communicate with the lighting fixture 250 according to any of the signaling protocols described herein, such as that described in connection with Table 1.

7. Automatic Scaling and Calibration

The inventors have appreciated that lighting controllers 220 with light-dimming technology that may be produced by different manufacturers (or even the same manufacturer) may exhibit different ranges of values for the phase angle (or ON-times) in the output phase-cut waveforms 320, 330. Notably, conventional dimmers 120 from the same manufacturer can exhibit different minimum and maximum phase angles from devices of ostensibly the same model. Such differences could cause two lighting fixtures connected to two different lighting controllers 220 to emit at different intensity levels even though the dimmers may be set to a same position or setting. The difference in intensity can become very obvious to the user when the minimum dimming capability of the lighting controllers 220 and lighting fixtures is less than 5%, for example.

Figure 10:
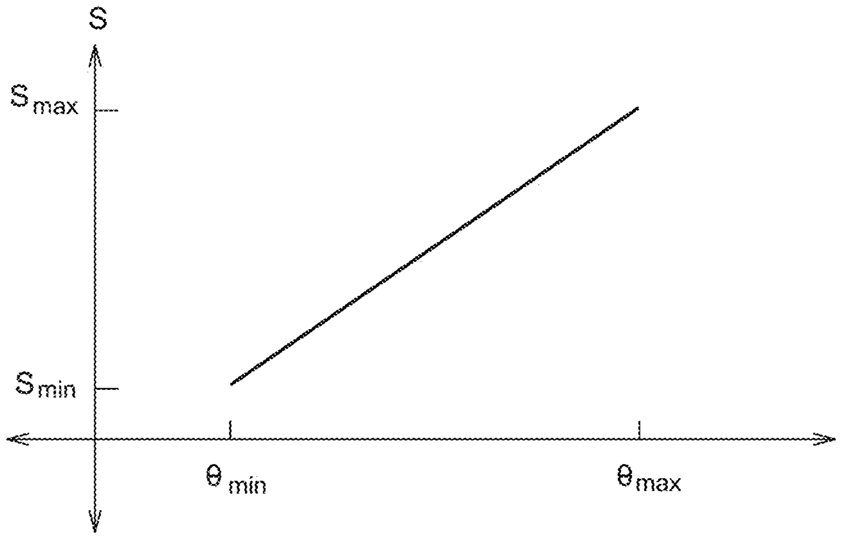
FIG. 10 is a graph illustrating an example method for scaling CCT and/or intensity control signals.

The present invention provides means to automatically scale the received intensity-control signal from a lighting controller 220 (or a conventional dimmer 120) such that the full intensity range of the lighting fixture 260, 262 can be spanned by the lighting controller or dimmer irrespective of the intensity control range (e.g., range of phase angles or ON-times) accessible by the lighting controller or dimmer. The scaling algorithm can use a linear equation that essentially maps the phase angle range or ON-time range spanned by the lighting controller 220 or conventional dimmer 120 to a full intensity-control range of the flyback controller 230-3, as depicted in FIG. 10 for example. An example linear scaling equation may be of the following form:

$$S = a\theta_r + b \tag{2}$$

where a and b are calibration constants, Or is a received phase angle (or ON-time may be used instead), and S identifies a power or intensity setting of the flyback controller 230-3 that determines an output waveform applied to the transistor Q2 in FIG. 5, for example. The power setting may range from $S_{min}$ (which corresponds to a lowest power delivery to the lighting fixtures, and lowest intensity output, e.g., 0.1% of full output value) to $S_{max}$ (a highest power-delivery setting for a highest intensity output). For some implementations, discrete power or intensity setting values Sn may be stored in a look-up table that is referenced by the flyback controller 230-3 to set an output power from the converter 230-2. The current operating power setting S may be determined by the controller 240 or flyback controller 230-3 from received phase angles $\theta_r$ using EQ. 2. The computed value S can then be rounded or otherwise discretized to obtain the nearest discrete power or intensity setting Sn.

The factors a and b may be determined by an automatic calibration routine executed by the lighting fixture's controller 240. The automatic calibration routine can execute a procedure to determine, for example, the minimum phase angle $\theta_{min}$ that the lighting controller 220 or dimmer 120 can output and the maximum phase angle $\theta_{max}$ that the controller or dimmer can output. The values of a and b can then be determined from these values as follows.

$$a = \frac{S_{max} - S_{min}}{\theta_{max} - \theta_{min}} \quad (3)$$

$$b = S_{min} - a\theta_{min} \quad (4)$$

Depending on the capability of the lighting controller 220 or conventional dimmer 120, different values of calibration constants a and b may be used such that the same brightness will be obtained from fixtures connected to different lighting controllers or conventional dimmers when the controllers or dimmers are set to a same setting (e.g., a minimum or maximum setting).

A calibration routine may be implemented in several ways. One way is for the controller 240 or flyback controller 230-3 to initially use default values for $\theta_{min}$ and $\theta_{max}$ and then adjust these values over time during the course of normal operation when smaller and larger values of phase angle are received. The calibration constants can be updated and stored in non-volatile memory. In this manner, the lighting circuit 400, 600 can track and compensate for, on a daily basis, any changes in intensity control ranges from the lighting controller 220 or dimmer 120.

Another way to implement a calibration routine is to prompt a user to adjust the lighting controller 220 or dimmer 120 over its full range. Such prompting may be done after installation of the controller or dimmer or lighting fixture 250 and/or periodically thereafter. The prompting may be initiated by a flashing of the lighting fixture's output in a particular way (e.g., three half-second flashes of light separated by one-half second). The user may then adjust the intensity control at the controller or dimmer over its full range, dwelling at the lowest setting and highest setting. One or both of the foregoing calibration routines may be implemented in a lighting fixture 250. In some implementations, calibration routines may be executed for each color temperature setting, so that the dimmer can span the full intensity range of the lighting fixture without causing flickering at low light levels for each CCT setting.

In some implementations, there can be more than one lighting controller 220 connected to a lighting fixture 250. For example, there may lighting controllers on opposite sides of a room. In such cases, the lighting fixture may obtain calibration factors $a_1$, $a_2$ and $b_1$, $b_2$ from each lighting controller or conventional dimmer connected to the lighting fixture and identify the obtained calibration factors with each controller or dimmer. Identification of a lighting controller may be done by using a complex digital command having multiple data frames as described above or by including a lighting controller ID data field in the digital data frame. In some cases, identification of a conventional dimmer 120 and/or lighting controller 220 may be done by detecting the dimmer's minimum and/or maximum phase angle upon power-up of the dimmer (assuming that each dimmer and/or controller in the circuit has a unique minimum and/or maximum phase angle). Another way to identify conventional dimmers may be through their waveform signatures, which may vary from dimmer to dimmer. For example, waveforms from different controllers 220 or dimmers 120 may have different noise perturbations or ringing features. Once the lighting controller or dimmer is identified, then the corresponding calibration factors ($a_1$, $b_1$) or ($a_2$, $b_2$) can be used for scaling and outputting a correct intensity level.

8. Setting Lighting Fixture Configurations

There may be several ways in which information (other than intensity control and CCT information) can be communicated to and from a lighting fixture 250. Another inventive aspect of the lighting fixture is the ability to set its configuration parameters using a conventional dimmer 120 after the lighting fixture 250 has been installed. Such communication can be advantageous because some operating parameters may not be known until lighting fixtures have been installed and user preferences have been determined. Such configuration parameters may include, but are not limited to: default color temperature, dimming profile, maximum lumen output, etc. In conventional lighting fixtures, such parameters may be set in the factory using proprietary programming tools, dip switches, or hardware configuration resistors, which may preclude adjustment by the user or installer at the installation site.

In some implementations, the lighting fixture 250 can receive a predefined sequence of ON/OFF power cycling using the connected conventional dimmer 120 (or using a lighting controller 220) to place the lighting circuit 400, 600 into a programming mode. For example, the predefined sequence may be four ON/OFF power cycles, each within a predefined time period (e.g., 3 seconds), followed by powering the lighting fixture ON. However, other power cycling patterns may be used. For this example, the power cycling sequence may be (ON then OFF repeated three more times (each within three seconds of the beginning of the prior ON/OFF cycle, then turning the fixture ON). Different commands may be entered with different power cycling sequences.

Once in a programming mode, the lighting circuit 400, 600 may indicate to a user that it is in the programming mode by driving the connected lighting sources 260, 262 in a defined pattern and/or color temperature sequence. In an example programming mode, the lighting circuit 400, 600 may begin to decode the incoming waveform's intensity control signal (e.g., adjusted phase-cut waveform ON-times using a conventional dimmer 120) and adjust the lighting fixture's color temperature, at a fixed output intensity setting for the lighting fixture, based on the incoming AC waveform. In this manner, the user can adjust the intensity or dimmer input of a conventional dimmer at the installation site to set the desired color temperature of the lighting fixture 250. Once the desired color temperature has been reached, the intensity level may be paused for a period of time (e.g., 3 seconds) or power to the lighting circuit 400, 600 may be cycled at least one additional time to store the current setting as the default and/or current operating color temperature. In this way, a conventional dimmer 120 can be used to change the color temperature of the lighting fixture.

In another embodiment, the default and/or operating color temperature may be set by toggling power to the lighting fixture 250 instead of adjusting intensity. The lighting circuit 400, 600 may be placed in programming mode as described above. Once in programming mode and the lighting circuit does not detect changes in intensity for a period of time, it may set the lighting fixture's output to maximum brightness and maximum or minimum color temperature, for example. The lighting circuit 400, 600 can then vary the color temperature at a slow, steady rate such that it would span the full color temperature range of the fixture (e.g., 1800 K-6500 K) over a period of time (e.g., 5 or more seconds) before scanning in the opposite direction. At any time during the color temperature cycling, the user can choose to save the current value by cycling power once more. The last color temperature setting before the power interruption can be saved as the default and/or current operating color temperature. In this manner a user has the ability to set the color temperature of the lighting fixture 250 using nothing more than power toggling of a conventional dimmer 120.

Figure 11:
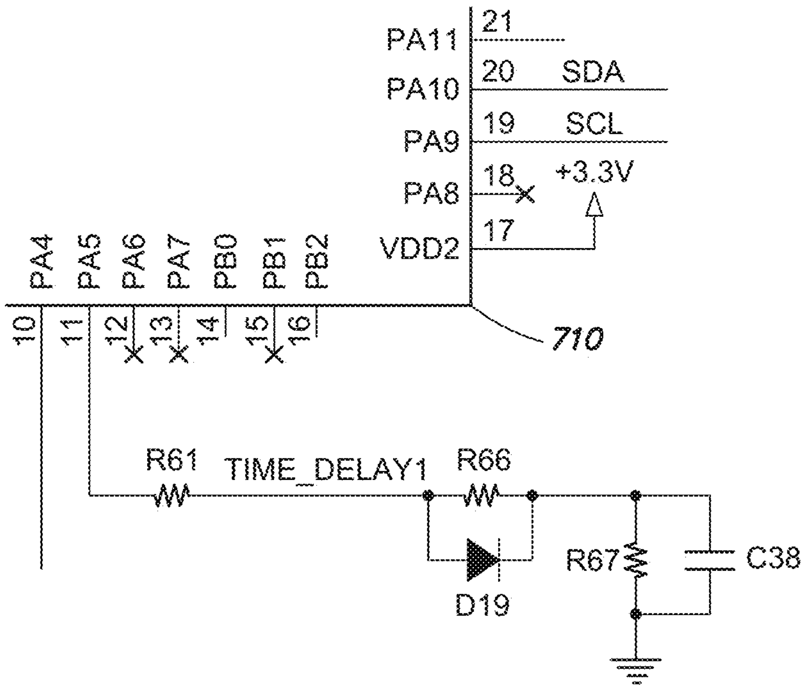
FIG. 11 is a schematic for a charge-storage circuit that may be connected to a microcontroller to detect toggling of power to the microcontroller.

Programming of other parameters or functionalities may be entered by cycling power using different sequences, e.g., fewer or more ON/OFF cycles. Decoding the ON/OFF sequencing can be performed by the controller 240 (such as a microcontroller 710 described above) while it remains powered up. For decoding sequences requiring power to be removed for periods of time, a low-cost charge-storage circuit (depicted in FIG. 11) can be used to determine the length of time and/or number of times that AC power has been removed.

For such an implementation, the microcontroller 710 is configured to drive the line labelled TIME_DELAY1 (connected to pin 11, which is capable of analog input and output) to a logic high level (e.g., 3.3V) when the microcontroller is running in normal operation charging the capacitor C38 up to a value of 3.3V. When power is removed, the stored charge on the capacitor C38 is slowly discharged by resistor R67. Upon power up, the microcontroller 710 reads the voltage on pin 11 and determines the approximate time that power was absent, which is reflected by the amount of charge remaining on the capacitor. The relationship between the voltage on capacitor C38 ($V_c$) and the discharge time ($t_d$) is given by $$V_c = V_s e^{-t_d/RC} \tag{5}$$

where $V_s$ is the initial voltage to which C38 is charged and R and C are the resistor and capacitor values for R67 and C38, respectively. This approach allows the microcontroller 710 to determine whether the power up is a result of a normal powering on of the lighting fixture or a power sequence to program the lighting fixture 250.

The microcontroller 710 can keep track of short power interruptions to determine a programming mode from among a plurality of programming modes. For example, when the AC power OFF-time (no received phase-cut waveform) detected by the microcontroller is less than a predefined threshold (e.g., 5 s) the microcontroller 710 can increment a count value in non-volatile memory and may further record the duration of the OFF time. At the end of the power sequence (e.g., when power has been present for more than a threshold period of time such as 3 s), the microcontroller 710 can identify a particular programming mode based on the final count value and/or duration of OFF-times. The count value can be reset to zero if the OFF-time is determined to be greater than a threshold period of time (e.g., 5 s).

In some cases, a lighting circuit 400, 600 can be equipped with near-field communication (NFC) hardware and firmware. In such implementations, configuration data can be communicated wirelessly to the lighting fixture 250, e.g., using a smart phone or other wireless communication device. To enable NFC, an antenna 270 (depicted in FIG. 2B) such as the Molex 1462360151 antenna (available from MOLEX, LLC of Woburn, Massachusetts) can be located within the lighting fixture 250 (e.g., against a plastic side of the enclosure) and connected to an NFC memory integrated circuit 275 such as the NXP NT3H2111W0FHKH (available from NXP Semiconductors of Eindhoven, Netherlands). The memory IC 275 can also connect to the lighting fixture's controller 240. An external NFC transponder (present in may smart phones) can couple energy to the antenna 270, power up the IC 275, and write and read data to and from the IC chip. This communication can be performed without powering on the lighting fixture 250 with AC power, which is beneficial for setting configurations at a factory. Once the lighting fixture is installed and connected to AC power, the controller 240 can power up and read (and write) the data from (to) the NFC memory IC 275 via a serial protocol, such as I2C.

In this way, configuration parameters for a lighting fixture 250 can be set wirelessly at any time. For example, they may be set at a factory, or by an installer using a smart phone. A configuration software application may be written, used, and distributed by the manufacturer to facilitate wireless setting of configurations. For example, the software application can include menu-selectable configurations and operating parameter values and/or means for users to enter configuration settings and/or parameter values (e.g., text input lines or windows for receiving text entered by a user).

NFC configurability of lighting fixtures 250 can also improve marketability and return on investment for a lighting manufacturer. For example, the consumer pool prefers a variety of features in a lighting fixture, though individual consumers may not want all features or may not be willing to pay for a lighting fixture having all features. From the manufacturer's perspective, it may not make business sense to manufacture and package a variety of different models with different features to satisfy each consumer group within the consumer pool. With NFC configurability, a manufacturer can make and package a single lighting fixture model (e.g., one that operates as a static color temperature, dimmable lighting fixture) but that is capable of many different operational features (such as independent control of CCT and intensity). The manufacturer may then sell for additional revenue software license keys and/or code to unlock and/or make operable additional functionalities of the lighting fixture. For example, features such as "warm-dim" (changing the lighting fixture color temperature toward an amber or lower color temperature when dimmed), independent color temperature and intensity control, color temperature range programmability, etc. can be sold for additional revenue as an upgrade to the static color temperature lighting fixture. Using NFC configurability, lighting fixtures 250 can be sold off the shelf at a price competitive with static color temperature lighting fixtures, and then upgraded according to a consumer's preference. The upgrading may be done, for example, via an on-line marketplace.

In some implementations, upgrading of features may be part of an application that is used to remotely operate the lighting fixture 250 (e.g., an App purchased for a smartphone). The App may be installed on a smartphone and preloaded with credits purchased for a fee. The App may also be preloaded with a license encryption algorithm allowing functionalities on the lighting fixture 250 to be unlocked without needing an internet connection or separate payment to occur. The purchased credits in the App can be consumed to unlock functionalities of the lighting fixture 250.

The NFC memory integrated circuit 275, antenna 270 and controller 240 may also provide means to log device usage information for warranty claim purposes. The usage information stored may include: running hours, peak temperatures, date codes for when features were unlocked and/or enabled, serial number, peak input voltages, and other information. The information stored may be extracted if the lighting fixture 250 is returned as part of a warranty return. The information retrieval process may not require the lighting fixture 250 to be powered with AC, nor for a number of components (which may have failed) to be functional when the stored information is retrieved.

In many cases, an installer (who may be the end user or a professional installer) may install and/or upgrade one or more lighting fixtures 250 in a building or other facility using NFC (or another wireless communication method). An example installation method is described in the following listing of actions. The installation method allows on-site upgrading of lighting fixture functionality. Example acts of such an installation method are as follows:

1. The installer has a smartphone (or other device for wireless communications) that is equipped with NFC (or other wireless communication means). The installer launches the manufacturer's software application.
2. The phone (or wireless device) is moved close to lighting fixture 250 (within wireless communication range) prior to or after installing the fixture in a wall or ceiling or other location.
3. Wireless communication is established between the smartphone (or other device) and the lighting fixture to extract information from the NFC memory integrated circuit 275 or memory accessible to the controller 240 that specifies one or more of the following items of information:
   a. The lighting fixture's physical capabilities (e.g., a list of functionalities the lighting fixture currently supports). The physical capabilities can be a list of all functionalities (selectable and non-selectable) that the lighting fixture supports.
   b. The lighting fixture's selected optional functionalities. This information can comprise a list or bitmask identifying which of the selectable functionalities are, or will be, unlocked upon installation and available for the installer to test or use.
   c. Serial number—a unique identification number for the lighting fixture 250.
   d. License key—an encrypted code that is used to unlock functionalities. The code may be encrypted based, at least in part, on the lighting fixture's serial number, for example. In some cases, further information needed as part of the unlocking algorithm and/or encryption code can include the selected optional functionalities and/or a manufacturer-specific encryption key or algorithm.
4. Based on the lighting fixture's physical capabilities and selected optional functionalities, the installer may be shown what functionalities are currently available (unlocked) and what additional functionalities (currently locked) the installer can purchase.
5. If the installer purchases one or more functionalities, the App can connect to a server over the internet to accept payment for the selected feature(s). The feature(s) can then be made available to the installer's lighting fixture(s).
6. The App may send information to the server that includes: the serial number for the lighting fixture and the desired feature(s) to unlock. In return, the installer's phone (or other wireless device) may receive a new license key.
7. The new license key can be sent to the lighting fixture wirelessly and stored in the NFC memory integrated circuit 275 or memory accessible to the controller 240.
8. Once the lighting fixture 250 is installed and powered, the controller 240 reads the license key from the NFC memory integrated circuit 275 or memory accessible to the controller 240, recognizes all current functionalities that have been unlocked and enables the unlocked functionalities (e.g., executes code, previously blocked, that makes the functionalities operable for the installer).

Other methods of communicating with the lighting fixture to set configuration or parameter values are possible. In some cases, the wireless communication may alternatively or additionally comprise BlueTooth®, Zigbee, or Wi-Fi™i communication methods. For any of the wireless communication methods AC power may be applied to the lighting fixture 250.

9. Additional/Alternative Circuit Components

As discussed above, other means of communicating CCT information and intensity information to a lighting fixture 250 are possible to independently control of color temperature and intensity. Some of these means may use alternative or additional circuit components compared to those shown in the lighting circuits 400, 600 of FIG. 4 and FIG. 6, respectively. Such alternative or additional circuit components will be described next.

As an example, alternative circuit components may be used when the CCT and intensity information are conveyed by varying the ON-time that the lighting controller 220 conducts between a positive half-cycle and a negative half-cycle within a cycle. For example, the conduction time of the positive half-cycle may be used to encode intensity information and the negative half-cycle may be used to encode CCT information. The controller 240 and/or interface circuitry 227, in such implementations, convert the modified phase-cut waveform to two distinct signals, one encoding intensity information and one encoding CCT information for further processing.

Figure 12A:
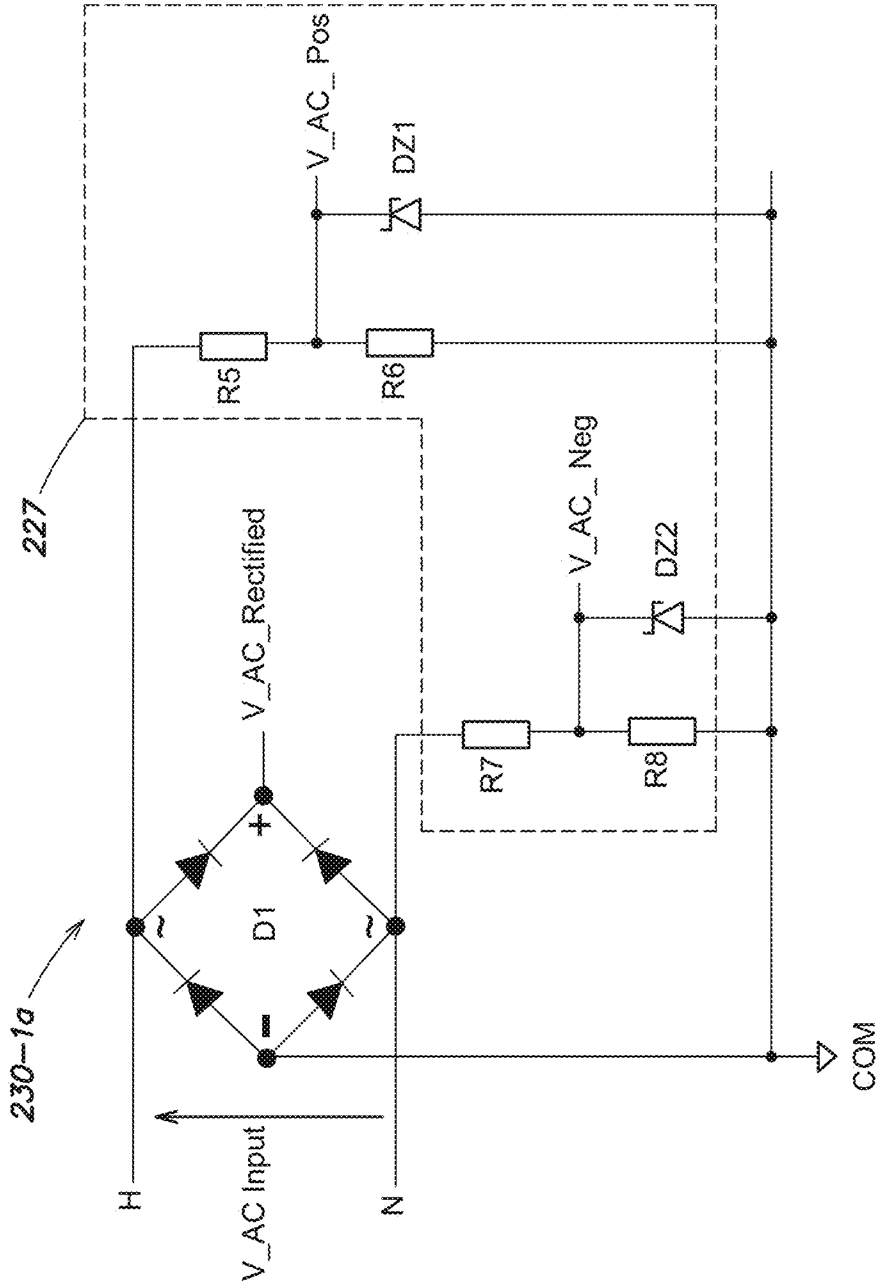
FIG. 12A is a schematic of a rectifier circuit that can be used to produce two isolated waveforms from a received phase-cut waveform or modified phase-cut waveform.

FIG. 12A illustrates a schematic for an alternative rectifier 230-1*a* and interface circuitry 227 that may be used to isolate into two signals the positive half-cycles and negative half-cycles of the phase-cut waveform 320 received by a lighting circuit 400, 600 such that a controller 240 may detect the ON-times in the positive half-cycles and/or negative half-cycles to determine intensity and/or CCT information respectively therefrom. In some cases, the half-cycles encoding intensity information may be provided to the flyback controller 230-3 to determine an amount of power to provide to the lighting sources 260, 262. Resistive dividers R5, R6 and R7, R8 and a bridge rectifier (having four diodes D1) are arranged such that a voltage develops across resistor R6 during the positive AC half cycle and a voltage develops across resistor R8 during the negative AC half cycle relative to a circuit common reference point. Zener diodes DZ1 and DZ2 can be used to clamp the maximum voltage from the resistive dividers (e.g., during a power surge). The resulting output voltages V_AC_Pos and V_AC_Neg can be sampled and/or processed by the controller 240 (and flyback controller 230-3 in some cases) to measure the ON-times in the positive and negative half-cycles and determine the desired intensity and CCT information, respectively.

Figure 12B:
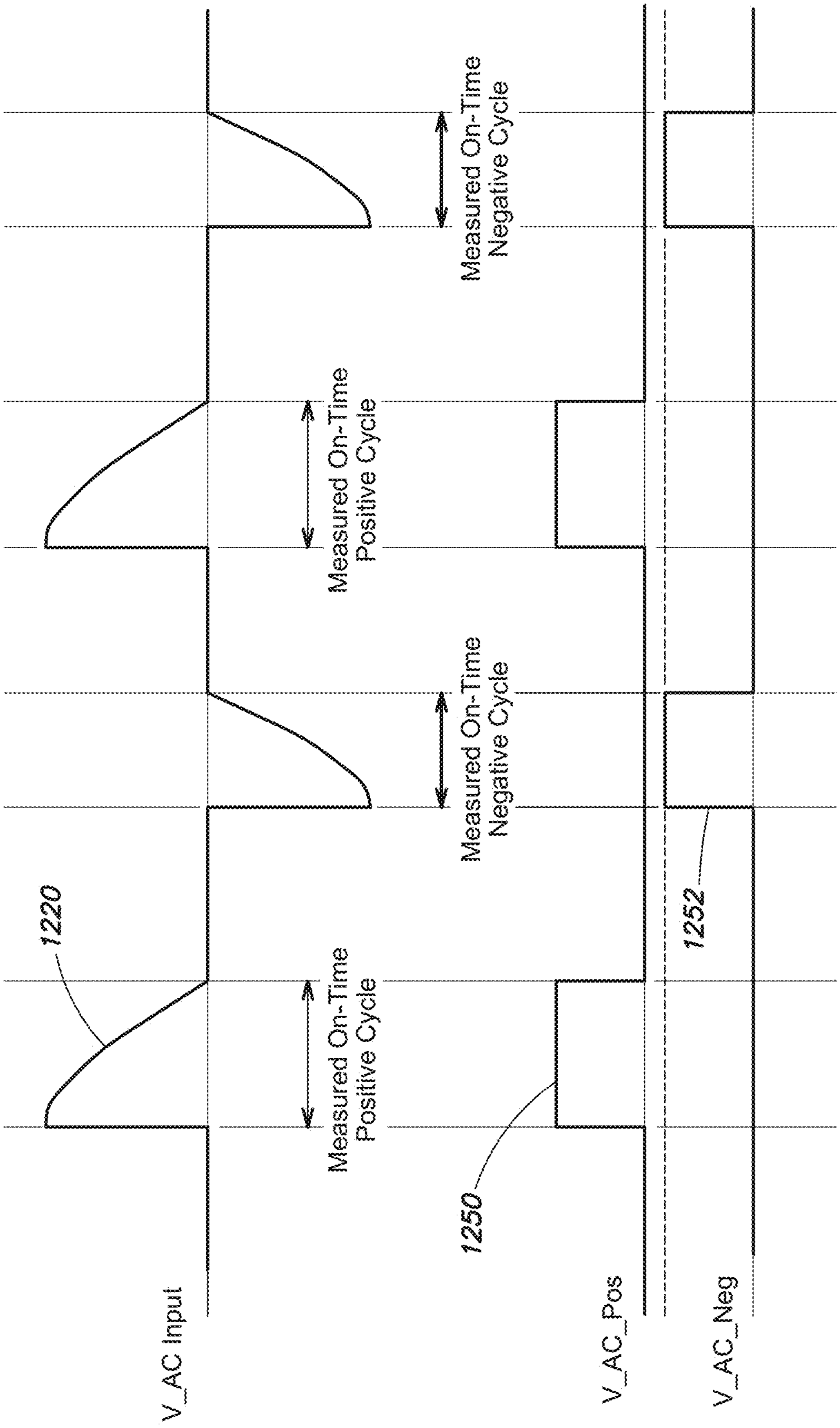
FIG. 12B depicts waveforms associated with the circuit of FIG. 12A.

FIG. 12B depicts an example modified phase-cut waveform 1220 (upper trace) that encodes intensity control information in ON-times of positive half cycles and encodes CCT control information in ON-times of negative half-cycles. Of course, the encoding of the information may be in the opposite half-cycles for some implementations. The drawing also illustrates square waveforms 1250, 1252 that can be produced from the modified phase-cut waveform 1220 using the using the circuitry of FIG. 12A. The controller 240 can determine the durations of the square-wave pulses to evaluate ON-times for each half-cycle. In some implementations, the flyback controller 230-3 may evaluate ON-times for the positive half-cycles.

For a signaling embodiment such as that associated with FIG. 12B, using the full range of an AC half-cycle for conveying CCT information may present a challenge for a lighting circuit 400, 600. In particular, at the lowest (or highest) CCT setting, one-half or more of the AC waveform will be off. The lighting circuit 400, 600 will then be required to store sufficient electrical charge to power the circuit and connected lighting fixture(s) for the period of time that no voltage is present on the AC input line during the cycle. The energy storage capacitor (e.g., capacitor C7 in FIG. 4) would need to be sized to deliver current to at least the lighting sources 260, 262 for the period of time that the lighting controller is not conducting during a cycle. Larger electrolytic capacitors would require an undesirable increase in size and cost to the lighting circuit 400, 600.

To avoid increasing the size and cost of the lighting circuit due to an increase in size for the storage capacitor C7 (for the implementation associated with FIG. 12B and for other implementations described above and/or below), the phase-angle control range for encoding CCT and/or intensity information into the phase-cut waveform's half-cycles can be limited below their full range (0-180 degrees), such that power is provided to the lighting circuit 400, 600 for a significant portion of the AC half-cycles that is sufficient to power the lighting sources through the OFF-time in the AC cycle. For example, the ON-time or phase angle control range in the CCT half-cycle could be restricted to vary from approximately or exactly 100% conduction (ON for 180 degrees) down to approximately or exactly 60% conduction (ON for 108 degrees) to convey CCT information sufficient to control the color temperature output from the lighting fixture 250 from approximately or exactly 6500 K down to approximately or exactly 1800 K. The 60% conduction time would aid in delivering power to the lighting circuit 400, 600 for driving the lighting sources 260, 262 during the OFF-time in the waveform, thereby requiring less energy storage in the capacitor C7 compared to where the ON-time is decreased to 10% of the half-cycle. Scaling of the ON-time or phase angle range to map to a full range of color temperature can be implemented as described above in connection with FIG. 10. The same approach may be used to limit the OFF times in the half-cycles that communicate intensity control information.

Figure 13:
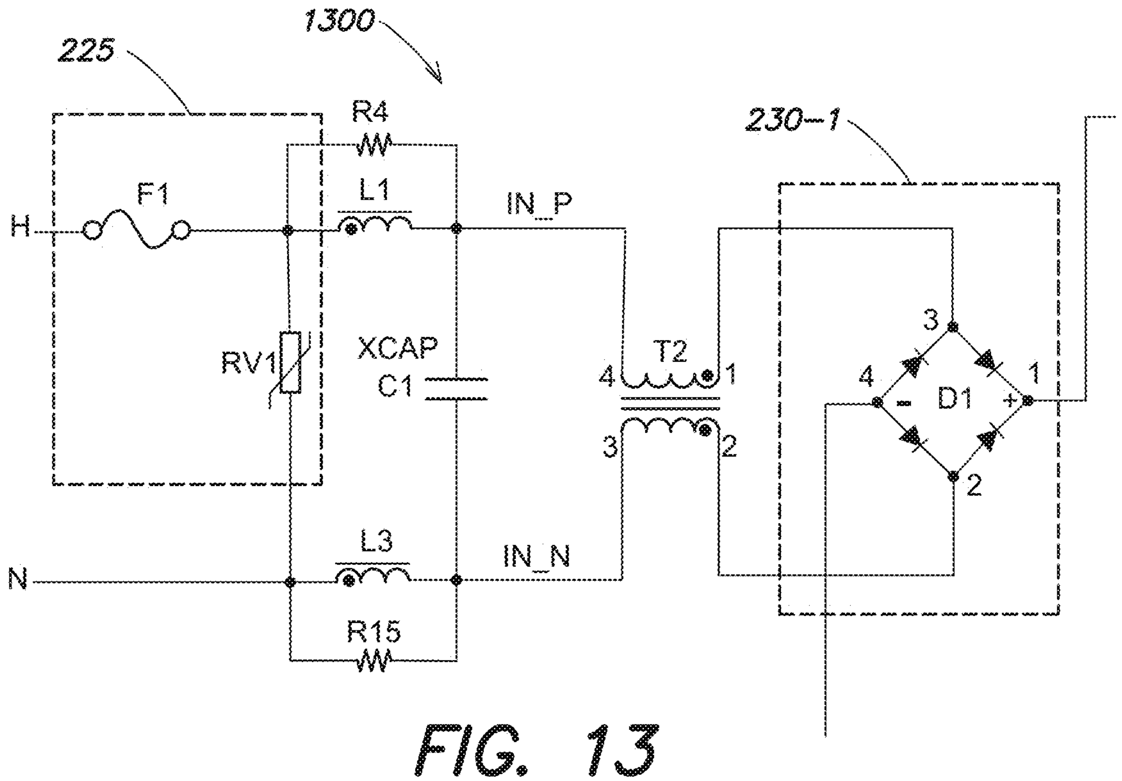
FIG. 13 is a schematic of input circuitry that includes additional filtering and overvoltage protection and that may be used on the lighting circuits of FIG. 4 and FIG. 6.

In some implementations, it can be beneficial to include filtering at the input of a lighting circuit 400, 600 additionally or alternatively to filtering used in the lighting circuit. FIG. 13 illustrates a schematic of input circuitry 1300 with filtering components that can be included before a rectifier 230-1, 230-1*a* of a lighting circuit. The input circuitry 1300 may include two filters (one filter comprising inductors L1, L3, resistors R4, R15, and capacitor C1 and one filter comprising transformer T2) for receiving the modified phase-cut waveform 320, 330, 1220 and preventing noise generated in the lighting circuit 400, 600 from escaping onto the AC power line. According to some implementations, the protection circuitry 225 can further include a varistor (RV1) for clamping the incoming voltage during a voltage surge.

Figure 14:
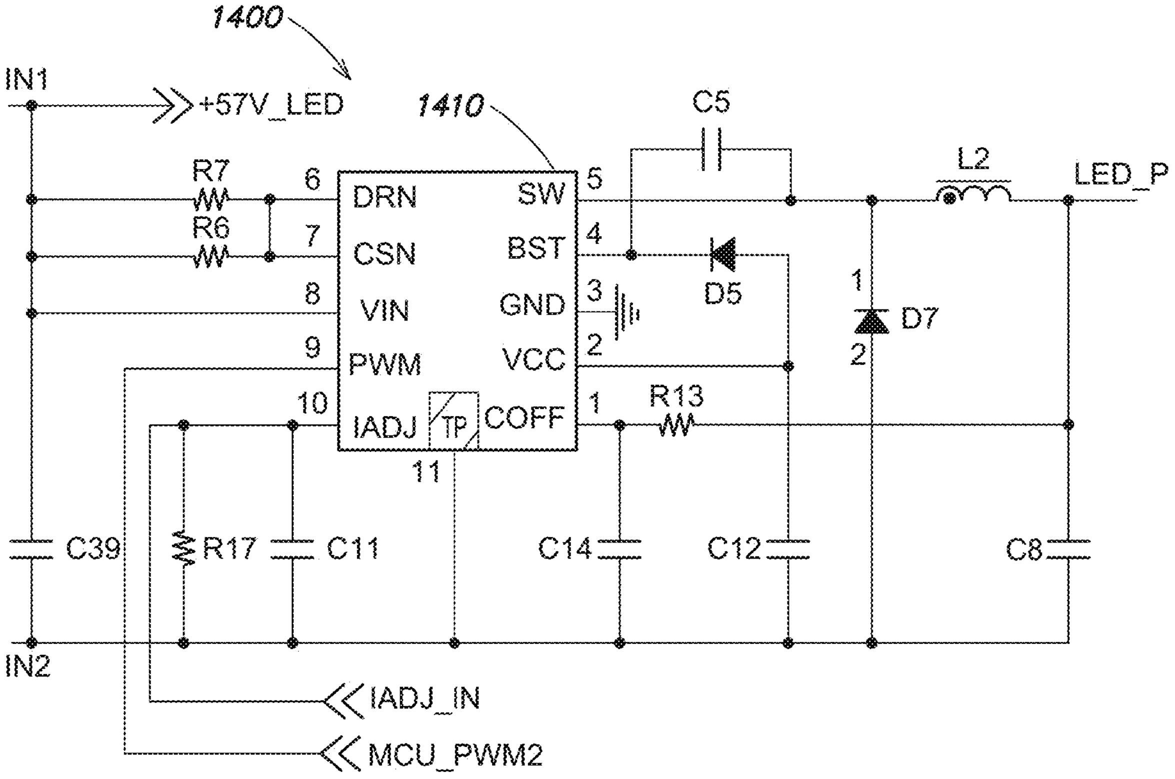
FIG. 14 is another example schematic of a flyback controller that may be used with the lighting circuits of FIG. 4 and FIG. 6.

For some implementations, a constant-current buck supply may be used to provide power to one or more lighting sources 260, 262. For example, a buck supply may be used to step down voltage from the rectified voltages to a voltage level that is more suitable to apply to the lighting sources 260, 262. A schematic for an example buck supply 1400 is illustrated in FIG. 14. The buck supply may connect at its input (IN1, IN2) across the terminals of the transformer's storage capacitor C7 (see, FIG. 4). Input IN2 may connect to a reference potential, such as ground. An output of the buck supply may connect to the converted voltage line 409. As such, the buck supply 1400 can provide a second conversion stage between the converter 230-2 and the lighting sources 260, 262 (before or after the ripple-reduction stage 440).

The buck supply 1400 may comprise a buck controller IC 1410, an inductor L2, and diode D7 to deliver a constant average current into capacitor C8. An example buck controller IC 1410 is model TPS92515 LED driver chip available from Texas Instruments of Dallas Texas. The buck controller IC 1410 may control the current flow to capacitor C8 by adjusting the duty cycle at which voltage is applied to inductor L2. The duty cycle and current flow to capacitor C8 may be set by an input on the controller IC 1410, e.g., by a voltage applied to a current-adjustment input (pin 10, IADJ_IN). Some controller ICs 1410 (such as the TPS92515) may provide means to pulse-width modulate the output current by applying a PWM signal to a PWM input pin (pin 9, MCU_PWM2). When pin 9 is a logic HI on the TPS92515, the chip's current output (pin 5) is enabled and it drives a current into capacitor C8, that current being proportional to the signal voltage applied to pin 10, IADJ_IN. Conversely, when pin 9 is a logic LO, the no current is driven into capacitor C8.

The brightness of a lighting source 260, 262 (such as an LED lighting source) may be controlled by controlling the amount of DC current that is delivered to and can flow through the lighting source, by adjusting the duty cycle for ON-OFF modulated current that flows through the lighting source, or by doing both simultaneously. Reducing the amplitude of DC current flowing through an LED lighting source reduces the light output as does reducing the duty cycle when the current is ON/OFF modulated. Of the two techniques, reducing the amplitude of DC current is preferable as it does not rapidly modulate the intensity of the LED to potentially cause flickering. However, DC current reduction via adjusting amplitude can present greater complexity when reducing currents to very low levels (such as 0.1% of full current). Controlling current flow accurately over such a wide dynamic range (a factor of 1000 or more) can be difficult to implement with low-cost circuit components. Adjusting current flow accurately (and lighting source brightness) over a wide dynamic range (up to a factor of 10,000 or higher) using PWM and/or change in duty cycle can be easier and less costly to implement with low-cost circuitry. For example, a controller 240 (already present in the lighting fixture 250) or timing circuits can be adapted to provide sufficiently accurate control signals for PWM and/or duty cycle control of the buck controller IC 1410. To avoid potential perception of flickering by the human eye and to meet regulatory standards, the frequency of the PWM or ON-OFF modulated current delivered to the lighting source(s) 260, 262 can be kept in excess of 1 kHz.

Referring again to FIG. 7, a microcontroller 710 may provide signals to the buck supply 1400 for current control via duty cycle and/or PWM control. For example, the signal line labeled MCU_APWM (connecting to pin 14 of the microcontroller) can carry a PWM signal that is output from the microcontroller 710. The signal can be low-pass filtered using an RC circuit comprising resistor R50 in series with capacitor C33. The combination of resistor R50 and capacitor C33 is sufficient to provide a stable DC voltage signal on capacitor C33, which voltage signal can be output as the signal IADJ_IN that is applied to pin 10 of the buck controller IC 1410, shown in FIG. 14. Some microcontrollers may have the capability to generate the desired waveforms without additional logic hardware.

The microcontroller's output MCU_PWM2 (pin 25) can connect to the buck controller IC 1410 PWM control input (pin 9) to PWM the output of the buck controller IC 1410. When MCU_PWM2 is a logic level high, the output of the buck controller IC 1410 is enabled and current flows into capacitor C8. When MCU_PWM2 is a logic Low, the buck controller IC's output is disabled and no additional current flows into capacitor C8.

For the example implementation described above that utilizes the buck supply 1400, the combination of signals MCU_APWM (converted to IADJ_IN) and MCU_PWM2 from the microcontroller 710 control the amount of current provided to the energy storage capacitor C8, which will control the output brightness of the LED lighting sources 260, 262. Because the duty cycle or pulse widths of these signals can each be controlled with high accuracy (e.g., up to 8 bit precision or more), the current delivered to capacitor C8 can be controlled over a wide dynamic range (e.g., up to 16 bits). An output from the capacitor C8 (labeled LED_P in FIG. 14) can connect to the output voltage line 409 in the lighting circuit 400, 600 to deliver power to the lighting sources 260, 262.

Additionally, the controller 240 of the lighting circuit 400, 600 can provide a modulated signal (PWM or duty-cycle controlled) that defines the relative proportion of time current flows between at least the two lighting sources 260, 262. For example, the output (pin 26) from the microcontroller 710 (labeled MCU_PWM1) can be a PWM signal or duty-cycle controlled signal that is applied to switch 450 of the lighting circuit 400, as described above. For an implementation where a buck supply 1400 is used in combination with and controlled by the microcontroller 710, the current flow for the various states of the logic control signals (MCU_PWM1, MCU_PWM2) can be summarized according to Table 2 below. The table can be understood referring to FIG. 4, FIG. 7, and FIG. 14 with the additional caveat that the buck supply 1400 is added between the converter 230-2 and lighting sources 260, 262 of FIG. 4. It will also be understood from the foregoing discussion that the amount of current flowing additionally depends on the value IADJ_IN that is output from the microcontroller 710. When a buck supply 1400 is used in the lighting circuit 400, 600, a flyback controller 230-3 may provide a constant DC voltage to the buck supply. The buck supply can then be used to control the current through the lighting sources 260, 262. Dimming can be controlled using the buck supply.

TABLE 2

Current Control Truth Table

| Outputs from microcontroller | | Current to C8 in buck | Current flowing through: | |
|---|---|---|---|---|
| MCU_PWM1 | MCU_PWM2 | supply | LED1 | LED2 |
| 0 | 0 | 0 | 0 | 1 |
| 1 | 0 | 0 | 1 | 0 |
| 0 | 1 | 1 | 0 | 1 |
| 1 | 1 | 1 | 1 | 0 |

It may be understood from Table 2 and the associated circuits how current can be controlled (e.g., by a microcontroller 710, buck supply 1400, and current controller 230-4) to provide suitable voltage and current to LED lighting sources 260, 262 for independent control of intensity and color temperature from a lighting fixture 250. Although Table 2 provides an example for a two-stage power supply that includes a buck supply 1400 for one stage, a lighting circuit 400, 600 may be implemented as a single-stage supply without the buck supply, as depicted in FIG. 4 and FIG. 6.

10. Alternative Methods for Transmitting CCT and Intensity Information

There are additional methods for conveying CCT and/or intensity information from a lighting controller 220 to a lighting fixture 250. Generally, information may be conveyed using analog or digital methods. Analog methods may convey CCT and/or intensity information based on ON-time, OFF-time, detected phase angle, pulse width, integrated voltage over a half-cycle or cycle, relative values thereof (e.g., differences in ON-time between successive cycles), average values thereof, or some combination of the foregoing values. Digital methods may convey CCT and/or intensity by modulating a phase-cut waveform to encode digital bit signatures onto the waveform which can be detected by the lighting circuit 400, 600 and used to decipher digital commands and/or data transmitted by the lighting controller 220. Some alternative analog and digital methods will now be described.

10.1 Analog Methods

One analog method for conveying CCT and intensity control information was described briefly above in connection with FIG. 12B. According to this method, CCT information is conveyed as the phase angle or ON-time in one half-cycle (positive or negative) of a phase-cut waveform's cycle and the intensity information is conveyed as the phase angle or ON-time in the other half-cycle of a phase-cut waveform's cycle. The controller 240, may analyze one or both of the alternating half-cycles of the waveform to decode at least CCT information and possibly intensity control information. In some implementations, the flyback controller 230-3 may analyze half-cycles carrying intensity information. Accordingly, the outputs from the controller 240 (and possibly flyback controller 230-3) depend upon absolute values of phase angle or ON-times.

Another analog method for conveying CCT and/or intensity control information involves detecting relative changes or differences in phase angles or ON-times, which are modulated from cycle to cycle of the phase-cut waveform 320. Using the absolute phase angle (or ON-time) detected during one half-cycle to decode CCT information, for example, may be prone to potential error as many factors can influence the absolute value measured including the dimmer or lighting controller settings, the AC line voltage, and electronic component tolerances. Variations in the absolute values could result in an error in the output CCT value which may further result in noticeable differences in color temperatures between lighting fixtures 250.

To avoid such variations, a difference in modulated phase angle (or ON-time) from cycle to cycle could be implemented by the lighting controller 220 and detected at the lighting fixture 250 by the appropriate controller 240, 230-3. Such a difference or relative value can cancel out error sources that equally affect the phase angle on each cycle. For this method, the lighting controller 220 may convey CCT and/or intensity control information by oscillating the phase angle of the sharp rising edge between two values (e.g., 25 degrees and 29 degrees) on successive waveform cycles (in either one or both of the waveform's half cycles). A color temperature setting may be determined from the amount of modulation (4 degrees in this example). A microcontroller, for example, can be used to detect the differences in the phase angles of the sharp rising and/or falling edges of the phase-cut waveform 320 between successive cycles (and/or detected ON-times). The oscillating phase angle may be modulated continuously for a limited number of cycles so that signal averaging and/or filtering can be used to improve decoding accuracy.

According to some implementations, the CCT information may be encoded in one or both half-cycles of each waveform cycle for which modulation of phase angles or ON-times occurs. In such implementations, the intensity control information may be contained sufficiently accurately in the average phase angle (or average ON-time), and modulation to encode intensity information may not be needed. For example, intensity information can be determined by the flyback controller 230-3 as described above in connection with FIG. 4. Alternatively, intensity information may be determined from the larger or smaller phase-angle values (or ON-time values) in each waveform cycle.

According to one implementation, the controller 240 determines the average ON-time of odd half-cycles $t_{ON,agv1}$, the average ON-time for even half-cycles $t_{ON,agv2}$, and the difference $\Delta t_{ON}=t_{ON,agv1}-t_{ON,agv2}$ between the two average values. The controller 240 uses the difference $\Delta t_{ON}$ to determine the operating color temperature for the lighting fixture and uses the greater (or smaller, or average) of the two average measurements to determine the operating intensity. The controller 240 may refer to look-up tables or use an algorithm to map the determined difference $\Delta t_{ON}$ and average ON-time to a color temperature and brightness and/or to set signal characteristics (e.g., pulse width or duty cycle) for one or more signals used in the lighting circuit 400, 600 to control color temperature and brightness from the lighting fixture 250. Example differenced in ON-times may be up to 0.5 millisecond or up to 1 millisecond when modulated to encode CCT information, though lower or higher maximum values may be used. Example differences in phase angles may be up to 10 degrees or up to 20 degrees, though lower or higher maximum values may be used. At a maximum difference, all or a majority of current output from the converter 230-2 may flow through a first lighting source 260. At a minimum difference, all or a majority of current may flow through a second lighting source 262 so as to vary the fixture's color temperature.

Figure 15:
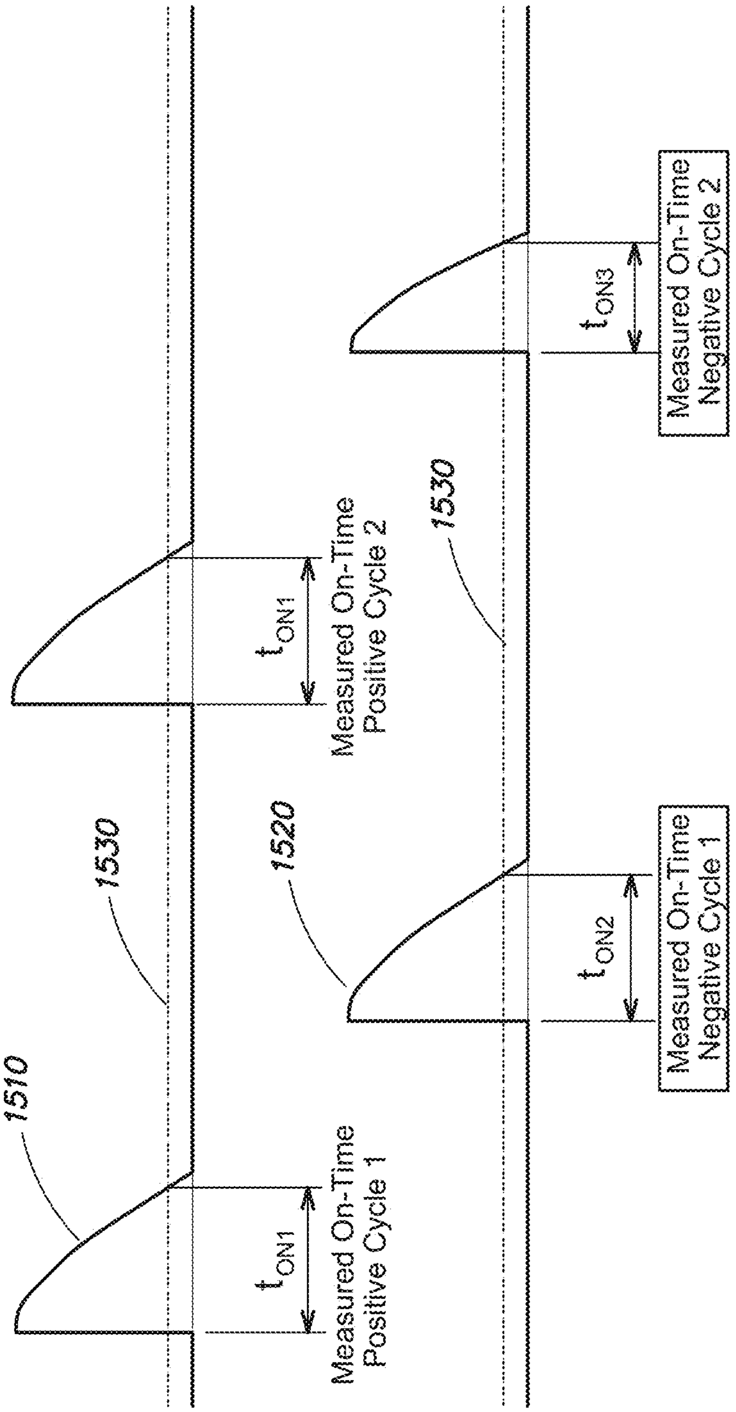
FIG. 15 illustrates modified phase-cut waveforms associated with a method of encoding CCT and intensity control information.

In another analog implementation, the controller may receive two signals 1510, 1520 as depicted in the example of FIG. 15. The first signal 1510 may represent positive half-cycles in a received modified phase-cut waveform, which in this example encode intensity control information. The second signal 1520 can represent negative half-cycles, which have been modulated to encode CCT information. The controller 240 (and flyback controller 230-3 in some cases) may determine ON-times as signal durations above threshold levels 1530. The controller 240 or flyback controller 230-3 may determine an intensity setting from the first signal's ON-times $t_{ON}$ or a running average of ON-times for a limited number of cycles, as described above. The controller 240 may further determine the desired color temperature from the difference ($t_{ON3}-t_{ON2}$) between successive negative AC half cycle ON-times, which are modulated, or from a running average of differences in ON-times for a limited number of cycles.

According to another analog implementation in which CCT and intensity control information are conveyed in half-cycles, the controller 240 and/or flyback controller 230-3 may determine the desired intensity from the positive (or negative) AC phase-cut waveform's half-cycle phase angle or ON-time, which may be a static value for each intensity setting. The controller 240 may also determine the desired color temperature from a difference between the (average) positive AC half-cycle phase angle ON-time and (average) negative AC half-cycle phase angle or ON-time. The difference may be determined within each waveform cycle in some cases, or may be averaged over a limited number of cycles, as described above.

Figure 16:
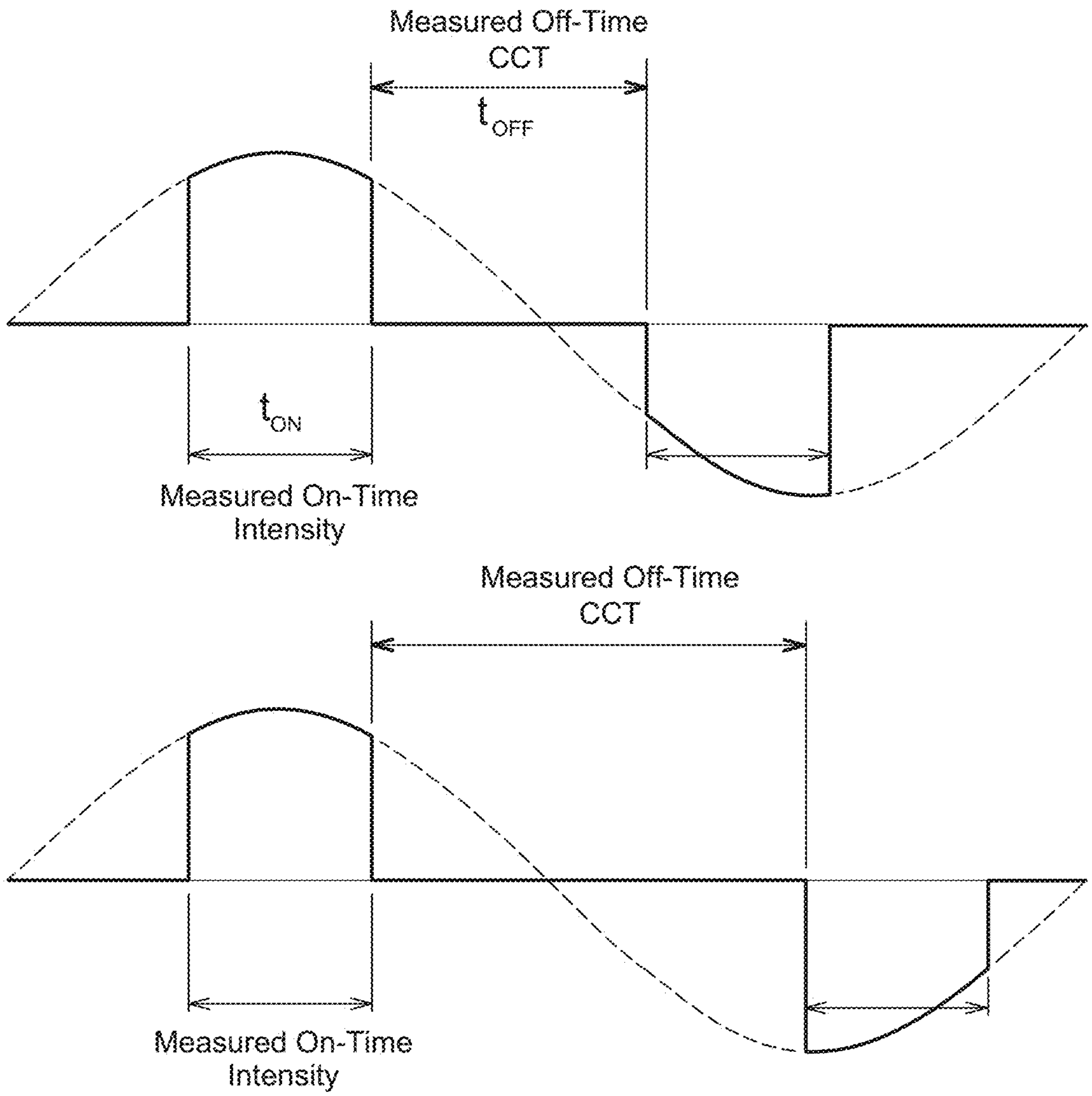
FIG. 16 illustrates modified phase-cut waveforms associated with a method of encoding CCT and intensity control information.

In another analog implementation, the phase-cut waveform generated by the lighting controller 220 may be a 'center-cut' type as shown in FIG. 16. The intensity information may be conveyed by the lighting controller 220 and decoded by the controller 240 or flyback controller 230-3 based on the ON-time $t_{ON}$ of the conducting portion of the phase-cut waveform (or on an average ON-time over a limited number of cycles). The CCT information may be conveyed and decoded based on the OFF-time $t_{OFF}$ between conducting portions or pulses (or on an average OFF-time over a limited number of cycles).

The decoded phase angle (and/or ON-time) ranges for CCT and intensity control can be scaled as described above in connection with FIG. 10 to map to a full range of color temperature and/or full range of intensity. An intensity scaling algorithm may include some non-linear elements to account for perceived brightness effects, thermal foldback, nonlinear intensity output, etc. In some cases, a scaling algorithm may include corrections for other factors, such as lighting source (LED) aging, ambient temperature, etc. A scaling algorithm may be implemented, at least in part, using a look-up table.

According to some implementations, a settable default color temperature (set according to any of the above-described methods for setting the fixture's operating configuration or default color temperature) may be implemented by the controller 240 when detected differences in ON-time or phase-angle modulations are less than a predetermined value. This would allow operation of the lighting fixture 250 at a user-selectable color temperature (the default color temperature) with a conventional dimmer 120.

In some implementations, warm dimming may be implemented with a conventional dimmer 120 where the user may set color temperature values for the extremes of the warm dimming range. For example, the user may set a maximum CCT value for a highest lighting color temperature and a minimum CCT value for a lower lighting color temperature. As intensity is adjusted with the conventional dimmer, the controller 240 can change the color temperature output from the lighting fixture between the maximum CCT value and the minimum CCT value in a gradual and continuous or semi-continuous manner.

For implementations that convey CCT and/or intensity control information to the controller 240 as described herein, one or two signals may be provided to the controller. For example, a single signal such as that shown in FIG. 3A, or a signal derived therefrom, may be provided to the controller 240, and the controller can analyze each half-cycle. In some cases, the controller may, for example, analyze first alternating half-cycles (e.g., positive or odd half-cycles) for intensity control information and analyze second alternating half-cycles (negative or even half-cycles) for CCT information. Alternatively, an input circuit like that shown in FIG. 12A may be used to produce two separate signals (e.g., one for positive half-cycles and one for negative half-cycles) which, or from which signals derived therefrom, are provided to separate input ports of the controller 240 for analysis.

In another analog implementation, CCT information may be conveyed with an additional ON-time or conduction pulse 1750 within each cycle of a modified phase-cut waveform 1730. Example waveforms for such an implementation are illustrated in FIG. 17A through FIG. 17F. The additional conduction pulse 1750 may be present in one half-cycle of each waveform cycle, as shown, or within both half-cycles for some implementations. The additional conduction pulse 1750 may have rising and falling edges that occur while the AC voltage is above a minimum threshold value to aid in accurate pulse width detection and measurement of the additional conduction pulse. The width of the additional conduction pulse 1750 may be used to convey the CCT information. The waveforms shown in FIG. 17A, FIG. 17B, and FIG. 17B may be example waveforms corresponding to a highest intensity setting for the lighting fixture 250. The waveforms shown in FIG. 17C, FIG. 17D, and FIG. 17E may be example waveforms corresponding to a lowest intensity setting for the lighting fixture (e.g., as indicated by the shorter total ON-time within a cycle). For this example, reverse phase control is used to generate the phase-cut waveform 1720, though forward phase control may be used to produce the phase-cut waveforms for alternative embodiments. The architecture shown in FIG. 2B may be used to implement this analog method.

The energy or ON-time allotted for the additional conduction pulse 1750 may be subtracted from the main conduction pulse of the same polarity within each cycle in order to keep the total conduction time or energy in the modified phase-cut waveforms 1730 approximately or exactly constant from cycle to cycle. This can be done at the lighting controller 220 by additionally using forward phase control to delay the start of the conduction time in cycles that include an additional conduction pulse 1750. Keeping the overall conduction time or energy in each cycle constant can allow a simplified single-stage, constant-current, flyback controller 230-3 to be used in the lighting circuit 400, 600 to control intensity output from the lighting fixture 250 (as described above). The fixture's output intensity can be based on the received phase-cut waveform's total ON-time in each cycle. The CCT information (encoded as the duration of the additional conduction pulse 1750) may be decoded by the controller 240 executing an algorithm, which can then control the current controller 230-4 according to the detected color temperature information to output the desired color temperature from the lighting fixture 250. Either of the lighting circuits 400, 600 described above may be used for this implementation.

For such an implementation, the ON-times and or their separations may be constrained to improve signal decoding accuracy. For example, the additional conduction pulse 1750 may be separated from the prior conduction pulse by at least 0.6 milliseconds or some other time and have a minimum ON-time of at least 0.3 milliseconds or some other duration. The maximum ON-times of the larger conduction pulses may be restricted or clamped to 6.2 milliseconds, or another selected duration, when the additional conduction pulse 1750 is present.

When CCT information is not being conveyed, the phase-cut waveform 1720 received from the lighting controller 220 may appear as a conventional phase-cut waveform having no additional conduction pulse 1750. However, if CCT information is conveyed continuously, then the additional conduction pulse 1750 may always be present in the modified phase-cut waveform. FIG. 17B and FIG. 17E illustrate example modified phase-cut waveforms 1730, 1734 for two different intensity settings (indicated by different total ON-times in each cycle) and a same first CCT setting (indicated by the same width of the additional conduction pulse 1750, 0.3 milliseconds in this example). FIG. 17C and FIG. 17F illustrate example modified phase-cut waveforms 1732, 1736 for two different intensity settings and a same second CCT setting (indicated the additional conduction pulse duration of 0.9 milliseconds) that differs from the first CCT setting of FIG. 17B and FIG. 17E. The first and second CCT settings may be extremes of the color temperature range for the lighting fixture 250. The CCT information may be conveyed only after user adjustment of the lighting controller, periodically thereafter, and/or continuously.

Another analog method for conveying CCT information modulates the ON-time of half-cycles within a cycle temporarily by a small amount (e.g., for one or two cycles). The lighting controller 220 normally provides a standard phase-cut waveform according to a desired intensity setting and temporarily changes the phase angle by an amount for one or both half-cycles of the AC half cycles within one, two, or three consecutive cycles (though more may be used). After the temporary change, the lighting controller resumes outputting a waveform according to the previous intensity setting whereas the lighting fixture outputs a new color temperature based on the temporarily conveyed CCT information. The amount of change in ON-time during the temporary modulation can be used to determine the color temperature setting or may be used to determine an incremental change in color temperature (e.g., increase by 200 K, decrease by 200 K). The direction of the change can be the same for half-cycles and/or cycles, or may be in opposing directions for half-cycles and/or cycles. Such a method may incur a temporary modulation or flicker in intensity output from the lighting fixture, which can confirm receipt of the command to change color temperature.

10.2 Digital Methods

The inventors have recognized and appreciated that conveying CCT and/or intensity control information by varying a triac's or MOSFET's ON-time can be prone to variation between different lighting circuits 400, 600 as their operating clocks may not be synchronized. For example, low-cost microcontrollers that incorporate internal RC oscillators for timing reference may drift in frequency over time and with changes in temperature. Any difference in frequency between oscillators in different lighting fixtures 250 would result in a different timing measurement of ON-times, for example. Different ON-time measurements by different microcontrollers could result in different fixtures connected to the same lighting controller 220 outputting different color temperatures, which may be visible and undesirable to the end user.

In addition to the digital approaches described above in connection with FIG. 3A through FIG. 3C, there are other methods to encode CCT and/or intensity information digitally to overcome such limitations of analog control. According to some implementations, the CCT information may be conveyed digitally by modulating the delay time of pulses in a center-cut waveform 1820, as depicted in FIG. 18, while maintaining a constant ON-time from cycle to cycle. Under normal intensity operation (no digital data being transmitted), the conduction pulses 1840 from the lighting controller 220 are centered in the half-cycles of the phase-cut waveform. The intensity for the lighting fixture can be determined by the ON-time of the conducting pulse, for example. Binary data (digital bits) can be encoded onto the waveform 1820 by temporarily shifting the conduction pulse position relative to the AC zero crossing as illustrated in the drawing. For example, a shortening of the time between the zero crossing and the pulse's leading edge can indicate transmission of a '0' binary bit; a lengthening of this time can indicate transmission of a '1' binary bit. Any suitable number of bits may be transmitted in a data frame, as described above. For the illustrated example, five bits ([0 0 1 0 1]) are transmitted over two and one-half waveform cycles.

The lighting circuit's controller 240 can detect the pulse shifts and decode the digital data stream based on the detected pulse shifts in the received phase-cut waveform 1820. By sampling the received phase-cut waveform 1820 for a number cycles, the controller 240 (e.g., a microcontroller 710) can determine the period of the phase-cut waveform, when the conduction pulse 1840 turns on, and whether the turn-on time or phase angle is static (e.g., not varying by more than an amount that may be characteristic of random noise variations) and/or centered within the detected period. The controller 240 can then monitor the received waveform 1820 for changes in turn-on times of the conduction pulses 1840 that are significant (i.e., encode digital bits). The controller may predict when the next conduction pulse should begin and/or end. If a conduction pulse shift is detected by at least a threshold amount in either direction, the controller 240 can then interpret the detected shift as binary data and record the data bit. In some implementations, filtering with a window comparator may be used to reduce detection and interpretation of spurious noise as a data bit. For example, the filtering may require both edges of the pulse to have shifted by an amount within a defined range (e.g., from 200 microseconds to 250 microseconds, though other ranges are possible). The controller 240 may interpret an early turn-on of the conduction pulse 1840 as a logic LO bit '0' and a delayed delayed turn-on as a logic HI bit '1', or vice versa. The process continues until the controller decodes all data bits in a transmission sequence, such as the number of bits comprising a data frame. The controller 240 can then decode the data frame to determine the desired CCT setting. A flyback controller 230-3 can be used as described above to determine an amount of power to provide to the lighting sources 260, 262 to control a total intensity output from the lighting fixture 250.

The modulation for the digital data stream does not affect the ON-time in each half-cycle of the phase-cut waveform 1820. Although the phase or temporal shift of the center pulse is illustrated in FIG. 18 as a large shift (approximately 40 degrees, nearly 2 milliseconds), the phase or temporal shift may be much smaller (e.g., less than 200 microseconds). Having a constant ON-time and utilizing small shifts in the conduction pulse 1840 means that to first order, the energy delivered by the flyback controller 230-3 and converter 230-2 to the lighting sources 260, 262 is minimally affected and may not cause any visible flicker in the light output from the lighting fixture 250. Additionally or alternatively, one or more idle (non-digital-encoding) cycles may be output between cycles that encode a digital bit to reduce the potential of lighting flicker.

Although the embodiments described above pertain mainly to controlling lighting fixtures, the methods of communicating over conventional AC wiring may be used with other devices or loads for which phase-cut waveforms may be used to convey a change in two operating characteristics. Such devices may comprise adjustable heaters (controlling heating element current and fan speed for heat distribution, for example), adjustable cooling fans (controlling fan speed and fan direction), and electric motors (controlling motor speed and coolant flow to the motor, for example). As may be appreciated from the foregoing description, the methods of communicating comprise conveying first control information (intensity control) and second control information (color temperature control) as two independently adjustable parameters in a modified phase-cut waveform that can deliver the control information, and power for operating a device, over conventional AC wiring. With digital encoding of information onto the phase-cut waveform, the number of operating characteristics that can be controlled can be more than two. For example, digital data frames can include identifiers to associate a command in a data frame with a particular operating characteristic. Decoding algorithms at the device (e.g., lighting fixture 250) can detect the identifiers and route the command appropriately.

11. Configurations

Various configurations of the inventive apparatus and methods may be implemented or practiced. Examples of such configurations are listed below but are not the only possible configurations in which the inventive apparatus and methods may be implemented or practiced.

(1) A lighting circuit comprising: an input to receive an alternating current (AC) modified phase-cut waveform having multiple cycles including a plurality of ON-times and a plurality of phase angles, wherein each cycle of the multiple cycles includes two or more ON-times and two or more phase angles; a rectifier to rectify the modified phase-cut waveform; an AC-to-DC converter connected to the rectifier; a flyback controller arranged to sense the modified phase-cut waveform or a first signal representative of the modified phase-cut waveform and control the AC-to-DC converter to output an amount of DC power that is based upon at least one ON-time of the plurality of ON-times and/or at least one phase angle of the plurality of phase angles in the modified phase-cut waveform or the first signal; two or more LED lighting sources connected to an output of the AC-to-DC converter and having different spectral emission characteristics; a current controller connected to at least one of the two or more LED lighting sources to control relative amounts of current flowing through the LED lighting sources; and a controller arranged to receive a second signal representative of the modified phase-cut waveform and to detect modulations in the plurality of ON-times and/or plurality of phase angles from the second signal, wherein the modulations encode correlated color temperature (CCT) information and are temporary deviations from a current average ON-time determined from the plurality of ON-times or a current average phase angle determined from plurality of phase angles.

(2) The lighting circuit of configuration (1), wherein: the input is configured to connect to a two-wire AC wire that carries power in the modified phase-cut waveform to operate the lighting circuit and the two or more LED lighting sources; and the modulations convey digitally encoded CCT information in the modified phase-cut waveform.

(3) The lighting circuit of configuration (2), wherein the controller is configured to: detect a digital bit of the digitally encoded CCT information as an increase in a first ON-time of the plurality of ON-times and a decrease in a second ON-time of the plurality of ON-times, the first ON-time occurring within a first half-cycle of a first cycle of the multiple cycles and the second ON-time occurring within a second half-cycle of the first cycle; and/or detect the digital bit of the digitally encoded CCT information as an increase in a first phase angle of the plurality of phase angles and a decrease in a second phase angle of the plurality of phase angle, the first phase angle occurring within the first half-cycle of the first cycle of the multiple cycles and the second phase angle occurring within the second half-cycle of the first cycle.

(4) The lighting circuit of configuration (2) or (3), wherein: the controller is configured to detect, based upon the modulations, a sequence of digital bits of a data frame that includes the CCT information; the sequence of digital bits are encoded in a sequence of cycles within the multiple cycles; each digital bit within the sequence of digital bits is detected by the controller from the modulations that occur within the sequence of cycles; and at least one cycle within the sequence of cycles has none of the modulations in the plurality of ON-times or plurality of phase angles and occurs between two cycles of the sequence of cycles that encode two digital bits of the sequence of digital bits.

(5) The lighting circuit of configuration (1), wherein the modulations temporally shift at least one conduction pulse within a cycle of the multiple cycles, where the at least one conduction pulse has a first ON-time of the two or more ON-times that is equivalent to at least two of the two or more ON-times.

(6) The lighting circuit of any one of configurations (1) through (5), wherein the controller is configured to output one signal to the current controller to control the relative amounts of the current flowing through two of the LED lighting sources.

(7) The lighting circuit of configuration (6), wherein the current controller comprises: a first transistor having its current-carrying terminals connected in series with a first LED lighting source of the two LED lighting sources; a second transistor having its current-carrying terminals connected in series with a second LED lighting source of the two LED lighting sources; and a third transistor having a control terminal connected to a control terminal of the first transistor and a current-carrying terminal connected to a control terminal of the second transistor.

(8) The lighting circuit of configuration (6) or (7), wherein the controller is configured to change a duty cycle of the one signal to control the relative amounts of the current flowing through two of the LED lighting sources.

(9) The lighting circuit of configuration (8), wherein: the controller is configured to reference a look-up table or executes a scaling algorithm to determine the duty cycle; and the look-up table or scaling algorithm accounts for nonlinearities in the two or more LED lighting sources.

(10) The lighting circuit of any one of configurations (1) through (9), wherein the controller is configured to output at least two signals to the current controller to control the relative amounts of the current flowing through at least two of the two or more LED lighting sources.

(11) The lighting circuit of any one of configurations (1) through (10), further comprising: a transformer having a primary winding connect to the rectifier; and a secondary winding connected to the two or more LED lighting sources, wherein the controller receives the second signal representative of the modified phase-cut waveform on the primary winding side of the transformer.

(12) The lighting circuit of any one of configurations (1) through (11), further comprising: a transformer having a primary winding connect to the rectifier; and a secondary winding connected to the two or more LED lighting sources, wherein the controller receives the second signal representative of the modified phase-cut waveform on the secondary winding side of the transformer.

(13) The lighting circuit of any one of configurations (1) through (12), further including a ripple-reduction circuit connected to the AC-to-DC converter, the ripple-reduction circuit comprising: a transistor having a current-carrying terminal connected to an output of the AC-to-DC converter; a first circuit branch connecting a control terminal of the transistor to a resistor that is connected in series with a first terminal of a capacitor, the capacitor having a second terminal connected to a reference potential; a second circuit branch having a resistor and diode connected in parallel between the output of the AC-to-DC converter and a cathode of a Zener diode, the Zener diode having an anode connected to the first terminal of the capacitor.

(14) The lighting circuit of configuration (13), wherein the AC-to-DC converter comprises an energy storage capacitor that provides power to the ripple-reduction circuit, the energy storage capacitor having a capacitance no larger than 700 microfarads.

(15) The lighting circuit of any one of configurations (1) through (14), wherein the controller does not determine an amount of current that is provided from the AC-to-DC converter to the two or more LED lighting sources.

(16) The lighting circuit of claim 1, further comprising: a charge-storage circuit connected to an input/output data port of the controller, wherein the controller is configured to determine from an amount of voltage read from the charge-storage circuit whether one or more temporary power interruptions, each lasting within a threshold amount of time, has occurred.

(17) The lighting circuit of configuration (16), wherein the controller is further configured to identify a command from the one or more temporary power interruptions to change an operating configuration or operational characteristic of the lighting circuit.

(18) The lighting circuit of any one of configurations (1) through (17), wherein the controller is configured to automatically: determine a maximum ON-time value as a longest ON-time value exhibited by one or more of the plurality of ON-times or determine a maximum phase angle as a largest phase angle exhibited by one or more of the plurality of phase angles; determine a minimum ON-time value as a shortest ON-time value exhibited by one or more of the plurality of ON-times or determine a minimum phase angle as a smallest phase angle exhibited by one or more of the plurality of phase angles; and execute a scaling algorithm such that the maximum ON-time or maximum phase angle causes the two or more LED lighting sources to output at a maximum intensity setting for the lighting circuit and the minimum ON-time or minimum phase angle causes the two or more LED lighting sources to output at a minimum intensity setting for the lighting circuit, wherein the maximum intensity setting causes a same first amount of light output from two lighting circuits operating at the maximum intensity setting and the minimum intensity setting causes a same second amount of light output from two lighting circuits operating at the minimum intensity setting.

(19) The lighting circuit of any one of configurations (1) through (18), wherein the controller is configured to automatically: determine a maximum modulation amount as a largest amount of modulation in the detected modulations; determine a minimum modulation amount as a smallest amount of modulation in the detected modulations; and execute a scaling algorithm such that the maximum modulation amount causes the two or more LED lighting sources to output a CCT at a first CCT setting for the lighting circuit and the minimum modulation amount causes the two or more LED lighting sources to output a CCT at a second CCT setting for the lighting circuit, wherein the first CCT setting causes a same first CCT output from two lighting circuits operating at the first CCT setting and the second CCT setting causes a same second CCT output from two lighting circuits operating at the second CCT setting.

(20) The lighting circuit of configuration (19), wherein the controller is further configured to set the first CCT and the second CCT based upon input received from a user of the lighting system.

(21) The lighting circuit of any one of configurations (1) through (20), further comprising: a first circuit connected to a first node of the rectifier to provide a first sensing signal that is representative of first half-cycles of the modified phase-cut waveform; and a second circuit connected to a second node of the rectifier to provide a second sensing signal that is representative of second half-cycles of the modified phase-cut waveform, wherein the second half-cycles correspond to negative half-cycles of the modified phase-cut waveform and the first half-cycles correspond to positive half-cycles of the modified phase-cut waveform.

(22) The lighting circuit of any one of configurations (1) through (21), further comprising: a memory integrated circuit connected to the controller; and an antenna connected to the memory integrated circuit to receive a command wirelessly via near-field communication, wherein the controller is adapted to unlock an operational feature of the lighting circuit based on the received

(23) An LED driver comprising: an input to receive an alternating current modified phase-cut waveform that carries power to operate the LED driver and encodes intensity information and correlated color temperature (CCT) information; an AC-to-DC converter connected to the input; a flyback controller coupled to the input and to the AC-to-DC converter, the flyback controller arranged to control an amount of power output by the AC-to-DC converter based on the intensity information detected by the flyback controller from the modified phase-cut waveform or a first signal representative of the modified phase-cut waveform; and a controller to decode the CCT information from the modified phase-cut waveform or a second signal representative of the modified phase-cut waveform and output at least one modulated signal having a signal characteristic that is based on the decoded CCT information.

(24) The LED driver of configuration (23), further comprising a transformer located in the AC-to-DC converter; and a transistor having a control terminal connected to an output of the flyback controller and a current-carrying terminal connected to a primary winding of the transformer, wherein operation of the transistor controls power conversion by the AC-to-DC converter.

(25) The LED driver of configuration (23) or (24), wherein the flyback controller is configured to detect the intensity information based on an average ON-time and/or an average phase angle of the modified phase-cut waveform or the first signal representative of the modified phase-cut waveform.

(26) The LED driver of any one of configurations (23) through (25), further comprising a current-controller coupled to an output of the controller to receive the at least one modulated signal and to control relative amounts of current flowing in two or more circuit branches that are configured to connect to two or more LED lighting sources.

(27) The LED driver of configuration (26), wherein the controller is configured to output one signal for which the pulse width or duty cycle of the one signal controls the relative amounts of current flowing in two or more circuit branches.

(28) The LED driver of any one of configurations (23) through (27), wherein the controller decodes the CCT information as a sequence of digital bits.

(29) The LED driver of any one of configurations (23) through (28), further comprising a transformer located in the AC-to-DC converter, the transformer having a primary winding and a secondary winding, wherein the controller receives the modified phase-cut waveform or the second signal representative of the modified phase-cut waveform from a circuit node on a primary winding side of the transformer.

(30) The LED driver of any one of configurations (23) through (29), further comprising a transformer located in the AC-to-DC converter, the transformer having a primary winding and a secondary winding, wherein the controller receives the second signal representative of the modified phase-cut waveform from a circuit node on a secondary winding side of the transformer.

(31) The LED driver of configuration (30), further comprising a diode connected directly to the secondary winding of the transformer, wherein the circuit node is located between the secondary winding and the diode.

(32) A method of operating a lighting fixture, the method comprising: receiving at the lighting fixture an alternating current modified phase-cut waveform that carries power to operate the lighting fixture and conveys correlated color temperature (CCT) control information and intensity control information; detecting with a flyback controller at the lighting fixture the intensity control information from the modified phase-cut waveform; controlling, by the flyback controller, an amount of the power provided to two or more lighting sources in the lighting fixture based upon the detected intensity control information; decoding, with a controller at the lighting fixture, the CCT control information from the modified phase-cut waveform; and controlling, with the controller, relative portions of the power that are provided to the two or more lighting sources.

(33) The method of (32), wherein: detecting the intensity control information comprises sensing an average ON-time and/or an average phase angle in the modified phase-cut waveform or a signal representative of the modified phase-cut waveform; and decoding the CCT control information comprises detecting a sequence of digital bits encoded in the modified phase-cut waveform.

(34) The method of (32), wherein: detecting the intensity control information comprises detecting the intensity control information from one or more first half-cycles of the modified phase-cut waveform having a first polarity; and decoding the CCT control information comprises decoding the CCT control information from one or more second half-cycles of the modified phase-cut waveform having a second polarity that is opposite the first polarity.

(35) The method of any one of (32) through (34), wherein decoding the CCT control information comprises determining a difference between a first modulation of a first ON-time or first phase angle in a first half-cycle of the modified phase-cut waveform and a second modulation of a second ON-time or second phase angle in a second half-cycle of the modified phase-cut waveform.

(36) The method of (35), wherein the first half-cycle and the second half-cycle are within a same cycle of the modified phase-cut waveform.

(37) The method of any one of (32) through (34), wherein decoding the CCT control information comprises detecting a shift in a location of a first conduction pulse within a first cycle of the modified phase-cut waveform compared to a second conduction pules within a second cycle of the modified phase-cut waveforms.

(38) The method of (32), wherein: a cycle of the modified phase-cut waveform contains a first conduction pulse, and second conduction pulse, and a third conduction pulse; and decoding the CCT control information comprises detecting a duration or a location of the third conduction pulse within the cycle.

(39) An apparatus to control a device having a first adjustable operational characteristic and a second adjustable operational characteristic, the apparatus comprising: an input to receive an alternating current (AC) modified phase-cut waveform having multiple cycles, wherein at least one cycle of the multiple cycles concurrently conveys in each cycle first information for controlling the first adjustable operational characteristic of the device and second information for controlling the second adjustable operational characteristic of the device; and at least one controller, coupled to the input, to: detect a first property of the AC modified phase-cut waveform to determine the first information from the first property; and detect a second property of the AC modified phase-cut waveform to determine the second information from the second property, wherein the AC modified phase-cut waveform further provides operating power for the at least one controller.

(40) The apparatus of configuration (39), further comprising the device, wherein: the device is a lighting device; the first adjustable operational characteristic of the lighting device is an intensity of light generated by the lighting device; and the second adjustable operational characteristic of the lighting device is a correlated color temperature (CCT) of the light generated by the lighting device.

(41) The apparatus of configuration (39) or (40), wherein each cycle of the multiple cycles includes: a first half cycle having at least one first half cycle property; and a second half cycle having at least one second half cycle property; the first property of the AC modified phase-cut waveform detected by the at least one controller is a cycle average power in at least one of the first half cycle or the second half cycle, in at least some of the multiple cycles; the second property of the AC modified phase-cut waveform is at least one of the at least one first half-cycle property or the at least one second half-cycle property; and the at least one controller is configured to: control the first adjustable operational characteristic of the device, when the device is coupled to the at least one controller, based on the cycle average power; and control the second adjustable operational characteristic of the device, when the device is coupled to the at least one controller, based on at least one of the at least one first half cycle property or the at least one second half cycle property.

(42) The apparatus of configuration (39), further comprising the device, wherein: the device is a lighting device; the first adjustable operational characteristic of the lighting device is an intensity of light generated by the lighting device; and the second adjustable operational characteristic of the lighting device is a correlated color temperature (CCT) of the light generated by the lighting device.

(43) The apparatus of any one of configurations (39) through (42), wherein: the at least one first half cycle property includes at least one of a first ON-time, a first OFF-time or a first phase angle of the first half cycle; and the at least one second half cycle property includes at least one of a second ON-time, a second OFF-time, or a second phase angle of the second half cycle.

(44) The apparatus of configuration (43), wherein respective values of the at least one first half cycle property and the at least one second half cycle property are different.

(45) The apparatus of any one of configurations (39) through (44), wherein the at least one controller is configured to: control the first adjustable operational characteristic of the device, when the device is coupled to the at least one controller, based on the cycle average power in the first half cycle in at least some of the multiple cycles of the AC modified phase-cut waveform; and control the second adjustable operational characteristic of the device, when the device is coupled to the at least one controller, based on the at least one second half cycle property of the second half cycle in the at least some of the multiple cycles of the AC modified phase-cut waveform.

(46) The apparatus of any one of configurations (39) through (44), wherein the at least one controller is configured to: control the first adjustable operational characteristic of the device, when the device is coupled to the at least one controller, based on the cycle average power in the first half cycle and the second half cycle in at least some of the multiple cycles of the AC modified phase-cut waveform; and control the second adjustable operational characteristic of the device, when the device is coupled to the at least one controller, based on the at least one first half cycle property of the first half cycle and the at least one second half cycle property of the second half cycle in the at least some of the multiple cycles of the AC modified phase-cut waveform.

(47) The apparatus of configuration (46), wherein the at least one controller is configured to: control the second adjustable operational characteristic of the device, when the device is coupled to the at least one controller, based on respective modulations of the at least one first half cycle property of the first half cycle and the at least one second half cycle property of the second half cycle in the at least some of the multiple cycles of the AC modified phase-cut waveform.

(48) The apparatus of configuration (47), wherein: each cycle of the multiple cycles of the AC modified phase-cut waveform has a cycle power; and the respective modulations of the at least one first half cycle property of the first half cycle and the at least one second half cycle property of the second half cycle do not significantly change the cycle power between different cycles of the multiple cycles that include the respective modulations.

(49) The apparatus of configuration (48), wherein the respective modulations of the at least one first half cycle property of the first half cycle and the at least one second half cycle property of the second half cycle do not change the cycle power by more than 5% between the different cycles of the multiple cycles that include the modulations.

(50) The apparatus of configuration (48), wherein the respective modulations of the at least one first half cycle property of the first half cycle and the at least one second half cycle property of the second half cycle do not change the cycle power by more than 2% between the different cycles of the multiple cycles that include the modulations.

(51) The apparatus of configuration (48), wherein the respective modulations of the at least one first half cycle property of the first half cycle and the at least one second half cycle property of the second half cycle do not change the cycle power by more than 1% between the different cycles of the multiple cycles that include the modulations.

(52) The apparatus of configuration (47), wherein the at least one controller is configured to determine an average value for the at least one first half cycle property and the at least one second half cycle property over at least a portion of the AC modified phase-cut waveform; determine a modulated first value for the at least one first half cycle property, relative to the average value, in at least some cycles of the multiple cycles; determine a modulated second value for the at least one second half cycle property, relative to the average value, in the at least some cycles of the multiple cycles, wherein the modulated second value has a substantially similar magnitude and opposite polarity to the modulated first value relative to the average value; and control the second adjustable operational characteristic of the device, when the device is coupled to the at least one controller, based on the modulated first value for the at least one first half cycle property and the modulated second value for the at least one second half cycle property.

(53) The apparatus of configuration (52), wherein: the at least one first half cycle property is a first phase angle of the first half cycle; and the at least one second half cycle property is a second phase angle of the second half cycle.

(54) The apparatus of configuration (52), wherein: the at least one first half cycle property is a first ON-time of the first half cycle; and the at least one second half cycle property is a second ON-time of the second half cycle.

(55) The apparatus of configuration (52), wherein: the at least one first half cycle property is a first OFF-time of the first half cycle; and the at least one second half cycle property is a second OFF-time of the second half cycle.

(56) The apparatus of configuration (47), wherein: the respective modulations of the at least one first half cycle property of the first half cycle and the at least one second half cycle property of the second half cycle in the at least some of the multiple cycles of the AC modified phase-cut waveform convey digitally encoded information in the AC modified phase-cut waveform; and the at least one controller is configured to detect the respective modulations to determine at least one digital bit of the digitally encoded information.

(57) The apparatus of configuration (56), wherein: the controller is configured to determine, based upon the detected respective modulations, a sequence of digital bits of a data frame; the sequence of digital bits are encoded in a sequence of cycles within the multiple cycles of the AC modified phase-cut waveform; each digital bit within the sequence of digital bits is determined by the controller from the respective modulations that occur within the sequence of cycles; and at least one cycle within the sequence of cycles has none of the respective modulations and occurs between two cycles of the sequence of cycles that encode two digital bits of the sequence of digital bits.

(58) The apparatus of configuration (57), further comprising the device, wherein: the device is a lighting device; the first adjustable operational characteristic of the lighting device is an intensity of light generated by the lighting device; and the second adjustable operational characteristic of the lighting device is a correlated color temperature (CCT) of the light generated by the lighting device.

(59) A lighting circuit comprising: an input to receive an alternating current phase-cut waveform having multiple cycles including a plurality of ON-times and a plurality of phase angles, wherein each of the multiple cycles includes two or more ON-times and two or more phase angles; a rectifier to rectify the phase-cut waveform; an AC-to-DC converter connected to the rectifier; two or more LED lighting sources connected to an output of the AC-to-DC converter and having different spectral emission characteristics; a current controller connected to at least one of the two or more LED lighting sources to control relative amounts of current flowing through the LED lighting sources; a controller having at least one output connected to the current controller; and a charge-storage circuit connected to an input/output data port of the controller, wherein the controller is configured to: detect, from an amount of voltage read from the charge-storage circuit, one or more temporary power interruptions to the lighting circuit, each lasting within a threshold amount of time; and identify at least one command to be executed by the controller based upon the one or more temporary power interruptions.

(60) The lighting circuit of configuration (59), wherein the at least one command identifies a correlated color temperature (CCT) to be produced by output from the two or more LED lighting sources.

(61) The lighting circuit of configuration (59) or (60), wherein the at least one command causes the controller to implement a change in the relative amounts of current flowing through the LED lighting sources and thereby change a CCT produced by the two or more LED lighting sources based on detected changes in at least one detected ON-time of the plurality of ON-times or at least one detected phase angle of the plurality of phase angles.

(62) The lighting circuit of configuration (61), wherein the lighting circuit is configured to implement a change in a total intensity produced by the two or more LED lighting sources at a fixed setting of the CCT based on the detected changes in the at least one detected ON-time of the plurality of ON-times or the at least one detected phase angle of the plurality of phase angles following at least one additional power interruption to the lighting circuit.

(63) The lighting circuit of any one of configurations (59) through (60), further comprising: a flyback controller arranged to sense the phase-cut waveform or a signal representative of the phase-cut waveform and control the AC-to-DC converter to output an amount of DC power that is based upon at least one detected ON-time of the plurality of ON-times and/or at least one detected phase angle of the plurality of phase angles in the phase-cut waveform or the signal representative of the phase-cut waveform.

(64) A device controller comprising: an input to receive an AC waveform; a phase cutter connected to the input to produce a modified phase-cut waveform from the received AC waveform that carries power to operate an apparatus connected to the device controller; a controller connected to the phase cutter; a first input channel to provide first control information to the controller; and a second input channel to provide second control information to the controller, wherein the controller is configured to operate the phase cutter to produce the modified phase-cut waveform that conveys the first control information and the second control information in the modified phase-cut waveform such that the power between successive cycles of the modified phase-cut waveform that convey the first control information and the second control information does not vary by more than 1% when conveying the second control information to the apparatus.

(65) The device controller of configuration (64), wherein: the first control information is encoded as an analog signal in the modified phase-cut waveform; and the second control information is encoded as a digital signal in the modified phase-cut waveform.

(66) The device controller of configuration (64) or (65), wherein the controller is configured to operate the phase cutter to: change in a first direction, from a current average phase angle, a first phase angle in a first half-cycle of a first cycle of the successive cycles; and change in a second direction that is opposite the first direction, from the current average phase angle, a second phase angle in a second half-cycle of the first cycle to communicate a first digital bit.

(67) The device controller of configuration (65) or (66), wherein: the second control information comprises a sequence of digital bits that include the first digital bit and a second digital bit communicated in a second cycle of the successive cycles; and the controller is further configured to operate the phase cutter to output at least one third cycle of the successive cycles between the first cycle and the second cycle, the third cycle having the current average ON-time or the current average phase angle for the first half-cycle and the second half-cycle of the at least one third cycle.

(68) A method of controlling an apparatus over AC wiring, the method comprising: receiving, at a controller over the AC wiring, an AC waveform; receiving, at the controller, first control information to change a first operational characteristic of the apparatus from a first setting to a second setting from among a plurality of first possible settings numbering more than two; receiving second control information to change a second operational characteristic of the apparatus from a first setting to a second setting from among a plurality of second possible settings numbering more than two; and producing a modified phase-cut waveform from the AC waveform that provides AC power to power the device and that conveys the first control information and the second control information as two independently adjustable parameters in the modified phase-cut waveform such that the power between successive cycles of the modified phase-cut waveform that convey the first control information and the second control information does not vary by more than 1% when conveying the second control information to the apparatus.

(69) The method of (68), wherein producing the modified phase-cut waveform comprises: encoding the first control information as an analog signal in the modified phase-cut waveform; and encoding the second control information as a digital signal having a sequence of digital bits in the modified phase-cut waveform.

(70) The method of (69), wherein encoding the second control information comprises: decreasing, from a current average phase angle, a first phase angle in a first half-cycle of a first cycle of the successive cycles; increasing, from the current average phase angle, a second phase angle in a second half-cycle of the first cycle to communicate a first digital bit of the sequence of digital bits; outputting, after the first cycle, a second cycle having the current average phase angle for the first half-cycle and the second half-cycle of the second cycle; increasing, from the current average phase angle, a first phase angle in the first half-cycle of a third cycle of the successive cycles; and decreasing, from the current average phase angle, a second phase angle in the second half-cycle of the third cycle to communicate a second digital bit of the sequence of digital bits after outputting the second cycle.

(71) A circuit to control a device having a first adjustable operational characteristic, the circuit comprising: an input to receive an alternating current (AC) modified phase-cut waveform having multiple cycles, wherein at least one cycle of the multiple cycles each concurrently conveys first information for controlling the first adjustable operational characteristic of the device and second information for controlling a second adjustable operational characteristic of the device; a power supply to provide power derived from the modified phase-cut waveform for powering the device; and a controller arranged to receive a signal representative of the modified phase-cut waveform and detect modulations in a first property of the modified phase-cut waveform over a sequence of successive cycles of the multiple cycles that together encode the first information, wherein the modulations do not change cycle-to-cycle average power by more than 1% between successive cycles of the sequence of successive cycles.

(72) A device having a circuit comprising: an input to receive an alternating current (AC) modified phase-cut waveform having multiple cycles including a plurality of ON-times and a plurality of phase angles, wherein each cycle of the multiple cycles includes two or more ON-times and two or more phase angles, wherein the modified phase-cut waveform carries power to operate the device and conveys first information to control a first operational characteristic of the device and second information to control a second operational characteristic of the device; a controller arranged to receive a signal representative of the modified phase-cut waveform and detect modulations in the plurality of ON-times or plurality of phase angles, wherein the modulations encode the second information as temporary deviations from a current average ON-time or current average phase angle and wherein the modulations do not change the power by more than 1% between successive cycles of the multiple cycles that convey the second information.

(73) The device of configuration (72), further comprising: a flyback controller configured to detect the first information from the modified phase-cut waveform or the signal representative of the phase-cut waveform and control an amount of the power that is provided to at least one component of the device based on the first information.

(74) The device of configuration (72) or (73), wherein the controller is configured to control relative amounts of power provided to two or more components of the device based on the second information.

(75) The device of configuration (74), wherein the device is an LED lighting fixture and the two or more components are LED lighting sources.

(76) The device of any one of configurations (72) through (75), wherein the device is a heating or cooling system.

(77) A method of operating a device connected to AC wiring, the method comprising: receiving, at the device, a modified phase-cut waveform over the AC wiring that conveys first control information and second control information and provides power to power the device; detecting from the modified phase-cut waveform, with a first circuit at the device, the first control information; changing, based upon the first control information, a first operational characteristic of the device from a first setting to a second setting from among a plurality of first possible settings numbering more than two; decoding, with a controller at the device, from the modified phase-cut waveform the second control information; and changing, based upon the second control information, a second operational characteristic of the device from a first setting to a second setting from among a plurality of second possible settings numbering more than two, wherein the second operational characteristic is changed independently of the change to the first operational characteristic.

(78) The method of (77), wherein: detecting the first control information comprises sensing an average ON-time or average phase angle in the modified phase-cut waveform and/or a signal representative of the modified phase-cut waveform; and decoding the second control information comprises detecting a sequence of digital bits encoded in the modified phase-cut waveform.

(79) The method of (78), wherein: each digital bit in the sequence of digital bits is encoded in a single cycle of the modified phase-cut waveform; and a change in the power between cycles of the modified phase-cut waveform that convey the sequence of digital bits is no greater than 1%.

(80) The method of any one of (77) through (79), wherein the device is an LED lighting fixture.

(81) The method of (80), wherein: the first control information determines a first amount of the power to provide to two or more lighting sources of the LED lighting fixture; and the second control information determines relative portions of the first amount of the power to deliver to each of the two or more lighting sources.

12. Conclusion

While various inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been described. The acts performed as part of the method may be ordered in any suitable way. Accordingly, implementations may be constructed in which acts are performed in an order different than illustrated, which may include performing some acts simultaneously, even though shown as sequential acts in illustrative implementations.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A lighting fixture comprising:

an input to receive an alternating current (AC) modified phase-cut waveform having multiple cycles that carries power to operate the lighting fixture, the AC modified phase-cut waveform having a plurality of ON times and/or plurality of phase angles;

a power supply to convert the AC modified phase-cut waveform to DC power that is provided to at least two LED sources having different spectral emission characteristics; and a controller adapted to:

receive a signal representative of the AC modified phase-cut waveform;

detect modulations in the plurality of ON times and/or the plurality of phase angles from the signal; and control relative amounts of the DC power provided to the at least two LED sources based, at least in part, on the modulations to set a correlated color temperature (CCT) of light emitted from the lighting fixture.

2. A method of operating a lighting fixture, the method comprising:

receiving, at an input to the lighting fixture, an alternating current (AC) modified phase-cut waveform that carries power to operate the lighting fixture, the AC modified phase-cut waveform having a plurality of ON times and/or plurality of phase angles;

converting, with a power supply in the lighting fixture, the AC modified phase-cut waveform to DC power;

receiving, with a controller in the lighting fixture, a signal representative of the AC modified phase-cut waveform;

detecting, with the controller, modulations in the plurality of ON times and/or the plurality of phase angles from the signal; and controlling, based at least in part on the modulations, relative amounts of the DC power provided to at least two LED sources having different spectral emission characteristics to set a correlated color temperature (CCT) of light emitted from the lighting fixture.

3. The lighting fixture of claim 1, wherein the modulations in the plurality of ON times and/or the plurality of phase angles convey digitally encoded CCT information that is decoded by the controller.

4. The lighting fixture of claim 3, wherein the controller is configured to do one or both of:

(a) detect a digital bit of the digitally encoded CCT information as an increase in a first ON-time of the plurality of ON-times and a decrease in a second ON-time of the plurality of ON-times, the first ON-time occurring within a first half-cycle of a first cycle of the multiple cycles and the second ON-time occurring within a second half-cycle of the first cycle; and (b) detect the digital bit of the digitally encoded CCT information as an increase in a first phase angle of the plurality of phase angles and a decrease in a second phase angle of the plurality of phase angles, the first phase angle occurring within the first half-cycle of the first cycle of the multiple cycles and the second phase angle occurring within the second half-cycle of the first cycle.

5. The lighting fixture of claim 4, wherein the controller is further configured to detect, based upon the modulations, a sequence of digital bits of a data frame that includes the CCT information, wherein:

the sequence of digital bits are encoded in a sequence of cycles within the multiple cycles; and each digital bit within the sequence of digital bits is detected by the controller from the modulations that occur within the sequence of cycles.

6. The lighting fixture of claim 1, further comprising:

a current controller configured to control relative amounts of current flowing through two LED sources of the at least two LED sources, wherein the controller is further configured to output one signal to the current controller to control the relative amounts of the current flowing through the two LED sources.

7. The lighting fixture of claim 6, wherein the current controller comprises:

a first transistor having its current-carrying terminals connected in series with a first LED source of the two LED sources;

a second transistor having its current-carrying terminals connected in series with a second LED source of the two LED lighting sources; and a third transistor having a control terminal connected to a control terminal of the first transistor and a current-carrying terminal connected to a control terminal of the second transistor.

8. The lighting fixture of claim 7, wherein the controller is configured to change a duty cycle of the one signal to control the relative amounts of the current flowing through the two LED sources.

9. The method of claim 2, further comprising:

decoding, with the controller, digitally encoded CCT information conveyed by modulations in the plurality of ON times and/or the plurality of phase angles.

10. The method of claim 9, wherein decoding digitally encoded CCT information by the controller comprises one or both of:

(a) detecting a digital bit of the digitally encoded CCT information as an increase in a first ON-time of the plurality of ON-times and a decrease in a second ON-time of the plurality of ON-times, the first ON-time occurring within a first half-cycle of a first cycle of the multiple cycles and the second ON-time occurring within a second half-cycle of the first cycle; and (b) detecting the digital bit of the digitally encoded CCT information as an increase in a first phase angle of the plurality of phase angles and a decrease in a second phase angle of the plurality of phase angles, the first phase angle occurring within the first half-cycle of the first cycle of the multiple cycles and the second phase angle occurring within the second half-cycle of the first cycle.

11. The method of claim 2, further comprising detecting, by the controller and based upon the modulations, a sequence of digital bits of a data frame that includes the CCT information, wherein:

the sequence of digital bits are encoded in a sequence of cycles within the multiple cycles; and each digital bit within the sequence of digital bits is detected by the controller from the modulations that occur within the sequence of cycles.

12. The method of claim 2, further comprising:

outputting, by the controller to a current controller, one signal to control relative amounts of current flowing through two LED sources of the at least two LED sources; and controlling, with the current controller, the relative amounts of the current flowing through the two LED sources based on the one signal.

13. The method of claim 12, wherein the current controller comprises:

a first transistor having its current-carrying terminals connected in series with a first LED source of the two LED sources;

a second transistor having its current-carrying terminals connected in series with a second LED source of the two LED lighting sources; and a third transistor having a control terminal connected to a control terminal of the first transistor and a current-carrying terminal connected to a control terminal of the second transistor.

14. The method of claim 12, further comprising:

changing, by the controller, a duty cycle of the one signal to control the relative amounts of the current flowing through the two LED sources.

15. A device controller for at least one lighting fixture, the device controller comprising:

an input to receive an AC waveform;

a phase cutter connected to the input to produce a modified phase-cut waveform from the received AC waveform, wherein the modified phase-cut waveform carries power to operate an apparatus connected to the device controller; and a controller connected to the phase cutter, wherein the controller is configured to operate the phase cutter to produce the modified phase-cut waveform that conveys first control information and second control information in waveform cycles of the modified phase-cut waveform.

16. The device controller of claim 15, wherein:

the first control information is encoded by the phase cutter as an analog signal in the modified phase-cut waveform; and the controller is configured to operate the phase cutter to encode the second control information as a digital signal in the modified phase-cut waveform.

17. The device controller of claim 16, wherein the controller is further configured to operate the phase cutter such that average power from cycle to cycle of the waveform cycles does not vary by more than 2% when conveying the digital signal to the apparatus.

18. The device controller of claim 16, wherein the controller is configured to operate the phase cutter to communicate a first digital bit of the digital signal by:

changing, in a first direction, a first phase angle in a first half-cycle of a first cycle of the waveform cycles from a first current average phase angle for first half-cycles of the waveform cycles; and changing, in a second direction that is opposite the first direction, a second phase angle in a second half-cycle of the first cycle, from a second current average phase angle for second half-cycles of the waveform cycles.

19. The device controller of claim 18, wherein the second control information comprises a sequence of digital bits that includes at least the first digital bit encoded in the first cycle of the waveform cycles and a second digital bit encoded in a second cycle of the waveform cycles.

20. The device controller of claim 19, wherein the controller is further configured to:

operate the phase cutter to output at least one third cycle of the waveform cycles between the first cycle and the second cycle, the third cycle having the first current average phase angle for a first half-cycle of the third cycle and having the second current average phase angle for a second half-cycle of the third cycle.

21. The device controller of claim 15, wherein:

the device controller is adapted to mount in a wall;

the first control information is to control an intensity of light output from a lighting fixture; and the second control information is to control a color temperature of the light output from the lighting fixture.

* * * * *